United States Patent
Luis y Prado

(10) Patent No.: US 10,252,410 B2
(45) Date of Patent: Apr. 9, 2019

(54) ROTATABLE FIXTURING PLATFORM

(71) Applicant: Workshops For Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 15/447,047

(22) Filed: Mar. 1, 2017

(65) Prior Publication Data
US 2017/0173779 A1  Jun. 22, 2017

Related U.S. Application Data

(63) Continuation-in-part of application No. 14/881,068, filed on Oct. 12, 2015, now Pat. No. 9,862,088.

(51) Int. Cl.
*B25H 1/14* (2006.01)
*B23K 37/04* (2006.01)
(Continued)

(52) U.S. Cl.
CPC ........... *B25H 1/14* (2013.01); *B23K 37/0461* (2013.01); *B25H 1/02* (2013.01); *B25H 1/04* (2013.01);
(Continued)

(58) Field of Classification Search
CPC ... B25H 1/14; B25H 1/02; B25H 1/04; B25H 1/08; B25H 1/10; A47B 11/00;
(Continued)

(56) References Cited

U.S. PATENT DOCUMENTS 1,559,453 A * 10/1925 Pritner ............... B23K 37/0461
164/DIG. 12
1,600,835 A * 9/1926 Manley ............... B25H 1/0007
248/172
(Continued)

FOREIGN PATENT DOCUMENTS

CN          IO522264      1/2014
DE       202009014342    4/2011
(Continued)

OTHER PUBLICATIONS http://www.stronghandtools.com/buildpro/accessories/individual_plates.php, BuildPro, Individual Plates, downloaded from the Internet.
(Continued)

*Primary Examiner* — Hanh V Tran
(74) *Attorney, Agent, or Firm* — Fish & Richardson P.C.

(57) ABSTRACT

Systems, methods, and apparatus for a rotatable fixturing platform having a rotisserie, a modular fixturing platform, and a mounting assembly. The rotisserie includes a base with an extensible frame. The extensible frame includes a plurality of support assemblies and a plurality of extensible arms. Each extensible arm extends from one of the support assemblies and has a bearing. The mounting assembly includes a plurality of mounting brackets coupled to the fixturing platform and an axle assembly. The axle assembly is secured to bearings of the extensible arms.

19 Claims, 42 Drawing Sheets

(51) Int. Cl.
    *B25H 1/02* (2006.01)
    *B25H 1/04* (2006.01)
    *B25H 1/08* (2006.01)
    *B25H 1/10* (2006.01)
    *F16B 12/08* (2006.01)

(52) U.S. Cl.
    CPC .............. *B25H 1/08* (2013.01); *B25H 1/10* (2013.01); *F16B 12/08* (2013.01)

(58) Field of Classification Search
    CPC ................ A47B 13/088; A47B 87/002; B23K 37/0461; F16B 12/08
    See application file for complete search history.

(56) References Cited

U.S. PATENT DOCUMENTS

| | | | | |
|---|---|---|---|---|
| 3,977,662 | A * | 8/1976 | Cook | B25H 1/00 269/60 |
| 4,061,323 | A | 12/1977 | Beekenkamp | |
| 4,634,898 | A | 1/1987 | Gouldsberry | |
| 4,641,986 | A | 2/1987 | Tsui | |
| 4,647,028 | A * | 3/1987 | Yang | B25B 1/10 269/139 |
| 4,654,830 | A | 3/1987 | Chua | |
| 4,670,708 | A | 6/1987 | Bosnyak | |
| 4,705,422 | A | 11/1987 | Tsui | |
| 4,708,540 | A | 11/1987 | Heimbigner | |
| 4,770,570 | A | 9/1988 | Tsui | |
| 4,804,162 | A * | 2/1989 | Rice | B25H 1/0007 248/129 |
| 4,804,300 | A | 2/1989 | Tsui | |
| 4,841,817 | A | 6/1989 | Tsui | |
| 5,056,965 | A | 10/1991 | Tsui | |
| 5,342,749 | A | 8/1994 | Noakes | |
| 5,362,036 | A | 11/1994 | Whiteman | |
| 5,405,210 | A | 4/1995 | Tsui | |
| 5,528,996 | A | 6/1996 | Edwards | |
| 5,685,057 | A | 11/1997 | Tsui | |
| 5,732,991 | A | 3/1998 | Tsui | |
| 5,746,552 | A | 5/1998 | Tsui | |
| 5,794,545 | A | 8/1998 | McDaniel | |
| 5,809,631 | A * | 9/1998 | Poulin | B23Q 1/626 144/286.1 |
| 5,836,778 | A | 11/1998 | Fan | |
| 5,848,815 | A | 12/1998 | Tsui | |
| 5,851,007 | A * | 12/1998 | Swartzlander | B25H 1/0007 269/17 |
| 5,924,684 | A | 7/1999 | Cheng | |
| 5,979,954 | A | 11/1999 | Tsui | |
| 5,988,077 | A | 11/1999 | Balderi | |
| 6,019,359 | A | 2/2000 | Fly | |
| 6,022,164 | A | 2/2000 | Tsui | |
| 6,180,365 | B1 | 1/2001 | Elshourbagy | |
| 6,436,673 | B1 | 8/2002 | Worley | |
| 6,681,704 | B1 * | 1/2004 | Brookhiser | A47B 3/0803 108/115 |
| 6,714,790 | B2 | 3/2004 | Heckard | |
| 7,009,480 | B2 | 3/2006 | Tsui | |
| 7,237,758 | B2 * | 7/2007 | Nikolic | B25H 1/0007 248/127 |
| 7,278,664 | B2 | 10/2007 | Su | |
| 7,426,617 | B2 | 9/2008 | Stager | |
| 7,612,307 | B2 | 11/2009 | Chou | |
| 8,042,794 | B2 * | 10/2011 | Marshall | B25H 1/04 269/136 |
| 8,065,967 | B2 * | 11/2011 | Wong | B23K 37/0461 108/155 |
| 8,245,856 | B1 * | 8/2012 | Pappin | A63H 17/44 211/13.1 |
| 8,441,813 | B2 | 5/2013 | Tan | |
| 8,453,987 | B2 * | 6/2013 | Pettey | A63H 29/22 248/122.1 |
| 8,505,597 | B2 * | 8/2013 | Sharperson | B25H 1/12 144/286.5 |
| 8,539,888 | B2 * | 9/2013 | Hernandez | A47B 85/06 108/115 |
| 8,550,015 | B2 | 10/2013 | Wright | |
| 8,869,714 | B1 * | 10/2014 | Barry | B25H 1/18 108/103 |
| 9,003,118 | B2 | 4/2015 | Cherian | |
| 9,632,935 | B2 | 4/2017 | Cherian | |
| 9,636,786 | B2 | 5/2017 | Tsui | |
| 9,827,636 | B2 | 11/2017 | Tsui | |
| 9,844,841 | B2 * | 12/2017 | Farah | B23K 37/047 |
| 2002/0157731 | A1 * | 10/2002 | Harper | B23D 47/025 144/287 |
| 2003/0085786 | A1 | 5/2003 | Tsui | |
| 2003/0188804 | A1 * | 10/2003 | Hill | B25H 1/12 144/286.5 |
| 2003/0213648 | A1 * | 11/2003 | Dembicks | B23D 47/025 182/185.1 |
| 2004/0016854 | A1 * | 1/2004 | Hart | A47F 3/0404 248/141 |
| 2004/0140412 | A1 | 7/2004 | Hendzel | |
| 2005/0051940 | A1 * | 3/2005 | Bensman | B25H 1/04 269/139 |
| 2007/0210109 | A1 * | 9/2007 | Wiemholt | A47G 23/0241 222/166 |
| 2008/0105815 | A1 * | 5/2008 | Chiu | B23D 47/025 248/674 |
| 2009/0283021 | A1 * | 11/2009 | Wong | B23K 37/0461 108/116 |
| 2013/0115032 | A1 * | 5/2013 | Westwood | B23K 37/0435 414/433 |
| 2014/0015186 | A1 * | 1/2014 | Wessel | B23Q 1/037 269/97 |
| 2014/0259663 | A1 * | 9/2014 | Scelsi | B25H 1/0007 29/888.01 |
| 2015/0026959 | A1 * | 1/2015 | Dumas | B25B 11/00 29/559 |
| 2015/0048564 | A1 * | 2/2015 | Archer | B05B 13/0221 269/58 |
| 2015/0075410 | A1 * | 3/2015 | Wong | B23K 26/38 108/28 |
| 2015/0108418 | A1 * | 4/2015 | Chang | B27B 5/10 254/418 |
| 2015/0174705 | A1 | 6/2015 | Schwartz | |
| 2016/0001441 | A1 * | 1/2016 | Osterhout | B25H 1/02 108/5 |
| 2016/0332265 | A1 | 11/2016 | Tsui | |
| 2017/0087673 | A1 | 3/2017 | Tsui | |
| 2017/0203395 | A1 * | 7/2017 | Wessel | B23K 37/0461 |
| 2017/0291281 | A1 | 10/2017 | Tsui | |

FOREIGN PATENT DOCUMENTS

| | | | |
|---|---|---|---|
| FR | 2987827 A3 * | 9/2013 | ......... B05B 13/0221 |
| KR | 101472109 | 12/2014 | |
| RU | 2445201 | 3/2012 | |

OTHER PUBLICATIONS

Pictures of Stronghands table taken on or before Feb. 19, 2015, 2 pages.
Pictures of StrongHand table, taken at FABTECH Show, Las Vegas, Nevada, Nov. 18, 2016.
International Application No. PCT/US2016/056578, Notification of Transmittal of the International Search Report and the Written opinion of the International Searching Authority, dated Jan. 19, 2017, 8 pages.
Pictures of Rotating Platform and Fixturing Platform received from United Technologies (formerly ROHR Industries) (Manufacturer and date of manufacture/sale not known), 2016, 3 pages.
Workshops for Warriors table shipped to Stronghands, on or about Oct. 13, 2015, 2 pages.
Workshops for Warriors table at FABTECH Show, Las Vegas, Nevada, on or about Nov. 10, 2015, 5 pages.

* cited by examiner

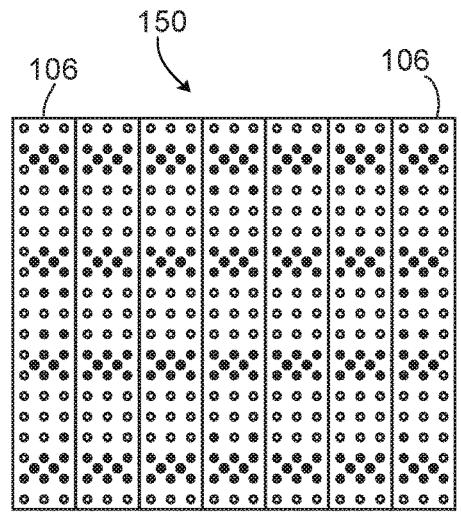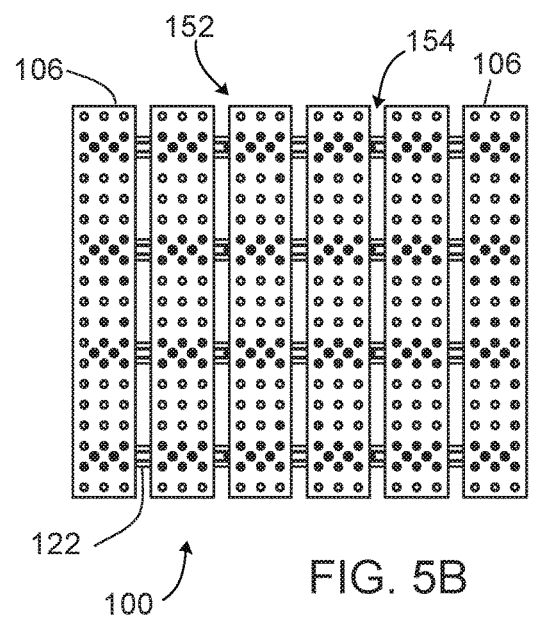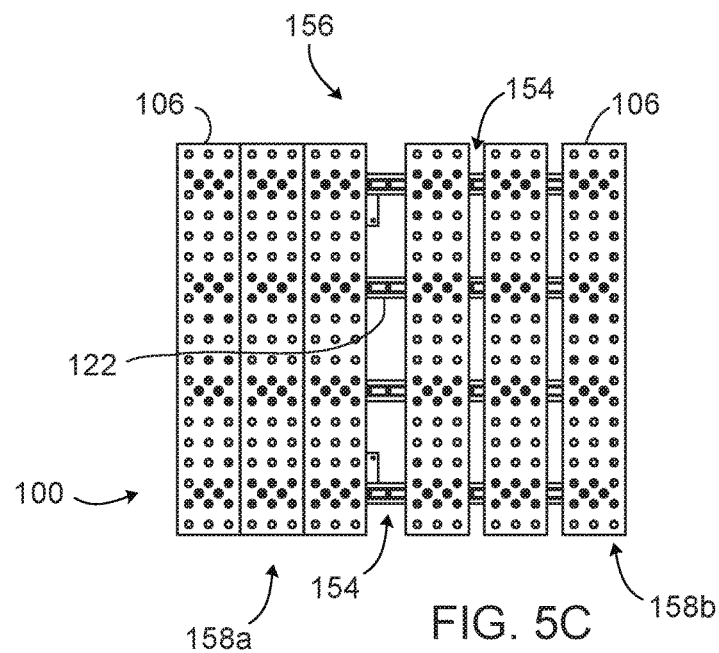

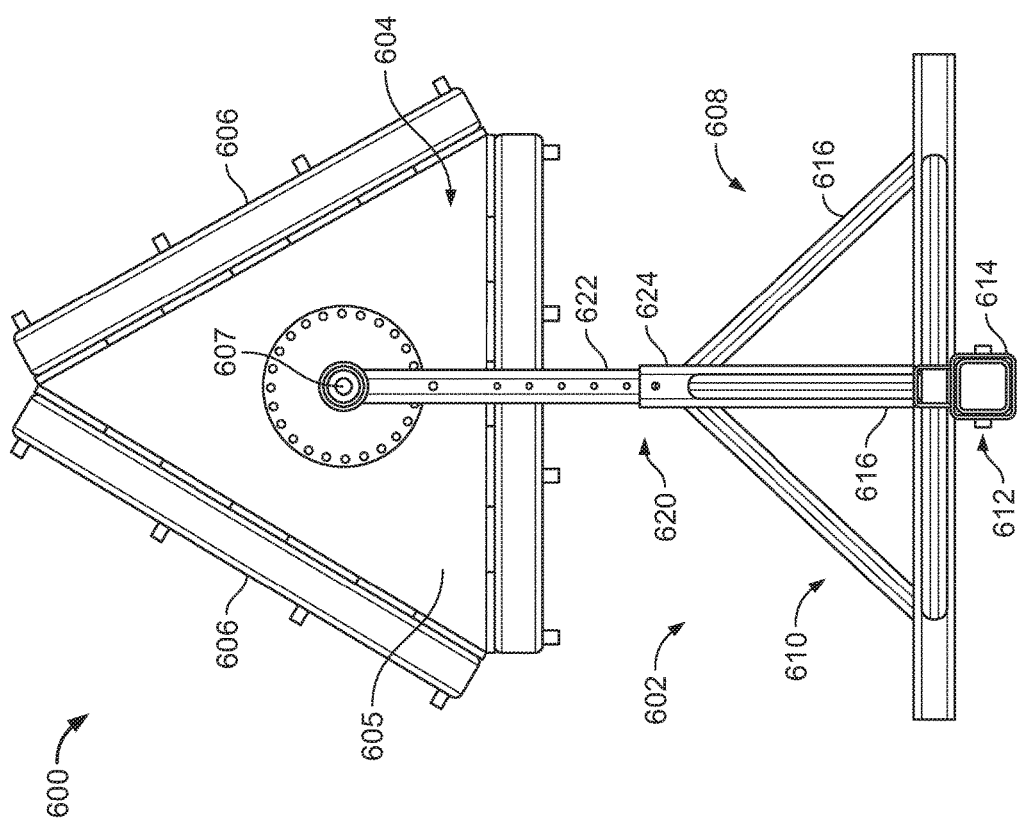

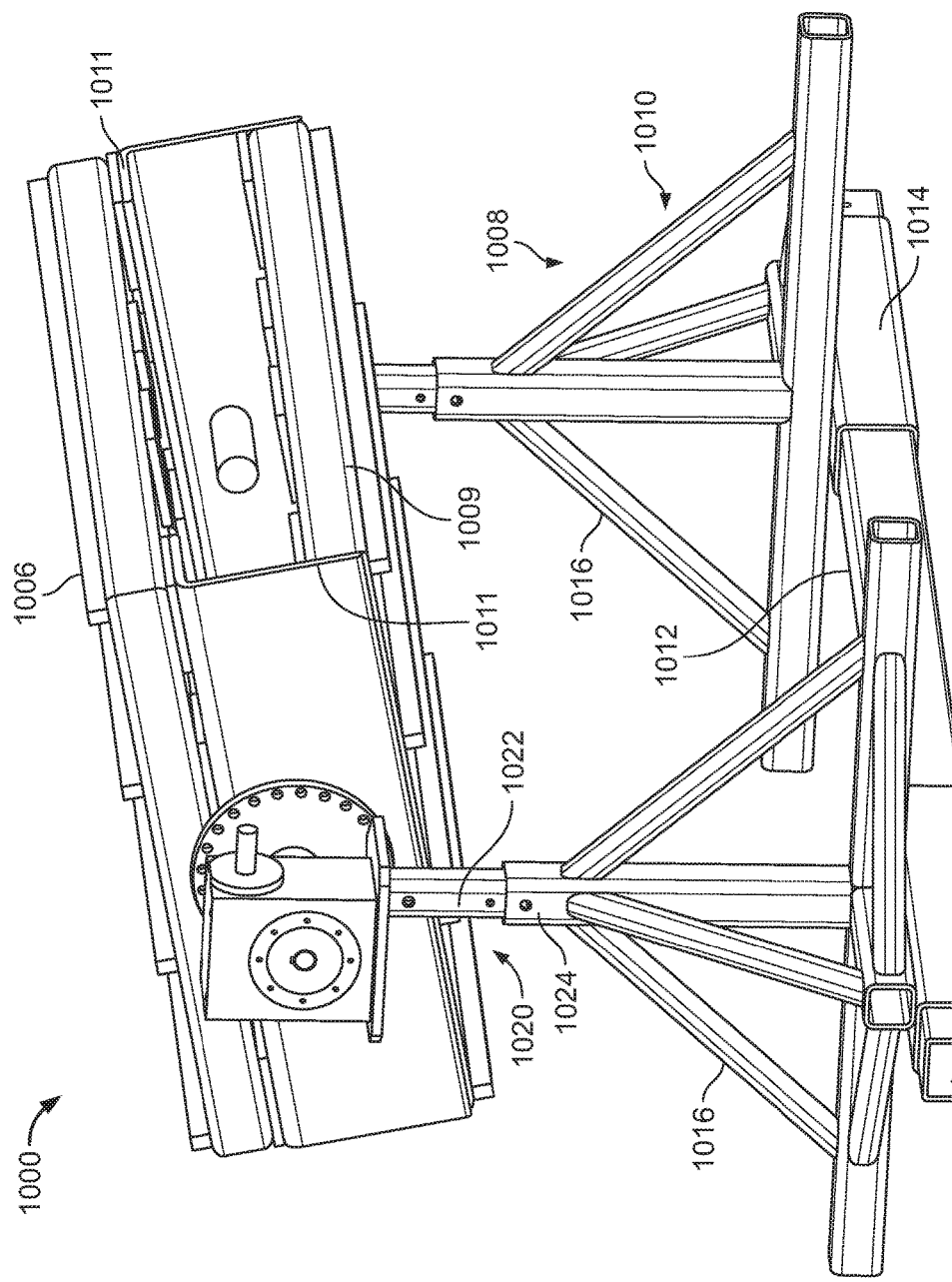

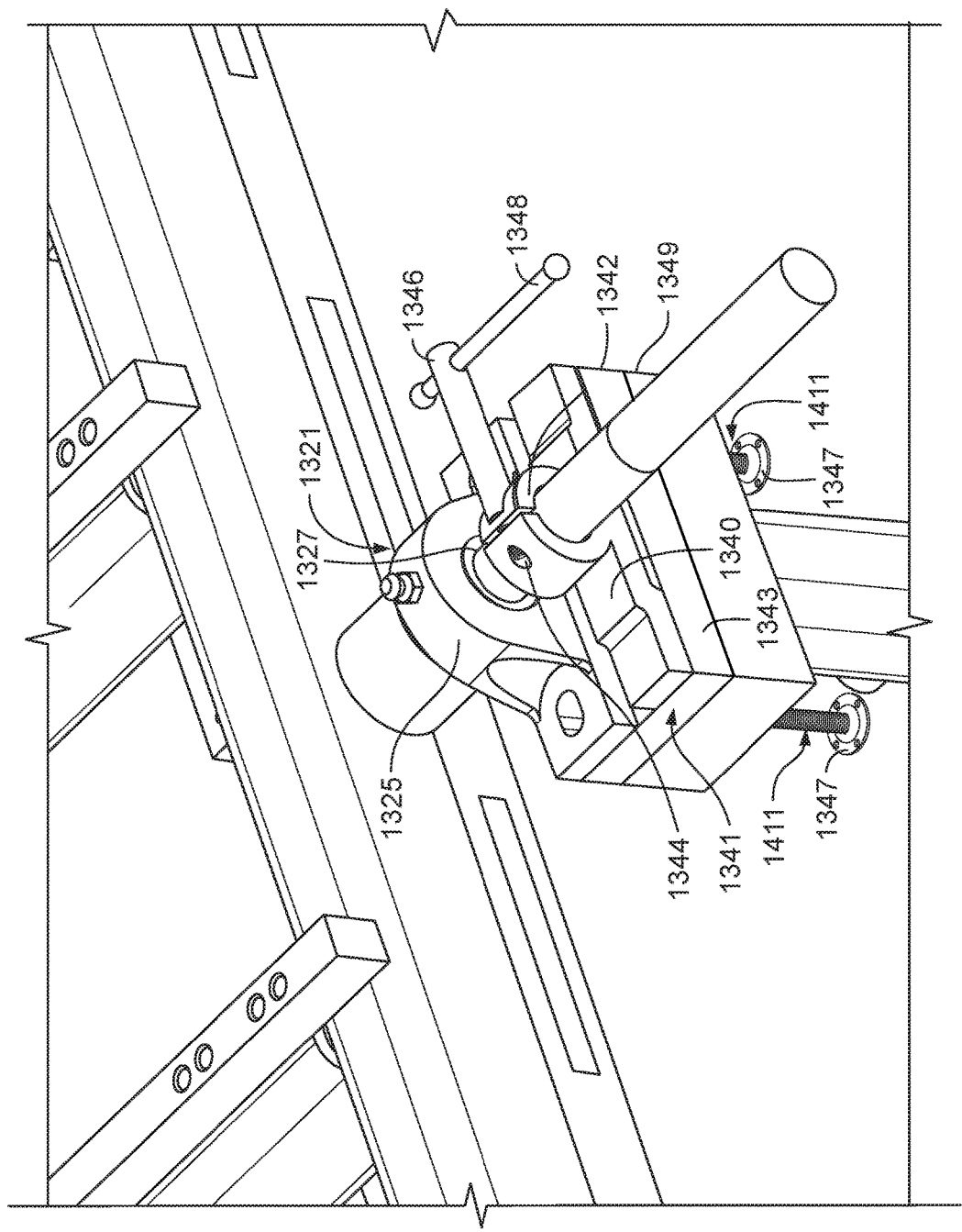

ROTATABLE FIXTURING PLATFORM

CROSS-REFERENCE TO RELATED APPLICATIONS

This application is a continuation-in-part application of and claims priority to U.S. application Ser. No. 14/881,068, filed Oct. 12, 2015, the contents of which are incorporated herein by reference.

BACKGROUND

Welding tables are used to secure work pieces for welding. A welding table typically has a surface with an array of holes to hold fixturing and other tools. The fixturing tools hold work pieces in alignment during welding. In this way, welding tables allow complex work pieces to be efficiently welded.

SUMMARY

In general, one innovative aspect of the disclosure can be embodied in a rotatable fixturing platform having a rotisserie, a modular fixturing platform, and a mounting assembly. The rotisserie includes a base with an extensible frame. The extensible frame includes a plurality of support assemblies and a plurality of extensible arms. Each extensible arm extends from one of the support assemblies and has a bearing. The mounting assembly includes a plurality of mounting brackets coupled to the fixturing platform and an axle assembly. The axle assembly is secured to the bearings of the extensible arms.

In one aspect, the mounting frame configurations may include L shaped mounting brackets, bar mounting brackets, a circular mounting bracket, or flat mounting brackets for mounting one or multiple fixturing platforms or tables. The mounting brackets may mount a plurality of modular fixturing platforms to the rotisserie for rotation and use. A center frame member may extend between and connect the support assemblies. The center frame member may be received into mating receptacles of the support assemblies. The center frame member may have a hexagonal shape, a circular shape, or a square shape. For the square shape, each side of the center frame member may be perpendicular or parallel to vertical or 45 degrees from vertical.

In other aspects, the bearings of the extensible frame may be pillow bearings. One or more axle brakes may be mounted to the extensible arms and selectively secure the axle assembly against rotation. A gear box may be provided on the extensible frame to manually rotate the modular fixturing platform by hand. Also, a servo motor sprocket may be fixed to the axle assembly for automated rotation of the modular fixturing platform. The axle assembly may be connected directly to a robot or robotic arm in order to automate the loading, offloading, and rotation of parts and fixtures. Casters or other types of wheels may be attached to the bottom of the extensible frame to allow, for example, the rotatable fixturing platform to be readily moved or transported. The bottom of the extensible frame may be dog legged to, for example, lower the center of gravity of the extensible frame.

In another aspect, the rotatable fixturing platform may have a mounting frame for mounting a fixturing platform to the rotisserie. The frame includes a set of ends having edges with at least three sides. Each side sized to receive a fixturing platform. One or more cross members are disposed between and connect the ends. The mounting frame may, for example, be triangular and attach three fixturing platforms, square and attach four fixturing platforms, or hexagonal and attach six fixturing platforms.

The fixturing platform may comprise a table or supported surface such as a welding table, an assembly table, a milling or other machining table, an inspection table, a quality control table, a transport platform for fixturing heavy or bulky loads for movement between stations, a computer numerically controlled (CNC) platform, a solidsworks table and/or a painting table. Advantages of one or more embodiments may include a rigid table or platform with an accurate array of fixturing holes, or points. Other advantages of some embodiments include providing a working surface that may be re-configured to form a continuous, spaced, or hybrid working surface. Also, in some embodiments, a number of pieces may be modular and used for several functions to reduce cost.

Details of one or more aspects of the disclosure are set forth in the accompanying drawings and the description below. Other features, objects, and advantages of the disclosure will be apparent from the description and drawings, and from the claims.

DESCRIPTION OF DRAWINGS

FIG. 3A is front view, FIG. 3B a side view, FIG. 3C a top view, and FIG. 3D a bottom view. FIG. 3E is a top view of the joined slat design. FIG. 3F is a bottom view of the lengthened modular mounting brackets 128 joined slat design.

FIGS. 5A-5C are top views of the various surface plate configurations of the hybrid modular welding table. FIG. 5A shows a continuous working surface, FIG. 5B a spaced working surface, and FIG. 5C a hybrid working surface.

FIG. 7A is a bottom view that shows a stored position and a deployed position of side connector brackets, FIG. 7B is a bottom view that shows a stored position and a deployed position of front and back connector brackets, and FIG. 7C is an isometric view that shows various locations of the modular connector brackets.

FIG. 8A is an isometric view of the extended hybrid modular welding table with surface plates removed, FIG. 8B is a bottom view of the extended hybrid modular welding table with surface plates removed, and FIG. 8C is an isometric view of the extended hybrid modular welding table with surface plates forming an extended continuous working surface.

FIG. 9A is an isometric view of the extended hybrid modular welding table with surface plates removed, FIG. 9B is a bottom view of the extended hybrid modular welding table with surface plates removed, and FIG. 9C is an isometric view of the extended hybrid modular welding table with surface plates forming an extended continuous working surface.

FIG. 10A is an isometric view, FIG. 10B a top view, and FIG. 10C a front view.

FIG. 11A is a perspective view from a first angle, FIG. 11B a perspective view from a second angle, FIG. 11C a front view, and FIG. 11D a side view.

FIGS. 12A-12B are various views of a rotatable fixturing platform having a rotisserie and mounting frame supporting three welding tables. FIG. 12A is a perspective view and FIG. 12B is a side view.

FIG. 13A is a perspective view and FIG. 13B is a side view.

FIG. 14A is a perspective view and FIG. 14B is a side view.

FIGS. 16A-16C are various views of a rotatable fixturing platform having a rotisserie and an L-shaped mounting bracket. FIG. 16A is a perspective view without an attached table, FIG. 16B is a side view of the rotatable fixturing platform with a hybrid modular welding table attached to the L-shaped mounting frame and FIG. 16C is a perspective view of the rotatable fixturing platform with two hybrid modular welding tables attached to the L-shaped mounting frame.

FIG. 17A is a perspective view without an attached table and FIG. 17B is a perspective view of the rotatable fixturing platform with a hybrid modular welding table attached to the bar mounting frame.

FIGS. 19A-19C are various views of a rotatable fixturing platform having a rotisserie and an axle brake, pillow bearing and servo motor sprocket for fixturing platform. FIG. 19A is a perspective view of a manual rotation embodiment, FIG. 19B is a detailed view of the axle brake and FIG. 19C is a perspective view of a motorized rotation embodiment.

FIG. 20A is a perspective view with a 45 degree cross member, FIG. 20B is a perspective view with a triangular cross member, FIG. 20C is a perspective view with a round cross member, and FIG. 20D is a perspective view with a hexagonal cross member.

FIG. 21A is a perspective view with dogged legged frame having a center frame member and FIG. 21B is a perspective view with dogged legged frame not having a center frame member.

Like reference symbols in the various drawings indicate like elements.

DETAILED DESCRIPTION

Figure 1:
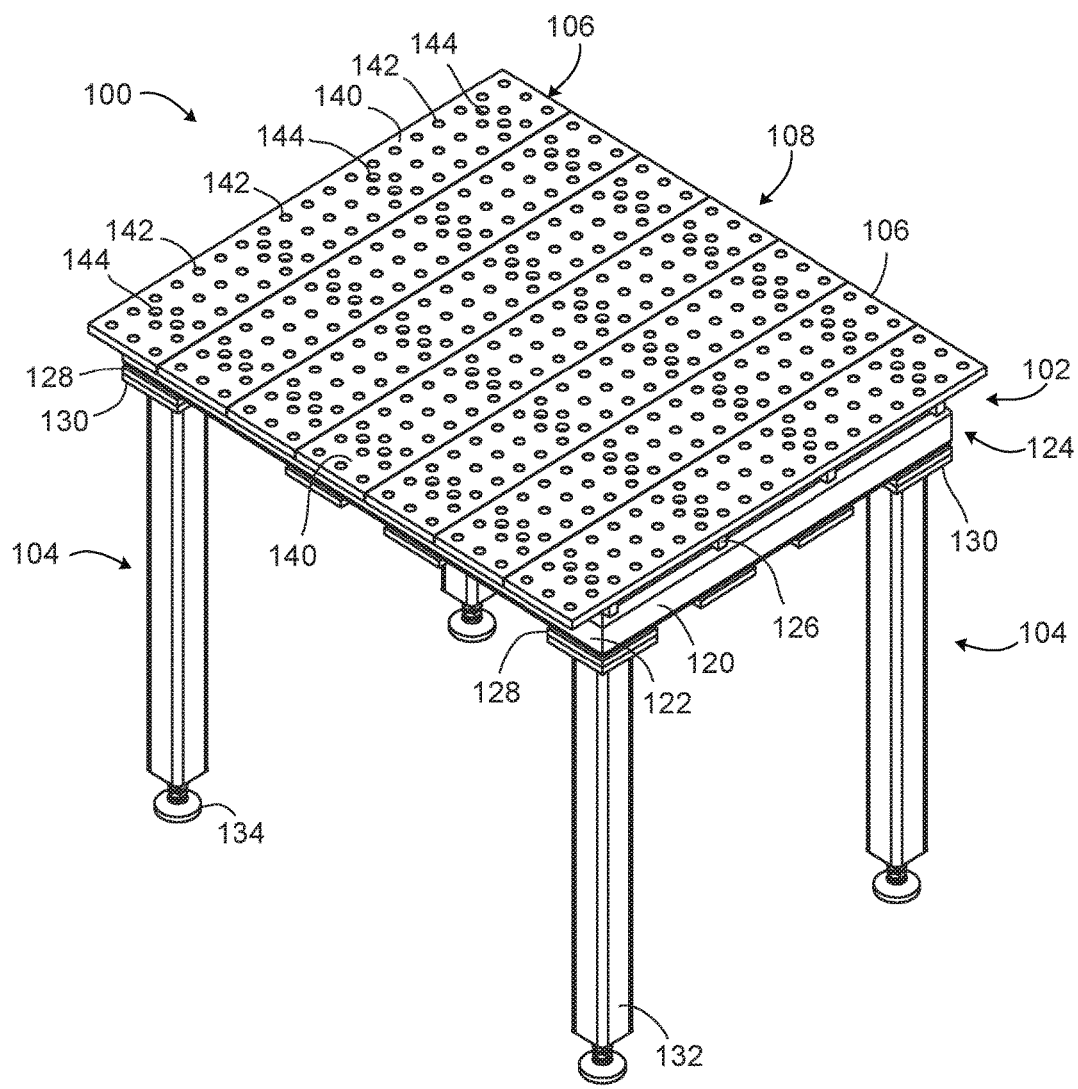
FIG. 1 is an isometric view of a hybrid modular welding table.

FIG. 1 illustrates a hybrid modular fixturing platform 100. The hybrid modular fixturing platform 100 may comprise, for example, a table or supported surface such as a welding table, an assembly table, a milling or other machining table, an inspection table, a quality control table, a transport platform for fixturing heavy or bulky loads for movement between stations, a computer numerically controlled (CNC) platform, a solidsworks table and/or a painting table. While the hybrid modular fixturing platform 100 will be described generally as a welding table, it may be as any suitable platform to fixture work pieces for work. For example, the hybrid modular fixturing platform 100 may comprise a working surface supported on a rotisserie, or rotary positioner as described in FIGS. 11A-11D and FIGS. 12-14 and 16-21.

As discussed in more detail below, the hybrid modular welding table 100, in one aspect, allows the working surface to be configured to a number of configurations. In another aspect, the hybrid modular welding table 100 allows the use of modular brackets for attaching components to the table, including, for example, the legs, other welding tables, off-table workspaces and/or other suitable attachments and accessories. In still other aspects, the hybrid modular welding table 100 may be rigid, provide an accurate grid pattern for precise fixturing of work pieces for welding at tight tolerances, be stable and/or reduce vibration. The hybrid modular welding table 100 may also be portable. In some embodiments, the welding table may be implemented as a hybrid non-modular table or as a modular non-hybrid table.

Referring to FIG. 1, hybrid modular welding table 100 comprises a frame assembly 102, a plurality of leg assemblies 104, and a plurality of surface plates 106 forming a working surface 108. In the illustrated embodiment, the surface plates 106 touch, are immediately next to, or abut each other to form a continuous working surface 108. The continuous working surface 108 is a working surface without appreciable gaps or, for example, gaps of less than a half inch, a quarter inch, 10 centimeters, or 5 centimeters. The surface plates 106 may instead be secured to the frame assembly 102 in a spaced configuration or a hybrid configuration.

The frame assembly 102 has a plurality of side members 120 and a plurality of cross members 122 forming a frame 124. The side and cross members 120 and 122 may together comprise the edge members of the frame assembly. The edge members may be welded together to form a rigid frame 124.

A plurality of bars 126 extend from edge to edge, or longitudinally in one embodiment, across the frame 124. The bars 126 may be continuous along their length to enhance spacing flexibility of the continuous, spaced, and hybrid working surface configurations. In other embodiments, the bars 126 may be discontinuous and/or comprise a plurality of members. The bars 126 may extend on top of or in connection with the cross members 122 of the frame 124 as illustrated or may be offset from the cross members 122, comprise additional or fewer bars 126 than cross members 122. For example, two bars 126 may be used in a particular embodiment. In another embodiment, the cross members 122 or other part of the frame 124 may also serve as or be the bars 126, eliminating the need for separate bar structures. Thus, the surface plates 106 may be directly or otherwise connected to the cross members 122 or other part of the frame 124. For example, the cross bars 122 may be threaded and fasteners used to attached surface plates 106 to the cross members 122.

The bars 126 may be rectangular tubes and threaded as in the illustrated embodiment. In other embodiments, the bars may not be threaded and/or may be solid. Thus, the bar 126 may be smooth, and comprise bossing or other surface features for securing and/or positioning the surface plates 106. The bars 126 will be generally described as threaded bars 126.

A plurality of modular mounting brackets 128 may be coupled to the frame 124. An element may be coupled to another element when directly or indirectly connected to the other element. Elements may be connected or otherwise coupled by welding, fastening, screwing, bolting together the elements, or other elements connected to the elements. The modular mounting brackets 128 may be interchangeable without modification to allow attachment of leg members 104, as well as other components. In the illustrated embodiment, the modular mounting brackets 128 may be modular plates welded to the bottom of the frame 124.

The leg assemblies 104 may each comprise a modular leg mounting bracket 130, a leg 132, and a foot 134. Each leg 132 may be welded to one of the modular leg mounting brackets 130, and each modular leg mounting bracket 130 may be fastened to a corresponding modular mounting bracket 128. In one embodiment, the modular leg mounting bracket 130 may comprise a mounting flange and the modular mounting bracket 128 a mating bracket. The modular mounting brackets 128 and 130 may be the same size and include corresponding holes for attaching the legs 132 to the frame assembly 102. The modular mounting brackets 128 may be lengthened and extend from one end of the table to the other. However, in one embodiment, the modular mounting brackets 128 comprise threaded holes, while the modular leg mounting brackets 130 comprise through holes such that fasteners such as bolts may pass through the modular leg mounting brackets 130 to secure modular mounting brackets 128. Thus, the modular leg mounting brackets 130 and modular mounting brackets 128 may be interchangeable without modification prior to drilling or forming their respective holes and/or have a same size and attachment points.

Each leg 132 may comprise a tube, such as a square tube, rectangular, or circular tube. The foot 134 may be threaded into the leg 132 or otherwise coupled to the leg 132. In the embodiment where the foot is threaded, it may be vertically adjustable to level the hybrid welding table 100. The foot 134 may comprise a leveling swivel (be self-leveling) or, for example, comprise a caster to allow the hybrid modular welding table 100 to be easily moved and secured in place with caster brakes.

The surface plates 106 may each comprise a slat 140 with a plurality of fixturing holes 142 and attachment points 144. The fixturing holes 142 are configured to receive and hold fixturing tools and may be through holes. The attachment points 144 may comprise recessed holes to allow the surface plates to be removably fastened on to the bars 126 of the frame assembly 102. The attachment points 144 may align with attachment points, or threaded holes in one embodiment, or on the bars 126 for a plurality of working surface configurations.

Figure 2A:
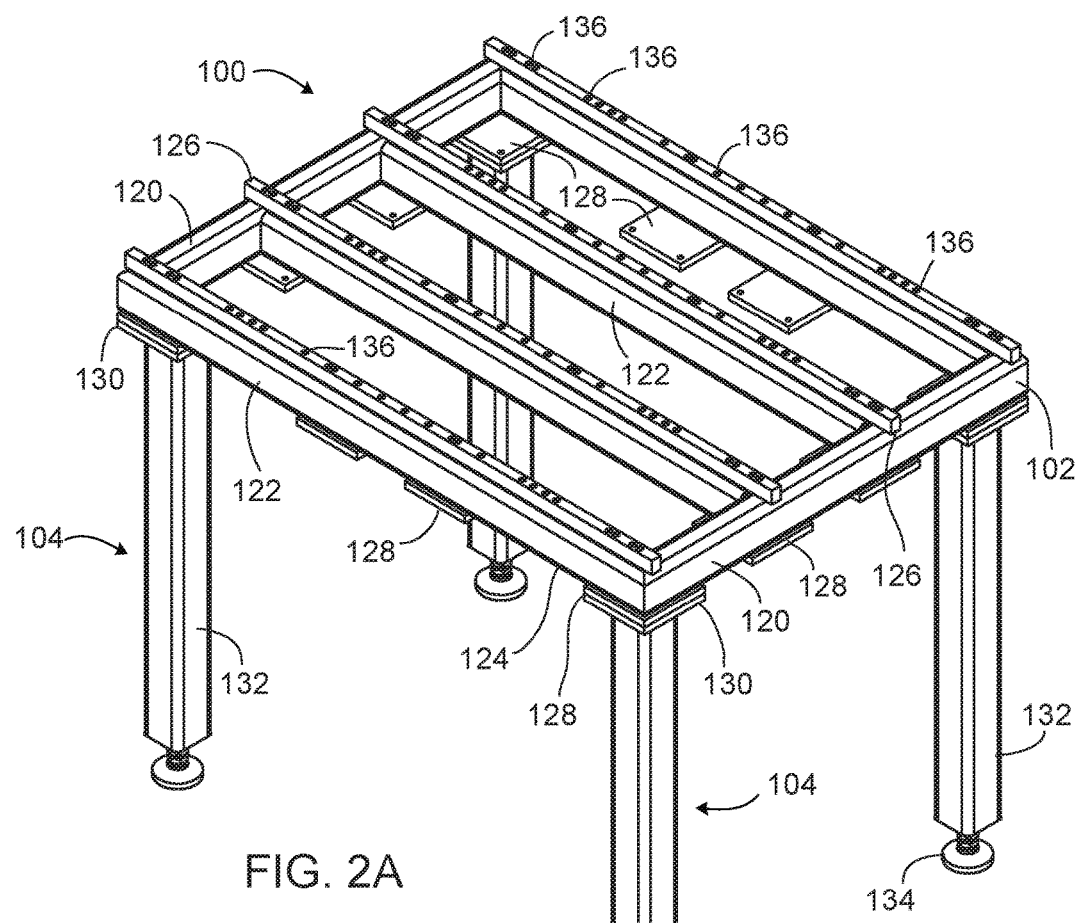
FIGS. 2A-2B are various views of the hybrid modular welding table with surface plates removed to show details of the frame assembly.

FIG. 2A illustrates the hybrid modular welding table 100 with the surface plates 106 removed. Referring to FIG. 2A, the side members 120 and cross members 122 of the frame 124 may be 2 inch by 4 inch rectangular tubes. Other suitably sized end members 120 and cross members 122 may be used. In the illustrated embodiment, the frame 124 comprises two end members 120 and four cross members 122. The frame 124 may comprise fewer, additional, or other members. The end members 120 and cross members 122 may comprise steel or other suitable material and be welded together to enhance rigidity. It will be understood that the members of the frame 124 may be otherwise fastened, secured, or connected together.

The threaded bars 126 may be ¾ inch×¾ inch square tubes. The threaded bars 126 may have a milled surface to be uniform within, for example, a thousandths or a few thousandths of an inch. The threaded bars 126 may be comprised of steel or other suitable material and be welded to the end members 120 and cross members 122 of the frame 124 to enhance rigidity. It will be understood that fewer or additional threaded bars 126 may be provided and that the threaded bars 126 may be otherwise fastened, secured, or connected to the frame 124.

The threaded bars 126 include a plurality of attachment points, or in the illustrated embodiment, threaded holes 136 for attachment of the surface plates 106. The threaded holes 136 are spaced, in one aspect, to allow the plates 106 to be positioned in a continuous workspace configuration, a spaced workspace configuration, or hybrid workspace configuration. Spacing of the threaded holes 136 may be as described below in connection with FIG. 3C. The continuous workspace configuration, spaced workspace configuration, and hybrid workspace configurations are described below in connection with FIGS. 5A-5C.

The modular mounting brackets 128 may be 5 inch×5 inch plates of half inch thick steel or other suitable material. In the illustrated embodiment, the frame assembly 102 comprises twelve modular mounting brackets 128, one at each corner of the frame 124 and two additional ones on each edge (front, back, and sides) for attachment of other components to the hybrid modular welding table 100. The modular mounting brackets 128 may be welded to the frame 124 to enhance rigidity.

Fewer, additional or different modular mounting brackets 128 may be provided. In addition, the modular mounting brackets 128 may be otherwise fastened, secured, or connected to the frame 124. Further, for example, some of the modular mounting brackets 128 may be combined into a single bracket such as along the edges of the frame assembly 102. Further details of the modular mounting brackets 128 are described in connection with FIGS. 3A-3F.

The frame assembly 102 may be supported, or held in spaced relation with a floor or other surface, by four leg assemblies 104. The leg 132 of each leg assembly 104 may be 4 inch×4 inch square tube of steel or other suitable material to enhance rigidity. The leg assemblies 104 may be removably fastened to corresponding modular mounting brackets 128 of the frame assembly 102. In one embodiment, the leg assemblies 104 may be bolted to the frame with a bolt at each of a plurality of attachment points. For example, four bolts may be used in one embodiment to enhance rigidity. The multiple points of attachment between the brackets 128 and 132 in connection with the welding of the leg 132 to the bracket 130 provides rigid connection between the leg assemblies 104 and the frame assembly 102. The rigid connection may be highly or completely inflexible under normal loads. It will be understood that fewer or additional leg assemblies 104 may be provided and that the leg assemblies 104 may be otherwise fastened, secured, coupled, or connected to the frame assembly 102.

Figure 2B:
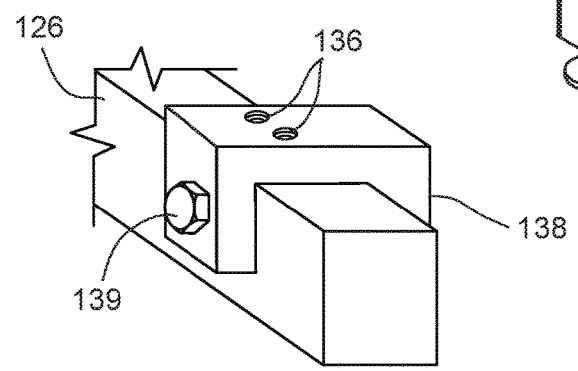

FIG. 2B illustrates an embodiment of the hybrid modular welding table 100 with threaded holes 136 for attachment of the surface plates 106 disposed in brackets 138, rather than directly on the bar 126. In this embodiment, the bar 126 may be smooth and rectangular. The bar 126 may, in this embodiment, have one or more grooves or other surface features for retaining the bracket 138 and/or aiding positioning of the bracket 138 along the bar 126. As described above, the cross members 122 may also serve as the bars 126. In this embodiment, the brackets 138 may directly or otherwise attach to the cross members 122 or other part of the frame 124.

Referring to FIG. 2B, the bracket 138 may comprise a slidable bracket 138 coupled to the bar 126. In this embodiment, the slidable bracket 138 may ride directly on the bar 126. The slidable bracket 128 may comprise bearings or other elements to aid sliding along, positioning relative to and/or securely to the bar 126. In the illustrated embodiment, the slidable bracket 138 comprises a C-shaped bracket with the threaded holes 136 along a top for fastening of the surface plates 106. A fastener 139, such as a bolt or screw, may be threaded within and pass through the slidable bracket 138 to secure, clamp and/or lock the slidable bracket 138 to the bar 126 at any location or position along the bar 126. An element may be locked in place when it is fixed, clamped, or otherwise secured such that it does not move or does not move in normal use or operation of the platform. The slidable bracket 138 may be otherwise secured and/or positioned to the bar 126. For example, a U-shaped bracket may be used with the U of the bracket 138 under the bar 126 (in this embodiment the bars 126 are offset or spaced from the cross members 122) and tightened to the bar 126 when fasteners inserted through the surface plates 106 are tightened into threaded holes 136 on the top/ends of the U-shaped bracket 138. Other suitable friction, clamping, or other securement devices may be used.

Figure 3A:
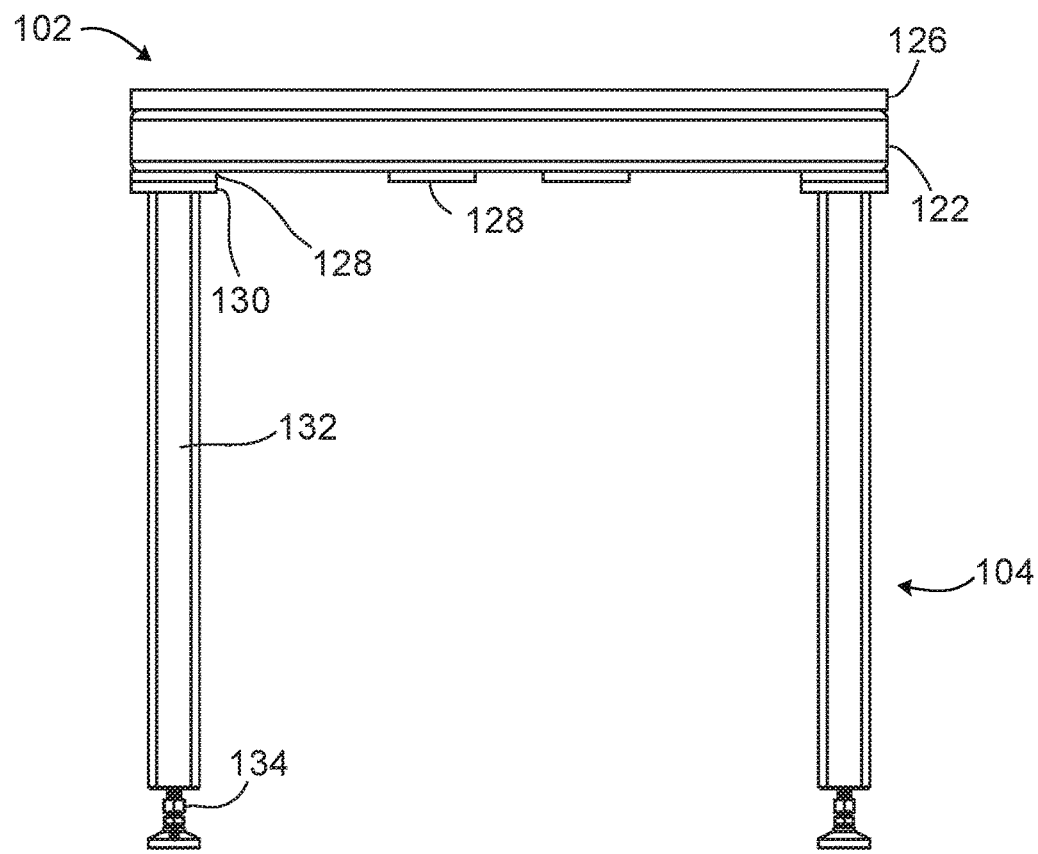
FIGS. 3A-3F are various views of the hybrid modular welding table with surface plates removed.

FIGS. 3A-3D are various views of the hybrid modular welding table 100 with the surface plates removed. FIG. 3A is a front view showing a threaded bar 126 attached to a cross member 122. In this configuration, the threaded bar 126 and the cross member 122 may have the same length. In other configurations, the threaded bar 126 and cross member 122 may have different lengths. For example, the threaded bar 126 may be shorter or longer than the cross member and may, for example, terminate at least proximate to the cross member 122. The modular mounting brackets 130 of the leg assemblies 104 are attached to the modular mounting brackets 128 of the frame assembly 102. In the illustrated embodiment, the distance from the top of the threaded bar 126 to the bottom of the leg 132 may be 34.1 inches with a spacing of 36 inches between the legs 132 along the front (and back) of the table 100.

Figure 3B:
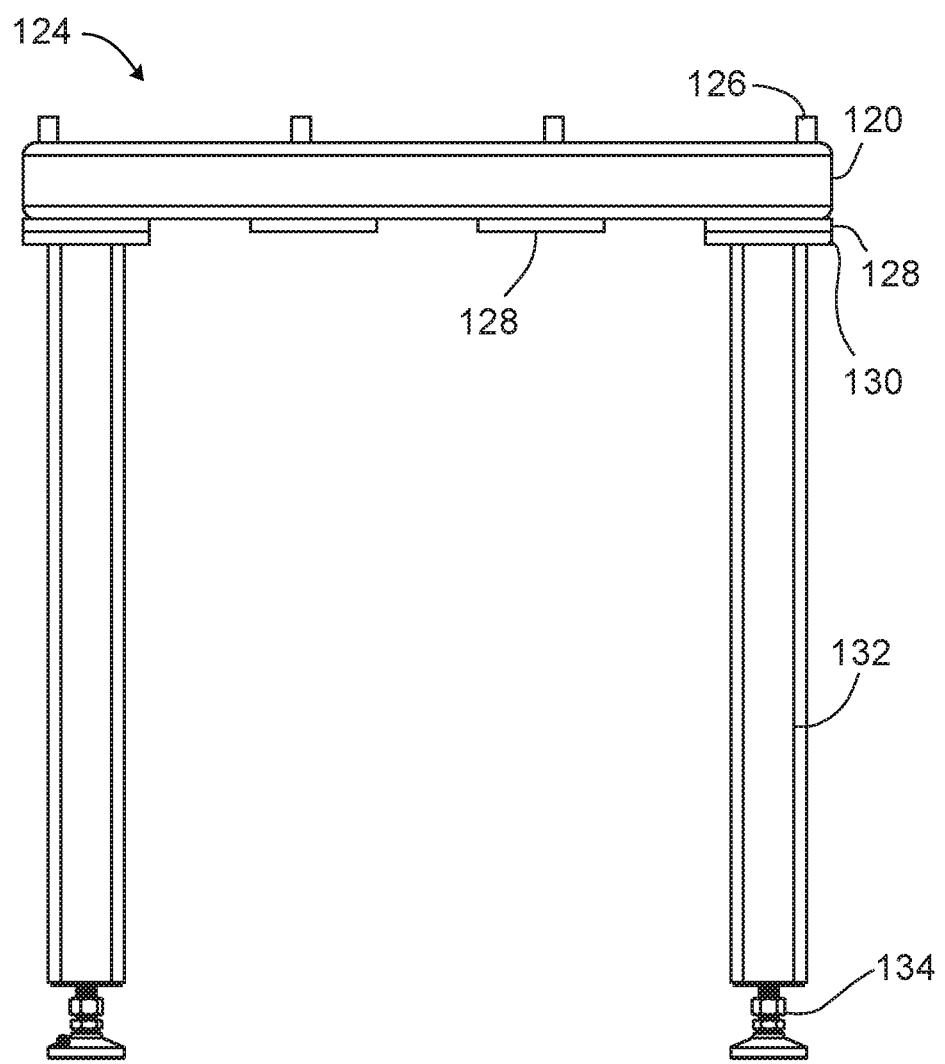

FIG. 3B is a side view showing four threaded bars 126 attached to a side member 120. The side member 120 and cross members of the frame 124 support the threaded bars 126, which in turn support the surface plates 106 of the working surface 108 (of FIG. 1). The frame 124 may comprise other, different, or fewer elements. In the illustrated embodiment, the distance from the top of the threaded bar 126 to the bottom of the leg 132 may be 34.1 inches with a spacing of 24 inches between the legs 132 along the sides of the table.

Figure 3C:
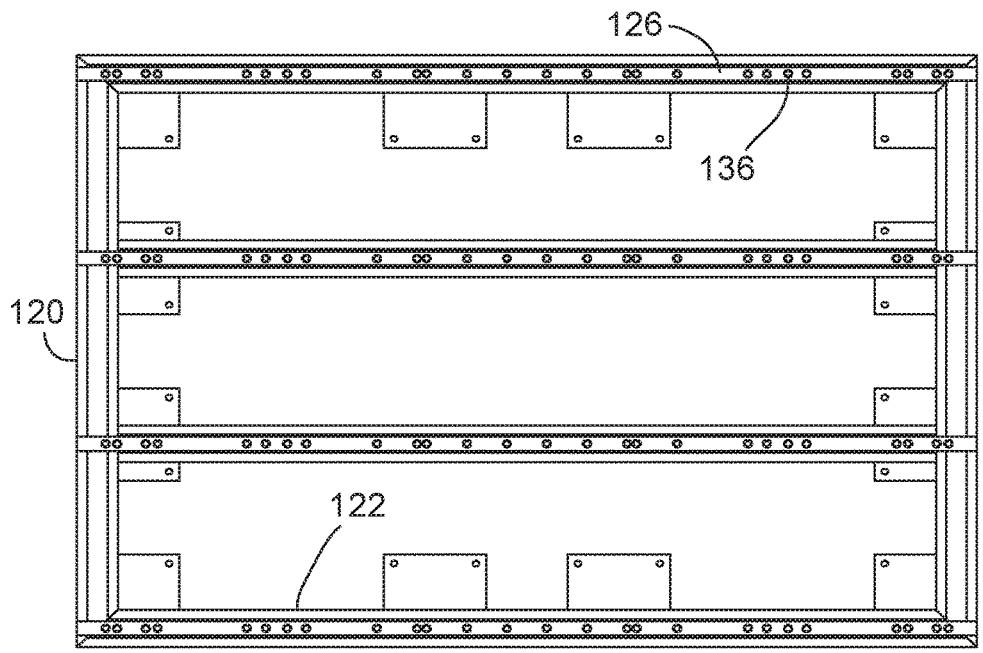

FIG. 3C is a top view of the hybrid modular welding table 100 with the surface plates removed showing the location or spacing of the threaded holes 136 of the threaded bar 126. The threaded holes 136 may be located to align with the attachment points, or holes, 144 of the surface plates 106 in one, more, or all of the continuous workspace configuration, the spaced workspace configuration and/or the hybrid workspace configuration. Thus, the location and spacing of the threaded holes 136 may vary with the dimensions of the surface plates 106 and location of the attachment points 144.

Exemplary spacing of the threaded holes 136 from left to right in the illustrated embodiment is listed in Table 1. In this embodiment, the frame 124 may be 32 inches×44 inches, the threaded bars 126 may be 44 inches in length and spaced 10 inches apart center bar to center bar. The threaded holes 136 may each be ⅜ inch-16 UNC.

TABLE 1

| Hole Number | Location |
|---|---|
| #1 | 1.393 |
| #2 | 1.966 |
| #3 | 3.361 |
| #4 | 3.934 |
| #5 | 8.316 |
| #6 | 9.242 |
| #7 | 10.284 |
| #8 | 11.210 |
| #9 | 14.666 |
| #10 | 16.634 |
| #11 | 17.091 |
| #12 | 19.060 |
| #13 | 21.016 |
| #14 | 22.984 |
| #15 | 24.940 |
| #16 | 26.909 |
| #17 | 27.366 |
| #18 | 29.334 |
| #19 | 32.790 |
| #20 | 33.716 |
| #21 | 34.758 |
| #22 | 35.684 |
| #23 | 40.066 |
| #24 | 40.639 |
| #25 | 42.034 |
| #26 | 42.607 |

Figure 3D:
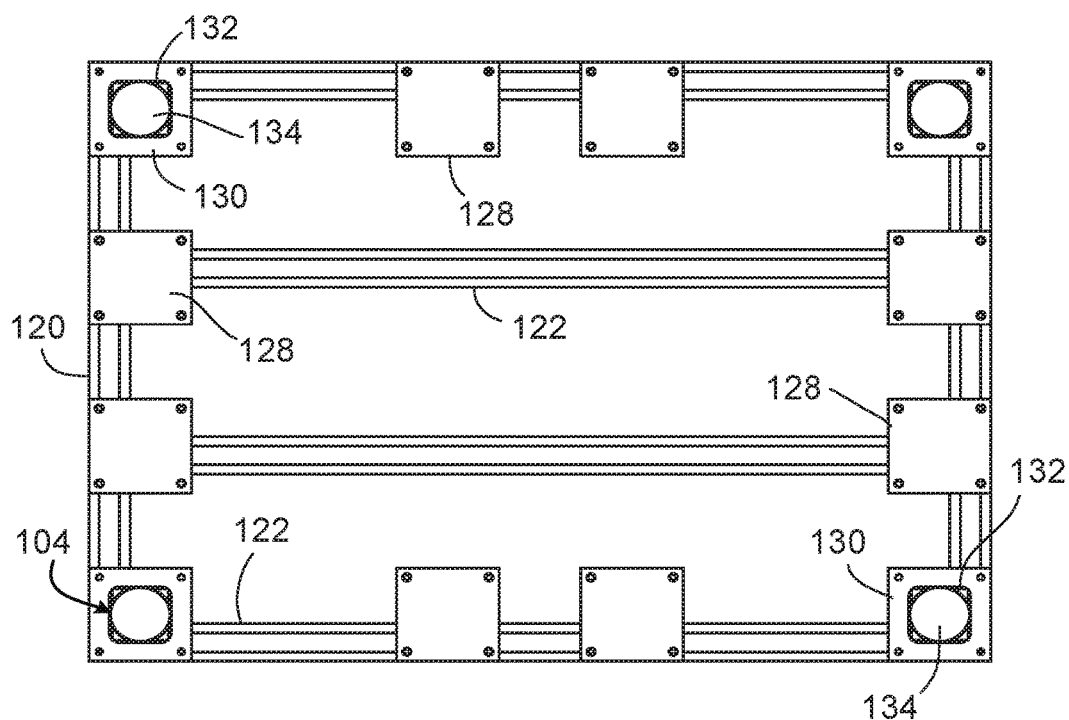
Figure 3E:
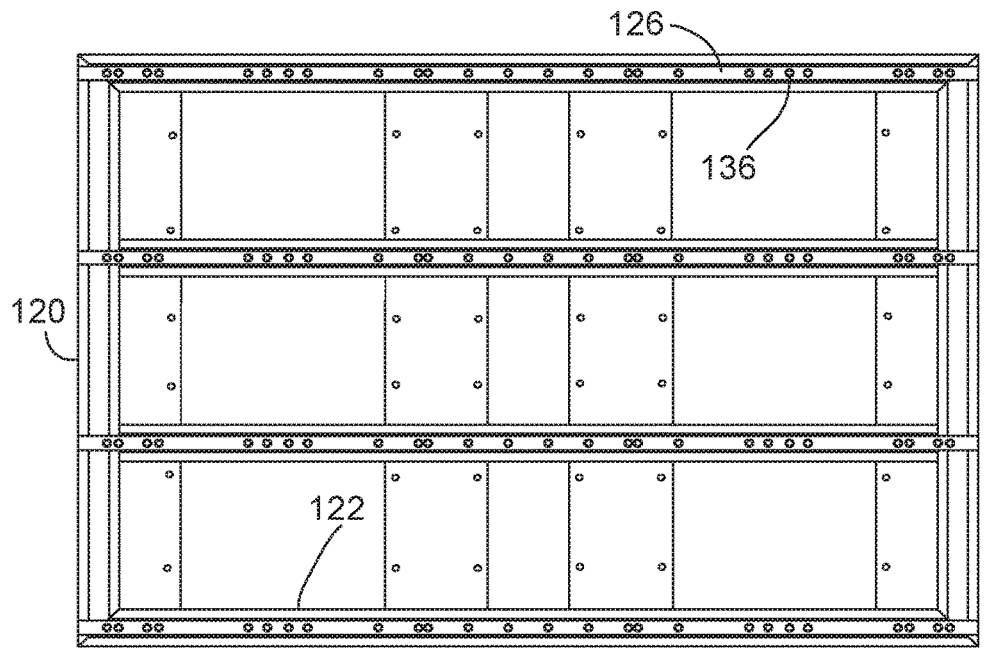
Figure 3F:
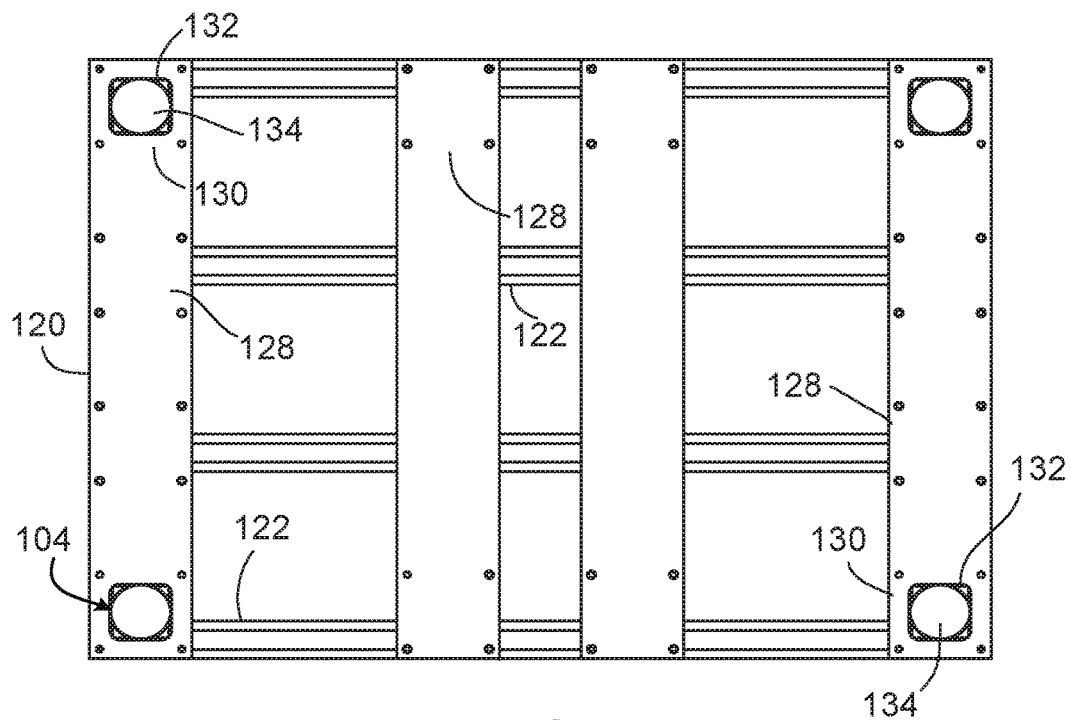

FIG. 3D is a bottom view of the hybrid modular welding table 100 with the surface plates removed. In the illustrated embodiment, the legs 132 of the leg assemblies 104 are attached to the modular leg mounting brackets 130 which are each bolted with four bolts to the modular mounting bracket 128. In other embodiments, the leg assemblies 104 may be omitted and the frame assembly 102 with surface plates 106 used as a welding or other platform coupled to, for example, a support or movable bed. FIGS. 3E-F are top and bottom views of the lengthened modular mounting brackets 128 of a joined slat design.

In the illustrated embodiment, the modular mounting brackets 128 interior to the corners on each edge may be spaced 4 inches from each other, with 34 inches between the corner modular leg mounting brackets 130 on the front and back, and 22 inches between the modular leg mounting brackets 130 on the sides. Each modular leg mounting bracket 130 comprises four ⅜ inch through holes with the modular mounting brackets 128, each comprising four ⅜ inch-16 UNC holes. One or more of the mounting brackets may be omitted or combined with another mounting bracket. Thus, for example, a single interior mounting bracket 128 may be provided on each edge.

Figure 4:
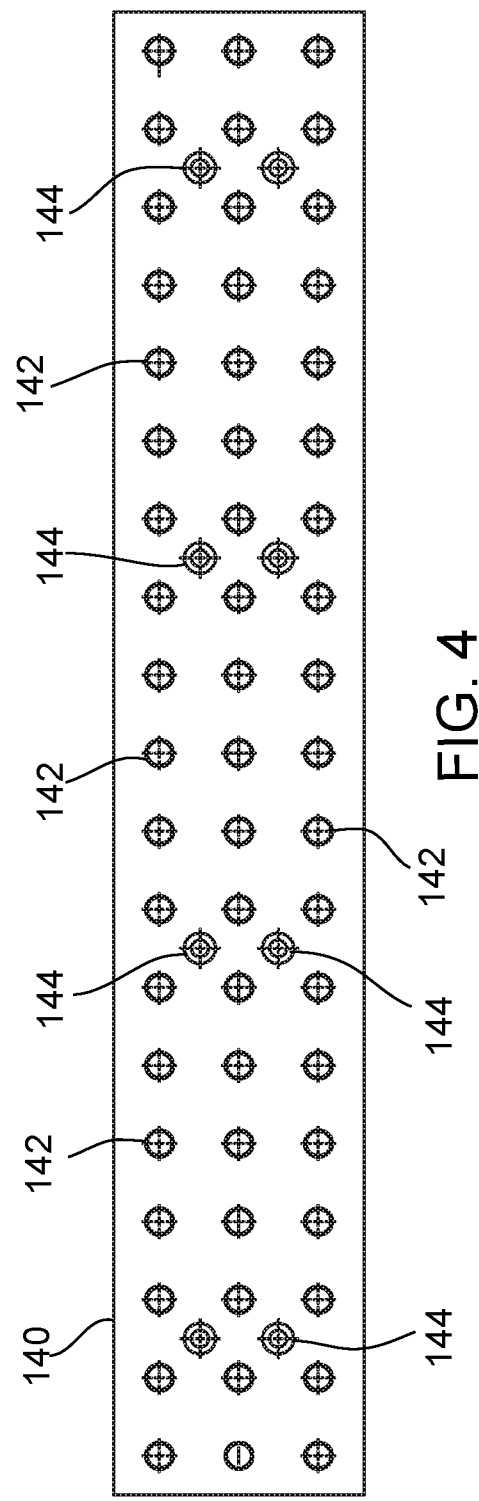
FIG. 4 is a top view of a surface plate of the hybrid modular welding table.

FIG. 4 is a top view of the surface plate 106 of the hybrid modular welding table 100. In one embodiment, each surface plate may comprise a slat 140 that is flat, level, or substantially flat or level. The slat 140 may be steel and be 38 inches by 6.299 inches and 0.630 inches thick. The slat 140 may have other dimensions, configurations, and be made of other suitable materials.

Referring to FIG. 4, the fixturing holes 142 may each be 0.625 inches in diameter and be offset 2 inches center hole to center hole to form an array of 57 fixturing holes on each surface plate 106 and the working surface 108. The fixturing holes 142 may be counterbored or countersunk in order to allow the slat 140 to be fastened to the modular welding table with the fasteners flush or below the top work surface of the slat 140. The fixturing holes 142 may have other suitable dimensions and be otherwise spaced. For example, the fixturing holes 142 may have a uniform or non-uniform longitudinal distribution across the workspace 108 when the plates 106 are in a continuous configuration.

The attachment holes 144 may each be 0.787 inches in diameter, and may be positioned in four sets of two, one set to attach to each threaded bar 126. The sets, or pairs, may be offset 10 inches center hole to center hole with each other and the holes of each set offset 1.969 inches center hole to center hole. Each attachment hole 144 may be recessed, with an upper portion comprising a 0.787 diameter to a depth of 0.413 inches. The attachment holes 144 may also have other suitable dimensions. For example, the location and spacing of the attachment holes 144 may vary based on the location and spacing of the threaded holes 136 or attachment points of the frame assembly 102.

FIGS. 5A-5C are top views of various plate spacing configurations of the hybrid modular welding table 100 which allow alternative working surfaces 108. Thus, the working surface can be set to one configuration and freely changed to other configurations as needed.

FIG. 5A shows a continuous working surface 150. In this configuration, the surface plates 106 are secured or connected to the frame assembly 102 to be next to, touching, abutting, or in close proximity to each other such that the working surface 108 is continuous in that the fixturing holes are substantially uniform and/or no appreciable gaps exist between the plates 106. A continuous working surface 150 may be preferred when gaps are not needed and/or additional or a maximum number of fixturing tool holes are desired.

FIG. 5B shows a spaced working surface 152 for the hybrid modular welding table 100. In this configuration, the surface plates 106 are secured or connected to the frame assembly with grooves or gaps 154 between the surface plates 106 such that the working surface 152 is not continuous and work pieces and/or fixturing tools may be positioned between the surface plates 106. In the illustrated embodiment, the gap 154 may be a non-nominal working gap 154 less than 6 inches and/or the width of a surface plate 106. The working gap fits portions of work pieces or fixturing tools below the working surface 108. For example, the working gap 154 may be 5 inches, 4 inches, 3 inches, 2.5 inches, 2 inches, or 1.5 inches between surface plates 106. The hybrid modular welding table 100 may be configured for configurations of other suitable gaps 154 and/or several alternative gaps 154. A spaced working surface 152 may be preferred to save cost by reducing the number of surface plates 106 or to fit portions of work pieces or fixturing tools below the working surface 108.

FIG. 5C shows a hybrid working surface 156 for the hybrid modular welding table 100. In this configuration, the surface plates 106 are secured to the frame assembly with at least two surface plates 106 continuous and at least one gap 154 between two surface plates 106 and/or with mixed gap spacing. In one aspect, two or more of the surface plates 106 may form a continuous section 158a of the hybrid working surface 156 while at least one, two, or more other surface plates 106 form a spaced section 158b of the working surface 156. In this configuration, several gaps 154 may exist in the working surface.

Figure 6:
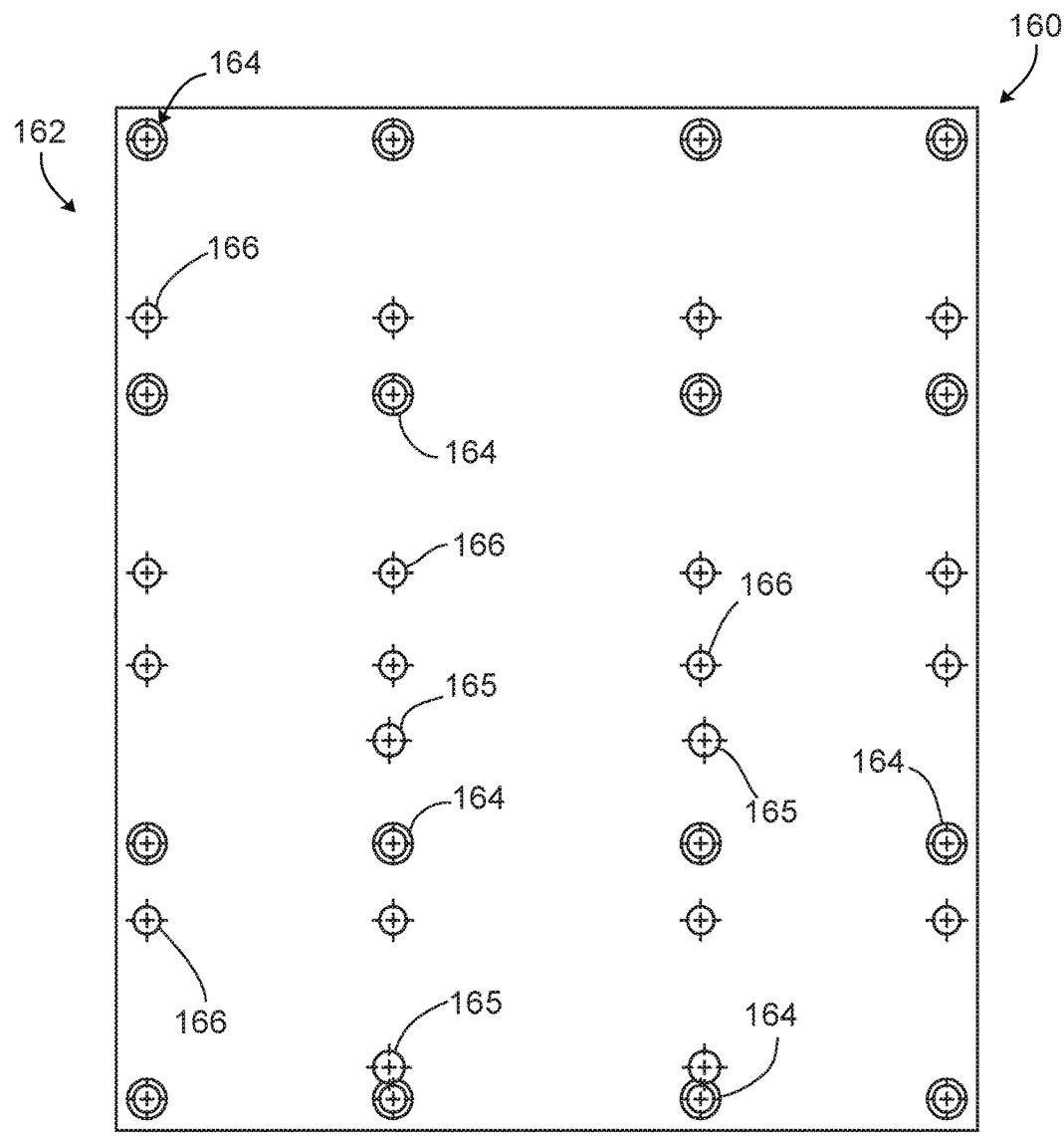
FIG. 6 is a top view of a modular connector bracket of the hybrid modular welding table.

FIG. 6 is a top view of a modular connector bracket 160 of the hybrid modular welding table 100. The modular connector bracket 160 allows connection of components to the hybrid modular welding table 100. In one embodiment, the modular connector bracket 160 may attach to the modular mounting brackets 128. The modular connector bracket 160 may be otherwise suitably attached to the hybrid modular welding table 100. In addition, the mounting, connecting, and other brackets may be non-modular. The brackets may comprise plates, be generally or completely flat or level on a top and bottom, be squared at each edge and/or or have other suitable configurations for mounting or connecting items.

Referring to FIG. 6, modular connector bracket 160 may comprise an array of holes 162 for connection of components to the hybrid modular welding table 100. In one embodiment, the array of holes 162 may comprise a first pattern of through holes 164 for a first type of connection and a second pattern of through holes 166 for a second type of connection. In the illustrated embodiment, the first pattern of through holes 164 may be comprised of sixteen through holes aligned in four rows of four. In this embodiment, the second pattern of through holes 166 may be comprised of sixteen through holes aligned in four rows of four. The first pattern of through holes 164 may be used to connect a component to a front or back of the frame assembly 102, as well as to store the modular connector bracket 160 to the front or back in the stored position. The second pattern of through holes 166 may be used to connect a component to a side of the frame assembly 102, as well as to store the modular connector bracket 160 to the side in the stored position. Additional through holes 165 may be provided for attaching equipment such as a vice. The through holes may each be the same or different sizes.

Exemplary spacing of the through holes 164 and 166 from left to right across the top of the illustrated modular connector bracket 160 is listed in Table 2. Exemplary spacing of the through holes 164 and 166 from bottom to top along the side of the illustrated modular connector bracket 160 is listed in Table 3. In this embodiment, the modular connector bracket 160 may comprise a steel plate of 14 inches×16.05 inches. The modular connection bracket 160 may have other dimensions and/or be made of different materials. In addition, components may be otherwise be connected to the hybrid modular welding table 100.

TABLE 2

| Hole Number | Location |
| --- | --- |
| #1 | .500 |
| #2 | 1.000 |
| #3 | 3.300 |
| #4 | 4.500 |
| #5 | 6.127 |
| #6 | 7.300 |
| #7 | 8.750 |
| #8 | 11.550 |
| #9 | 12.750 |
| #10 | 15.550 |

TABLE 3

| Hole Number | Location |
| --- | --- |
| #1 | .500 |
| #2 | 4.437 |
| #3 | 4.500 |
| #4 | 9.500 |
| #5 | 9.563 |
| #6 | 13.500 |

In the embodiment of FIG. 6, the through holes are each 0.438 inches in diameter, except the four additional equipment holes, which are each 0.500 inches in diameter. The through holes may additionally have other dimensions, be otherwise suitably spaced, and/or additional, other or fewer uses for storage or use on the modular connector plate 160.

Figure 7A:
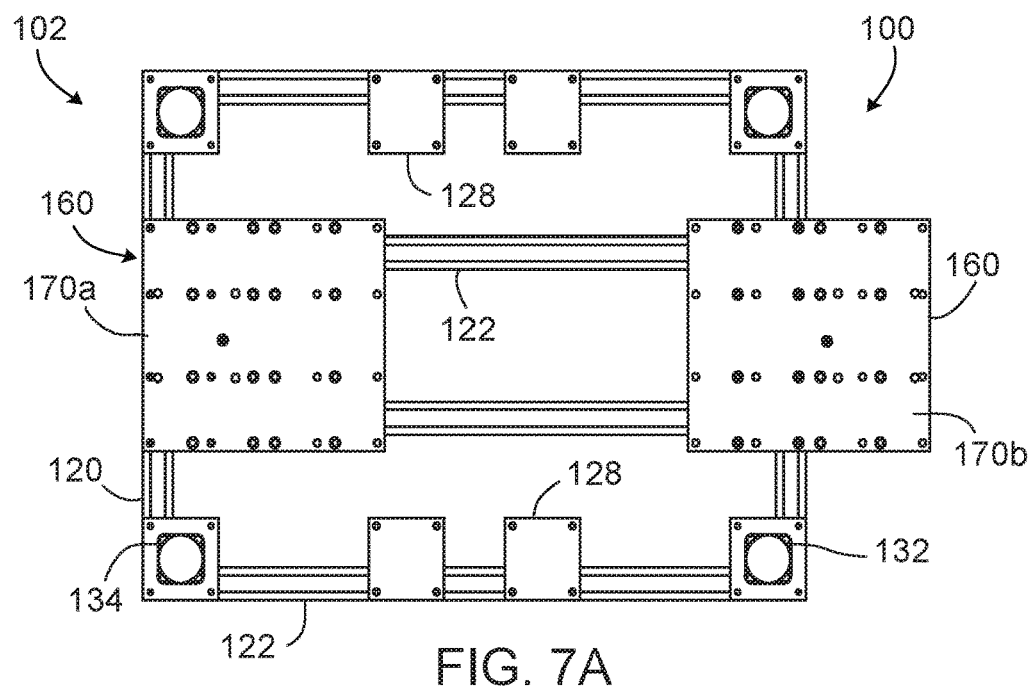
FIGS. 7A-7C are various views of the hybrid modular welding table with surface plates removed to show connection of modular connector brackets to the hybrid modular welding table.
Figure 7B:
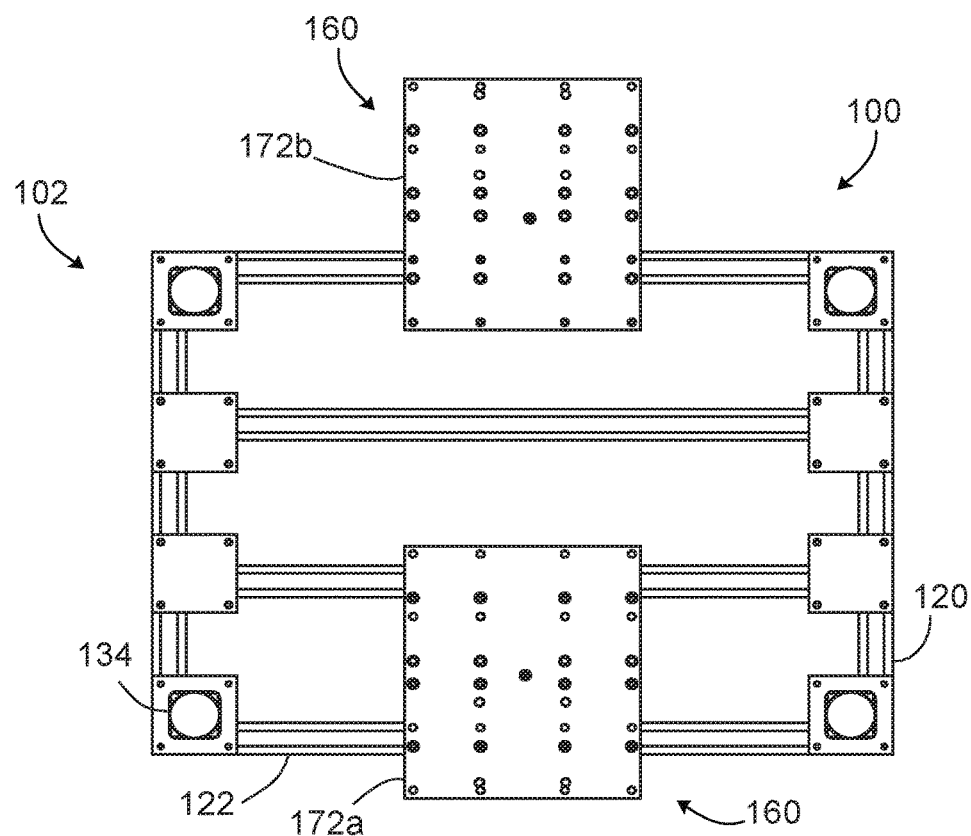
Figure 7C:
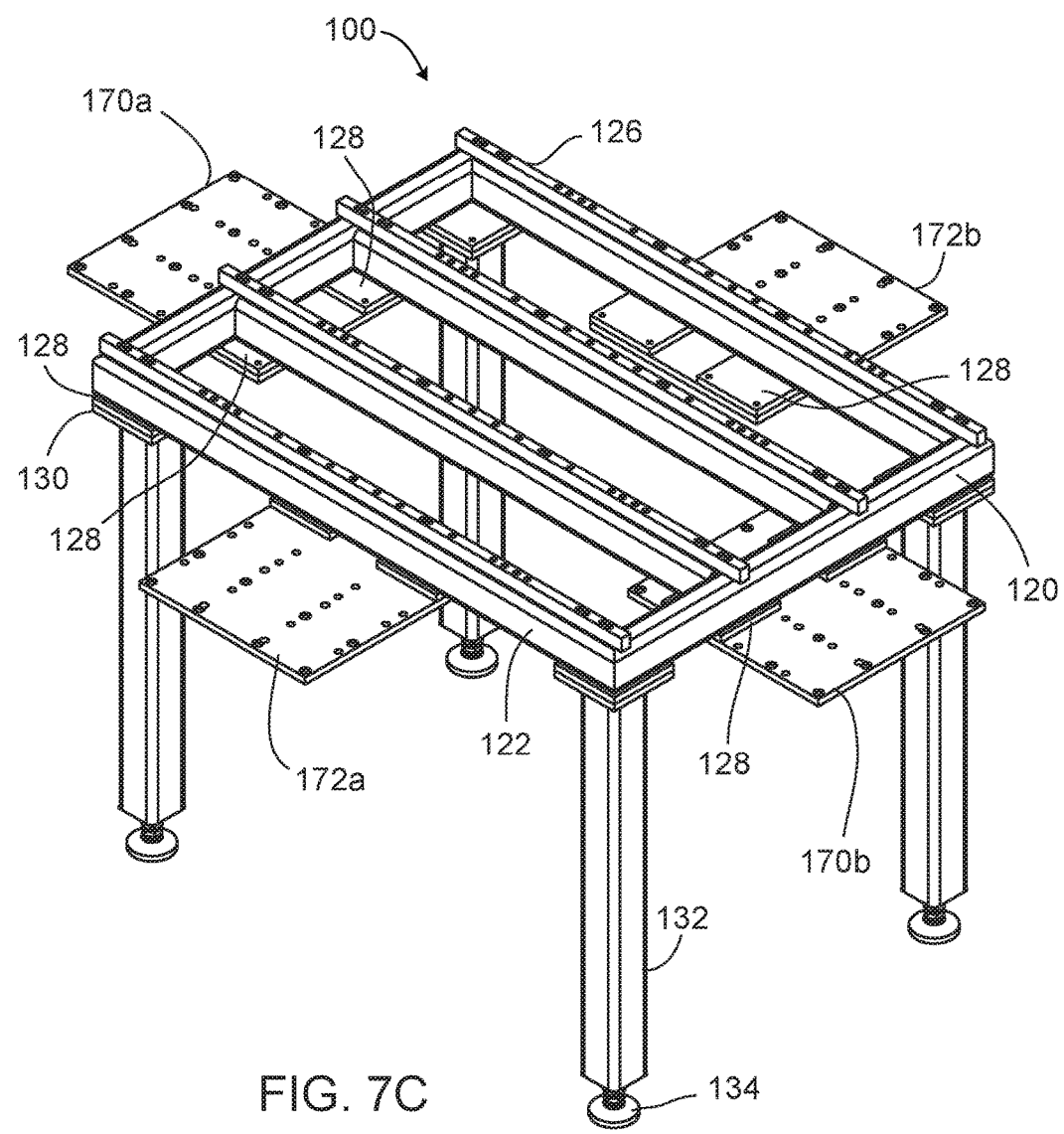

FIGS. 7A-7C are various views of the hybrid modular welding table 100 with the plates removed, showing connection of the modular connection brackets 160 to the hybrid modular welding table 100. In the illustrated embodiment, the modular connection brackets 160 are bolted to the hybrid modular welding table 100. The modular connection brackets 160 may be otherwise suitably attached or secured to the hybrid modular welding table 100.

Referring to FIG. 7A, which shows a bottom view of the hybrid modular welding table 100, the modular connection brackets 160 are used as side connection brackets 170a and 170b. In the illustrated embodiment, a first side connection bracket 170a is in a stored position not protruding outward from the edges of the frame assembly 102, while a second side connection bracket 170b extends outward from the edges of the frame assembly 102 for connection of one or more components.

Referring to FIG. 7B, which shows a bottom view of the hybrid modular welding table 100, the modular connection brackets 160 are used as front and back connection brackets 172a and 172b. In the illustrated embodiment, a front connection bracket 172a is in a stored position protruding slightly outward from the edges of the frame assembly 102, while a back side bracket 172b extends outward from the edges of the frame assembly 102 for connection of one or more components.

Referring to FIG. 7C, which shows an isometric view of the hybrid modular welding table 100, a number of connection bracket locations are shown, including locations for side, front, and back connection brackets 170a-b and 172a-b. In the illustrated embodiment, each of the connection brackets 170a-b and 172a-b are deployed to be accessible to attach or connect one or more components to the hybrid modular welding table 100.

Figure 8A:
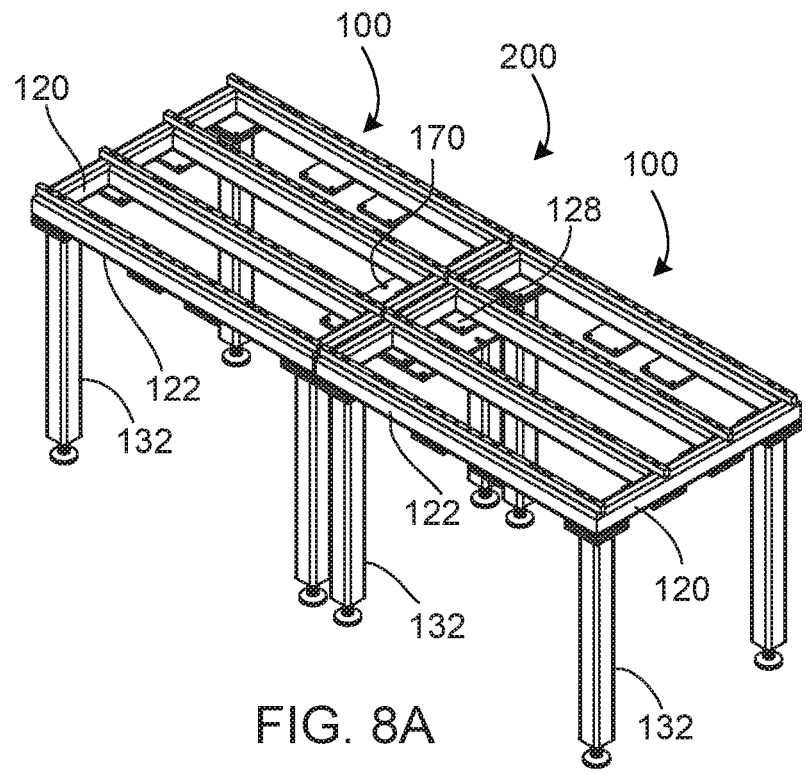
FIGS. 8A-8C are various views of an extended hybrid modular welding table with side connections.
Figure 8B:
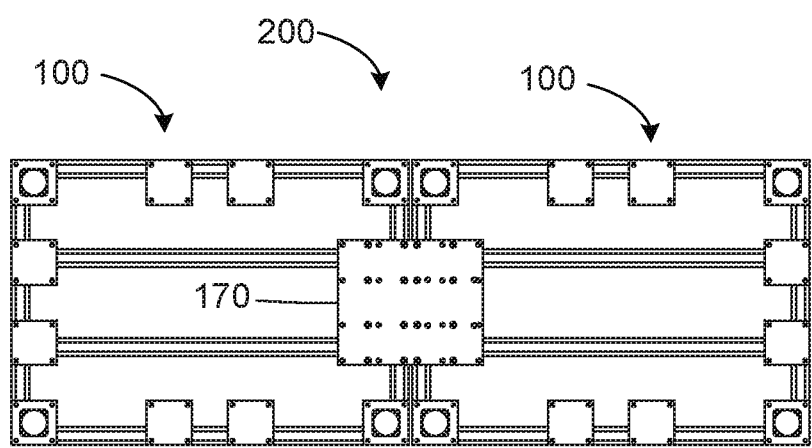
Figure 8C:
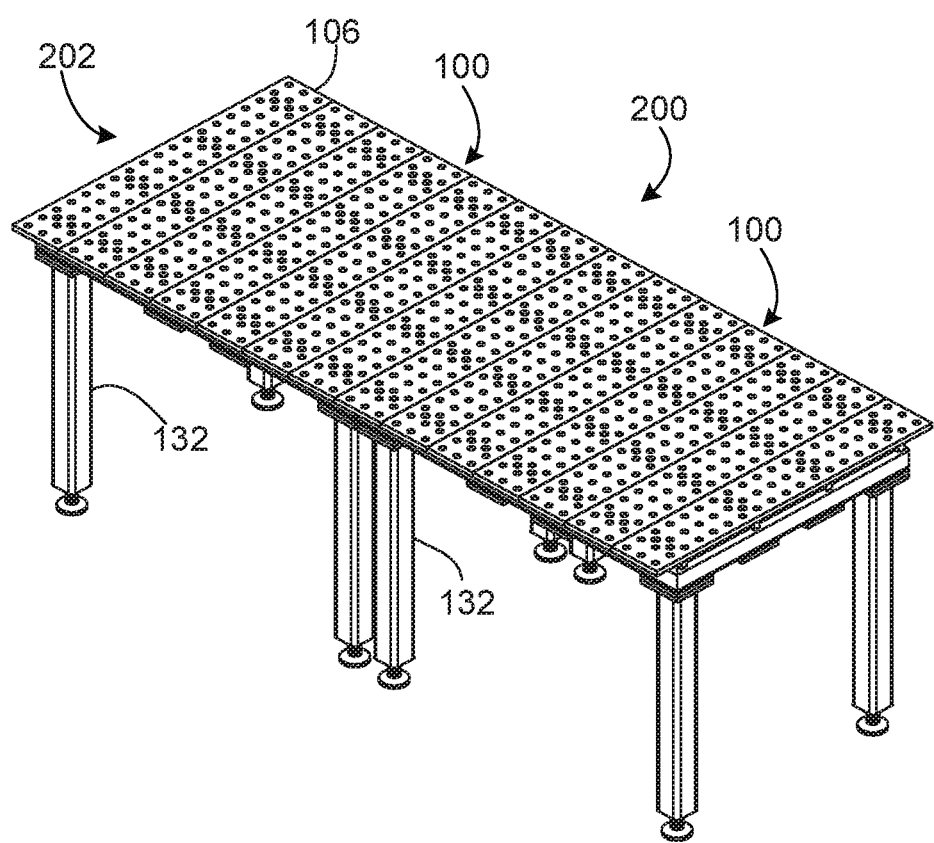

FIGS. 8A-8C are various views of an extended hybrid modular welding table 200 comprising two connected hybrid modular welding tables 100. The two hybrid modular welding tables 100 are each connected by a modular connector bracket 160 used as a side connector bracket 170. The two hybrid modular welding tables 100 may be bolted to the side connector bracket 170. Thus, the two hybrid modular welding tables 100 can be readily used as an extended table 200 when needed and separated when an extended table 200 is not needed.

Referring to FIGS. 8A-8C, the extended hybrid modular welding table 200 has an extended continuous working surface 202. The extended continuous working surface 202 may be a spaced or hybrid working surface as previously discussed. Further hybrid modular welding tables 100 may be attached to extended hybrid modular welding table 200 using additional modular side connector brackets 170 or front/back connector brackets 172.

Figure 9A:
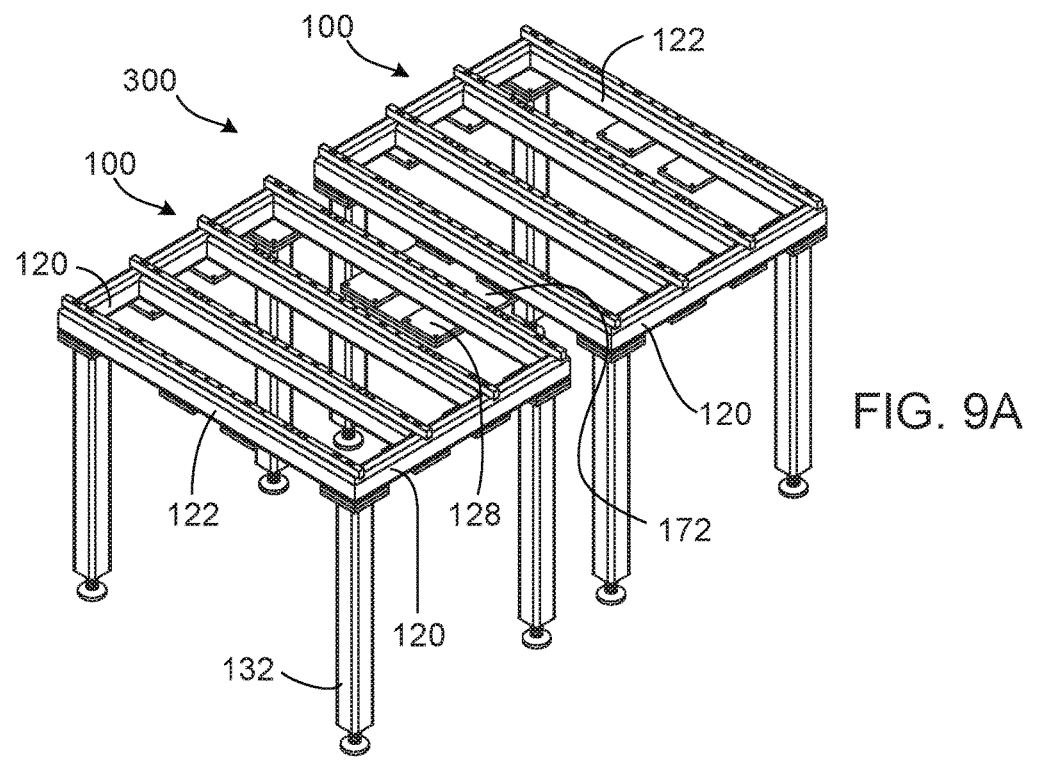
FIGS. 9A-9C are various views of an extended hybrid modular welding table with front and back connections.
Figure 9B:
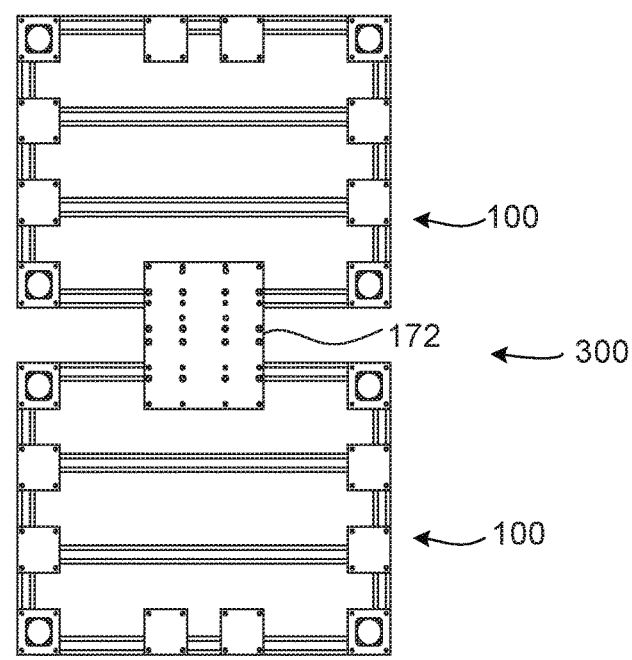
Figure 9C:
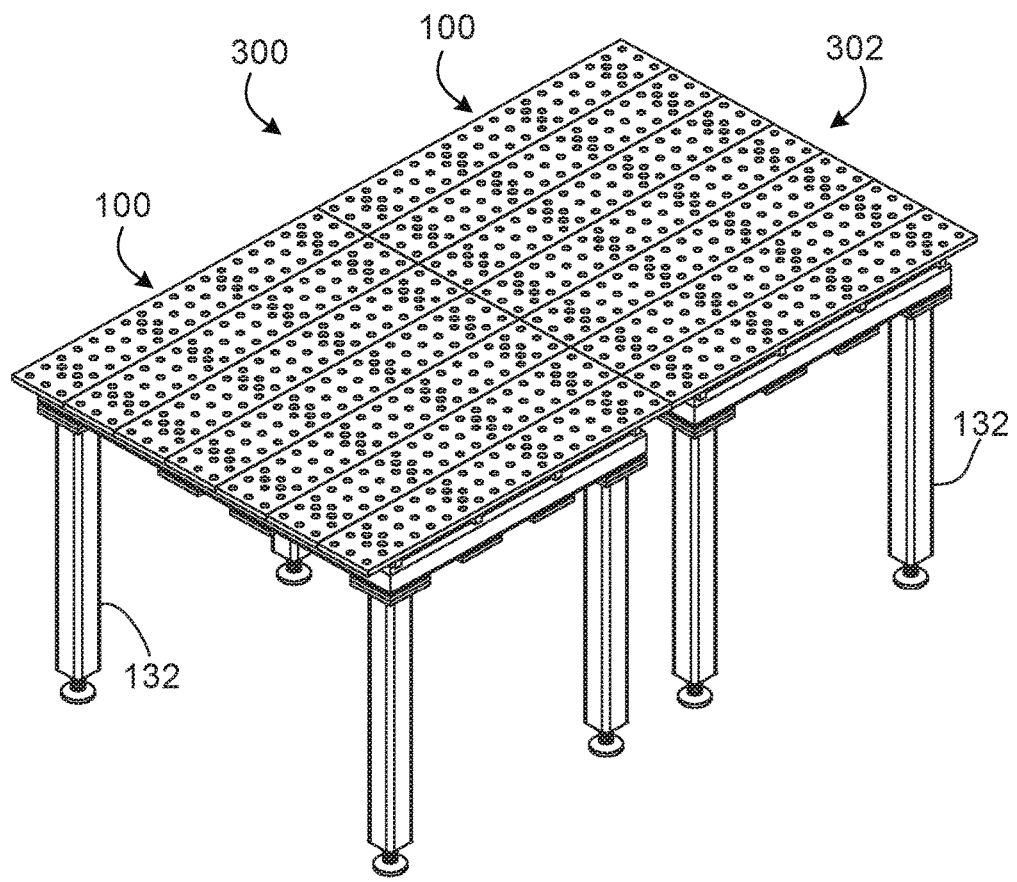

FIGS. 9A-9C are various views of an extended hybrid modular welding table 300 comprising two connected hybrid modular welding tables 100. The two hybrid modular welding tables 100 are each connected by a modular connector bracket 160 used as a front/back connector bracket 172. The two hybrid modular welding tables 100 may be bolted to the side connector brackets 172. Thus, the two hybrid modular welding tables 100 can be readily used as an extended table 300 when needed and separated when the extended table is not needed.

Referring to FIGS. 9A-9C, the extended hybrid modular welding table 300 has an extended working surface 302 that is continuous. The extended working surface 302 may be a spaced or hybrid working surface as previously discussed. Further hybrid modular welding tables 100 may be attached to the extended hybrid modular welding table 300 using additional front/back connector brackets 172 or side connector brackets 170. Thus, for example, the extended hybrid modular welding table 300 could be connected to the front, back or side of the extended hybrid modular welding table 200. In a particular embodiment, several or a series of welding tables may be connected or joined together, with or without gaps, to form a large scale fixturing platform for creating large scale fixtures and assemblies. In this embodiment, the connecting structures may comprise connector brackets as described, elongated or custom connector brackets, or connector brackets made from tubular material.

Figure 10A:
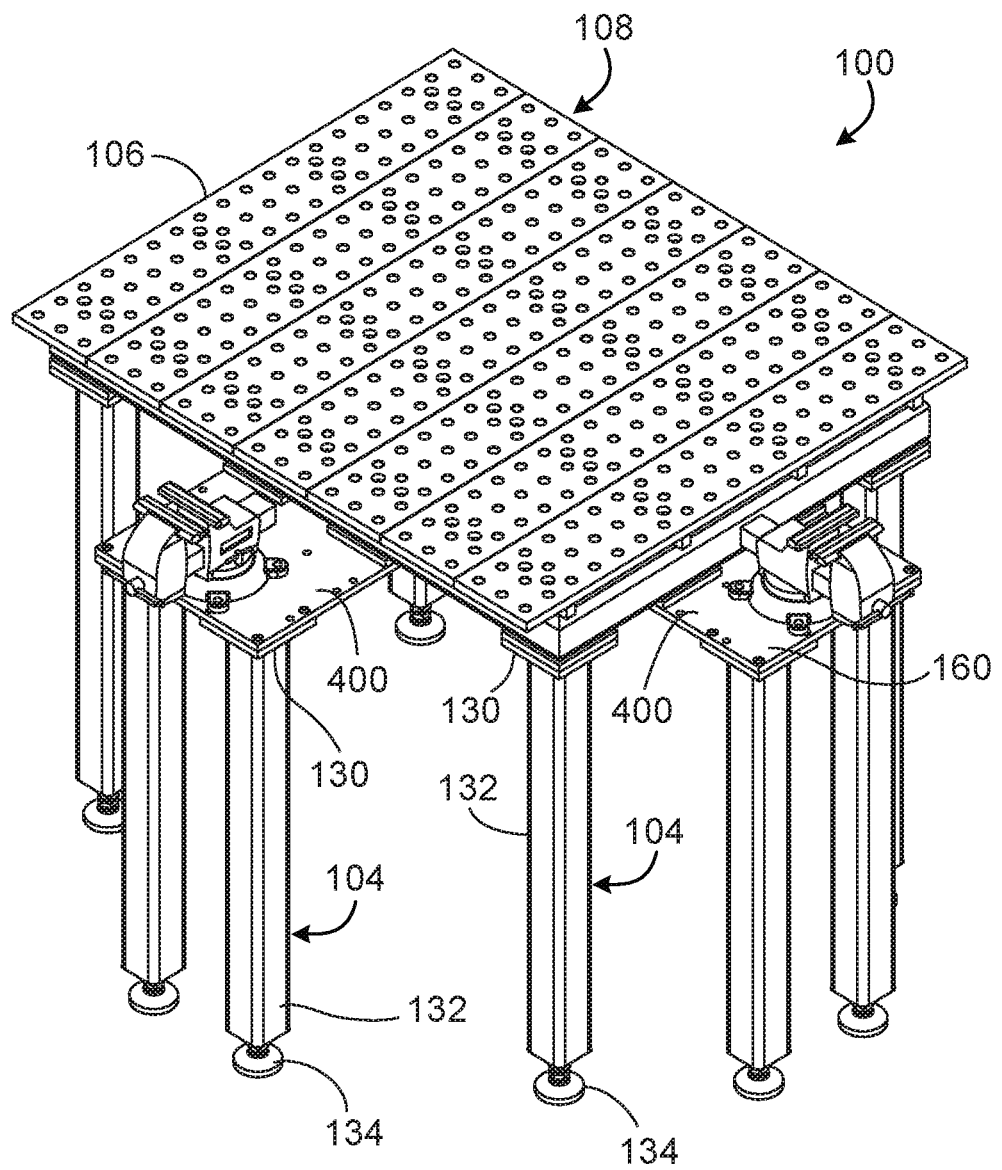
FIGS. 10A-10C are various views of the hybrid modular welding table with an off-table working surface.
Figure 10B:
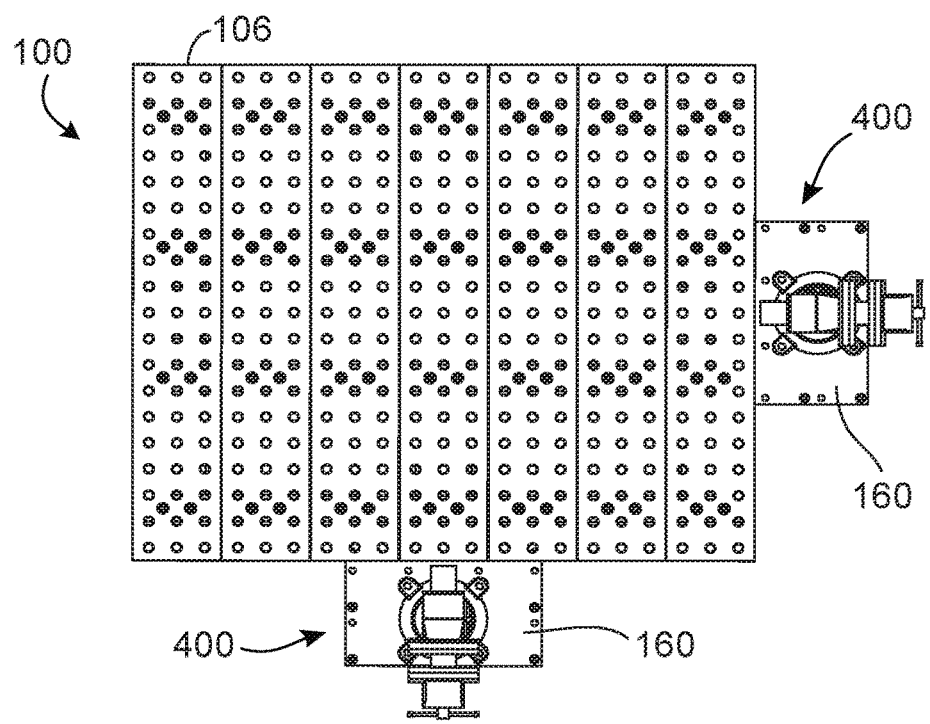
Figure 10C:
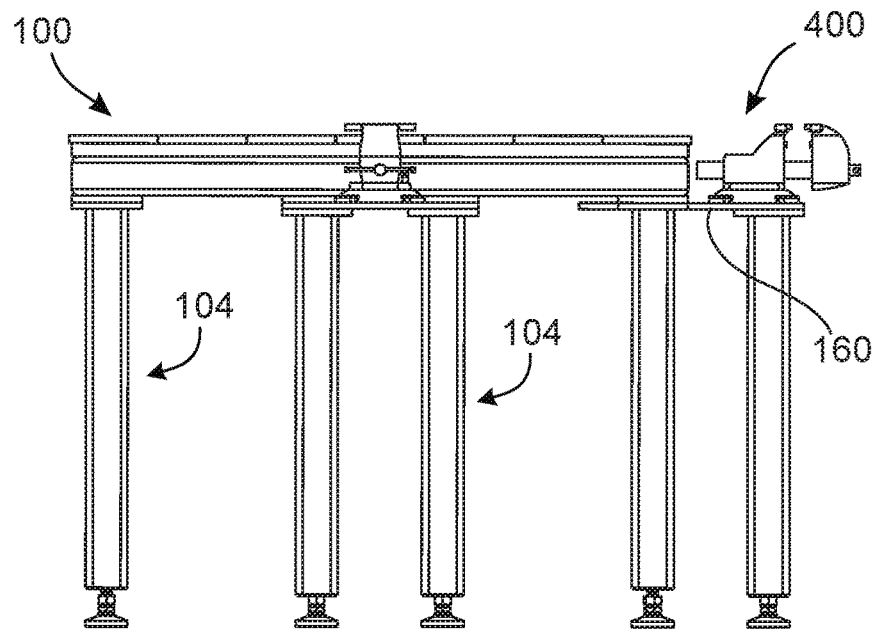
Figure 11A:
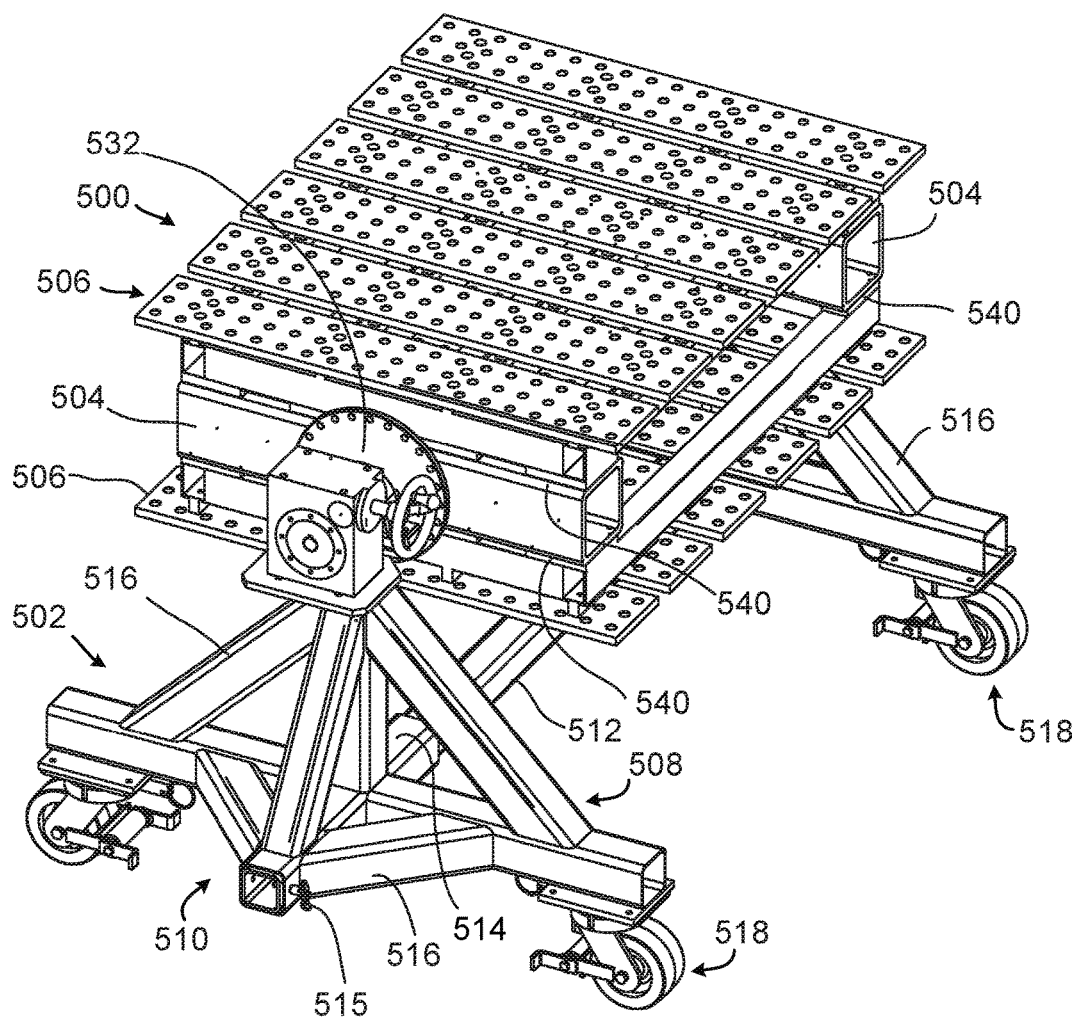
FIGS. 11A-11D are various views of a rotatable fixturing platform having a rotisserie and mounting frame supporting a plurality of hybrid modular welding tables.
Figure 11B:
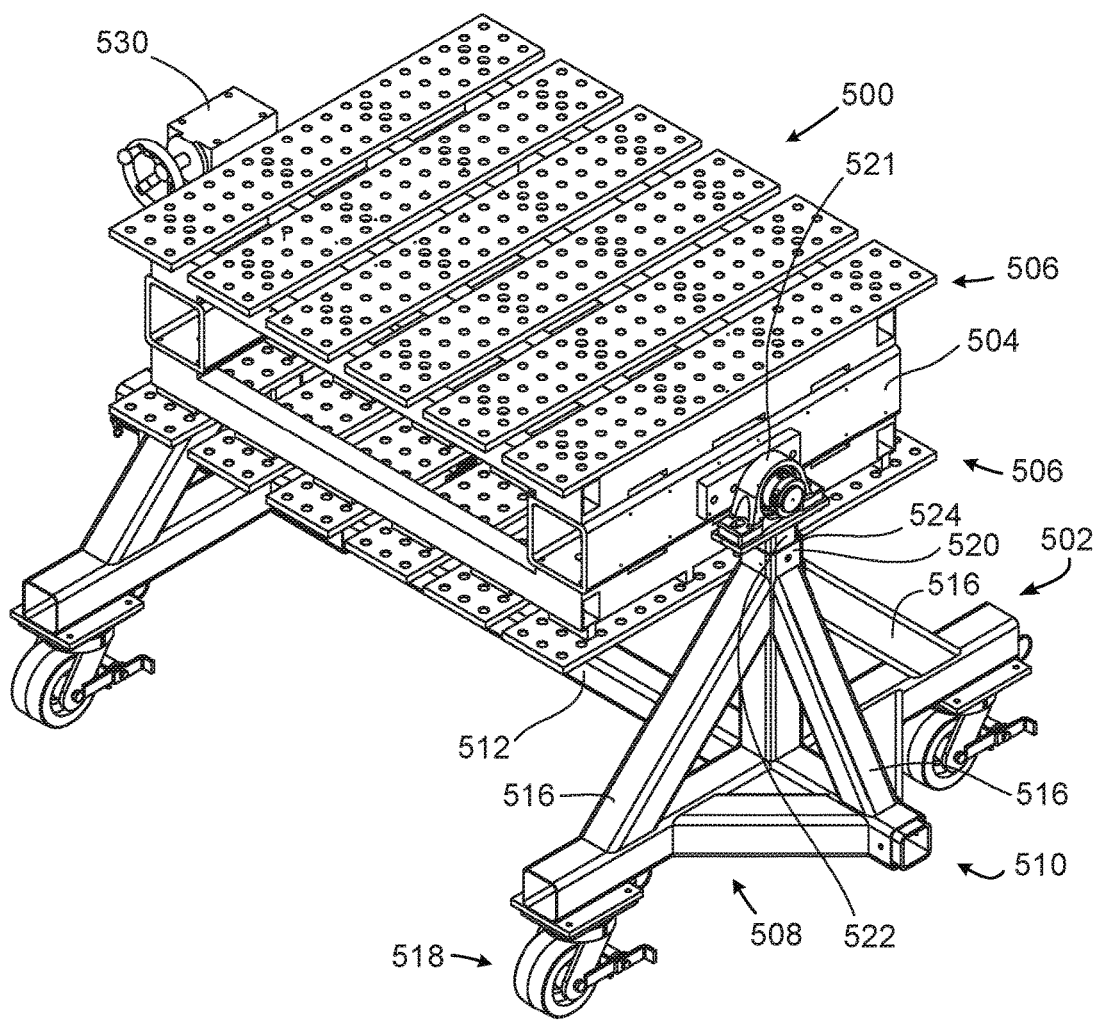
Figure 11C:
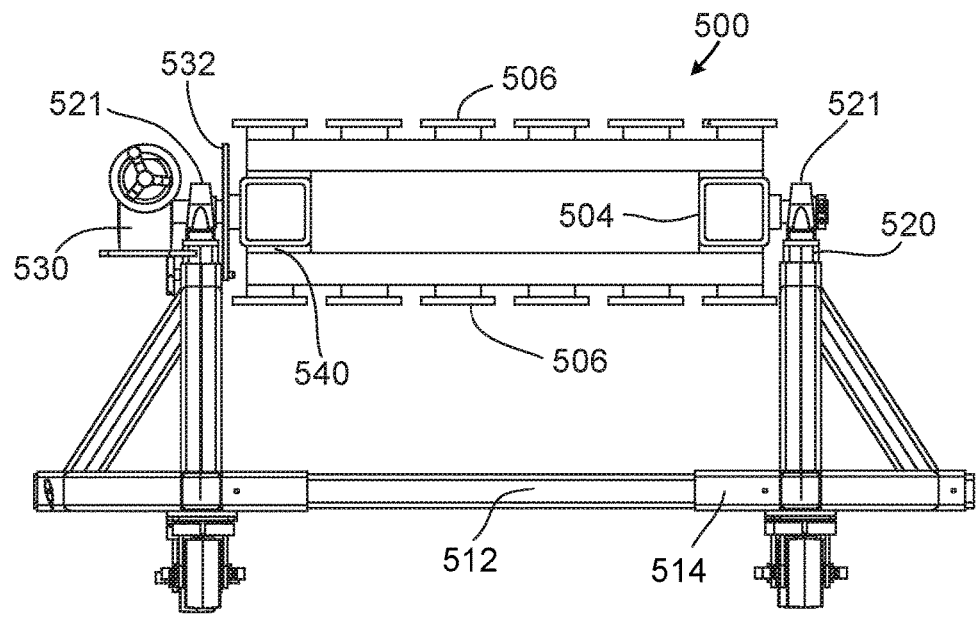
Figure 11D:
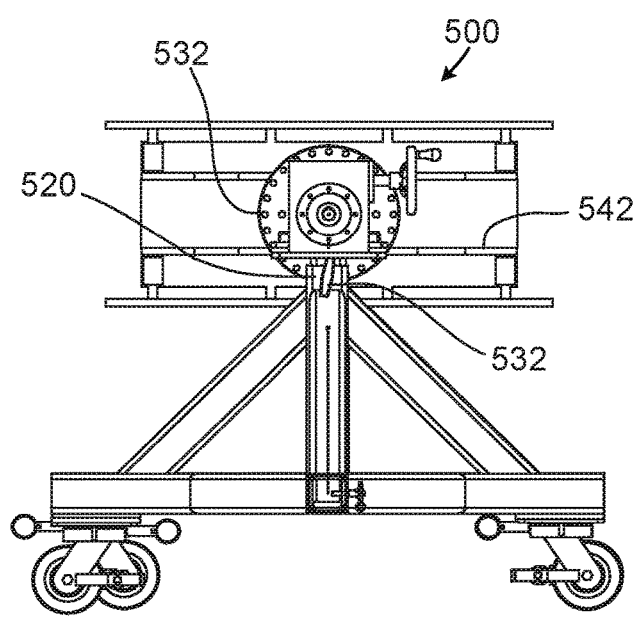

FIGS. 10A-10C are various views of the hybrid modular welding table 100 with a plurality of off-table working surfaces 400. In the illustrated embodiment, the off-table working surfaces 400 each comprise a modular connector bracket 160 deployed from the hybrid modular welding table 100. The off-table working surfaces 400 may extend from the front, back, or sides of the hybrid modular welding table 100 and support or allow connection of an accessory such as a vice.

Referring to FIGS. 10A-10C, the modular connector brackets 160, when deployed on the off table working surface 400 may, if needed, be supported by one or more legs. In one embodiment, the modular connector brackets 160 are supported by leg assemblies 104. In this embodiment, the leg assemblies 104 may be modular in that the leg assemblies may be used without modification for supporting the frame assembly 102 and the modular connector brackets 160 of the off-table work surface 400. The foot 134 of the leg assembly 104 may allow any necessary height adjustment and leveling of the working surfaces 108.

FIGS. 11A-11D are various views of a rotatable fixturing platform 500 having a rotisserie 502 with a mounting frame 504 supporting a plurality of hybrid modular fixturing platforms 506. The rotisserie 502 may comprise a base 508 having a frame 510 which may be extensible to adjust length of the base 508. The extensible frame 510 may comprise a center frame member 512 received into mating receptacles 514. The center frame member 512 and mating receptacles 514 may comprise a square shape or may be keyed. The extensible frame 510 may be lengthened to preset lengths and secured using cotter pins and mating holes in the center frame member 512 and mating receptacles 514.

A plurality of vertical and horizontal struts 516 may be included to support the frame and to, for example, add stiffness. Casters 518 with brakes may be provided on a bottom of the extensible frame 510 to allow the rotatable fixturing platform 500 to be readily moved or transported.

Other suitable designs may be used for the rotisserie 502, the frame 510, and frame elements.

The extensible frame 510 may also comprise extensible arms 520 supporting a bearing or other suitable assembly 521 allowing rotation of the mounting frame 504. The extensible arms 520 may each comprise a center arm member 522 received into mating receptacles 524. The center arm member 522 and mating receptacles 524 may each comprise, for example, a square or other suitable shape and/or may be keyed. The extensible arms 520 may be lengthened to preset lengths and secured using cotter pins and mating holes in the center arm member 522 and mating receptacles 524.

A gear box 530 may rotate the mounting frame 504. In one embodiment, the mounting frame 504 may be rotated to preset positions and secured with a pin assembly 532. The mounting frame 504 and/or hybrid modular fixturing platforms 506 may be otherwise fixed, secured, or held at a desired position.

Figure 12A:
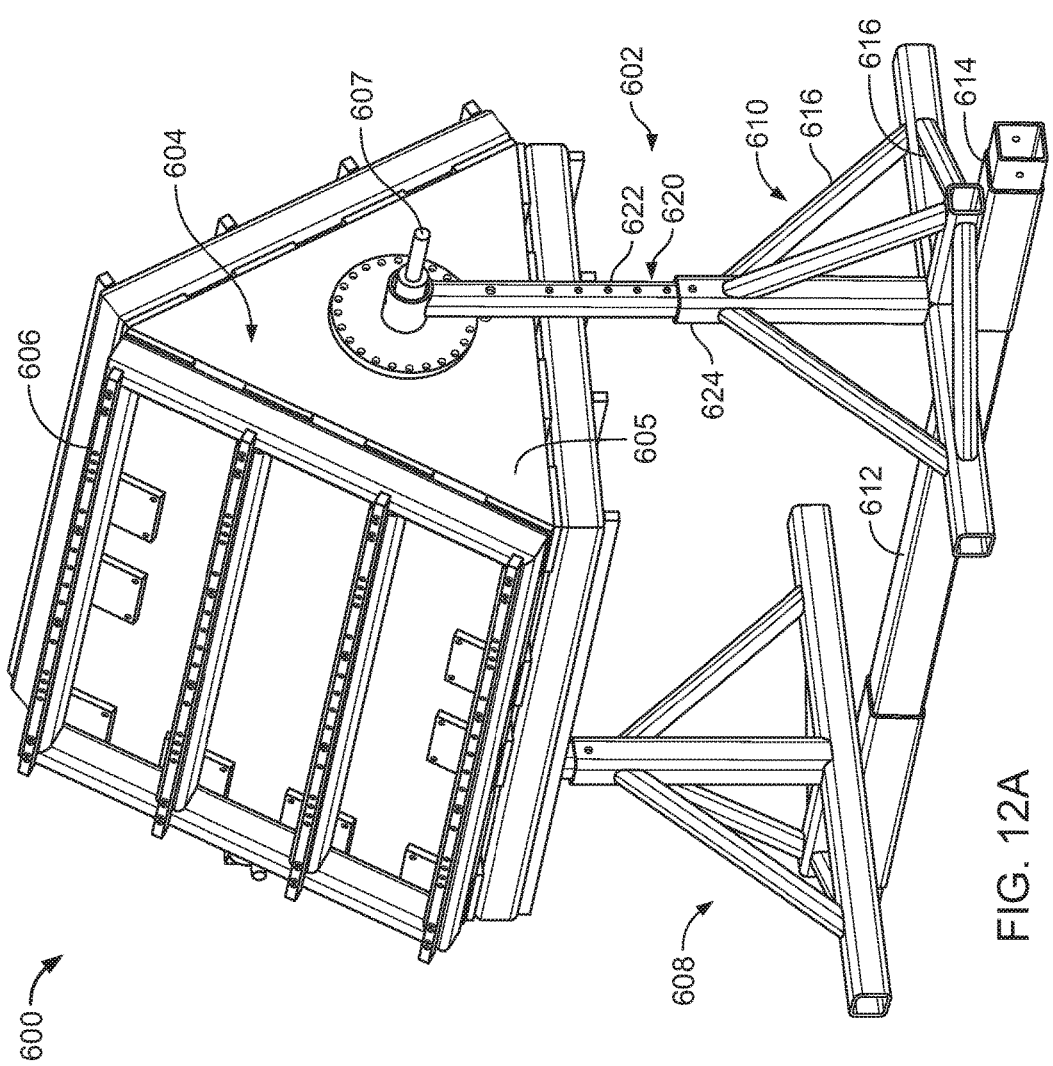

FIGS. 12A-12B are various views of a rotatable fixturing platform 600 having a rotisserie 602 and mounting frame 604 supporting three hybrid modular and/or other fixturing platforms 606. In the illustrated embodiment, the hybrid modular fixturing platforms 606 are shown without plates which may be configured and attached, for example, as described in connections with FIGS. 1-6. In this aspect, the mounting frame 604 may comprise a triangular frame having ends 605 connected by cross members and an axle assembly having one or more axles 607, which may be portions of a same axle, extending outwardly from the ends 605 for connection to the rotisserie 602. The axles 607 may comprise a rod, round tube, or other suitable structures allowing rotation of the mounting frame 604.

Each end 605 may comprise, for example, a multisided plate in the shape of an equilateral or other suitable triangle. Each side, or edge portion, may be sized to receive a hybrid modular and/or other fixturing platform 606. The cross members may each comprise, for example, one or more bars. The bars may be rectangular tubes. The ends 605 and cross members may comprise other suitable structures such as, for example, a truss structure. The cross members and axles 607 may be fixed to ends 605 with, for example, welds or fastening such as with screws or bolts. The cross members and axles 607 may be otherwise suitably secured or coupled to ends 605. The ends 605 may instead, or in addition, be connected by the hybrid modular fixturing platforms 606.

The rotisserie 602 may be similar to rotisserie 502 and comprise a base 608 having a frame 610 which may be extensible to adjust length of the base 608. The extensible frame 610 may comprise a support assembly having a center frame member 612 received into mating receptacles 614. The center frame member 612 and mating receptacles 614 may comprise a square shape or may be keyed. The extensible frame 610 may be lengthened to preset lengths and secured using cotter pins and mating holes in the center frame member 612 and mating receptacles 614.

A plurality of vertical and horizontal struts 616 may be included to support the frame and to, for example, add stiffness. Casters with brakes may be provided on a bottom of the extensible frame 610 as shown in FIGS. 11A-11D or as shown in FIGS. 22A-22B to allow the rotatable fixturing platform 600 to be readily moved or transported. Other suitable designs may be used for the rotisserie 602, the frame 610, and frame elements. In other embodiments, the frame 610 may be otherwise configured. For example, the frame 610 may be not extensible. The center frame member 612 and/or some or all the struts may be omitted, for example, as shown in FIG. 21B or otherwise configured as shown in FIGS. 20A-20D and FIG. 21A.

The extensible frame 610 may also comprise extensible arms 620 supporting a cartridge or other suitable bearing assembly 621 receiving or otherwise rotatably coupled to the axles 607 and allowing rotation of the mounting frame 604. The axles 607 with other frame members may thus form a height adjustable bar to raise, lower, or lock the platform and/or fixtures, and/or tables (if attached) either by hand, mechanically, electronically, or by otherwise. The extensible arms 620 may each comprise a center arm member 622 received into mating receptacles 624. The center arm member 622 and mating receptacles 624 may each comprise, for example, a square or other suitable shape and/or may be keyed. The extensible arms 620 may be lengthened to preset lengths and secured using cotter pins and mating holes in the center arm member 622 and mating receptacles 624.

A gear box similar to gear box 530 may be provided to rotate the mounting frame 604. A robot may also be used to rotate the mounting frame. In one embodiment, the mounting frame 604 may be rotated to preset positions and secured with a pin assembly 632. The mounting frame 604 and/or hybrid modular fixturing platforms 606 may be otherwise fixed, secured, or held at a desired position. In use, the three hybrid modular and/or other fixturing platforms 606 may have different configurations of fixturing tools and be rotated to allow access and use of the fixturing tools. Thus, work pieces may be fixtures on multiple tables angled 120 degrees or otherwise relative to each other in disparate planes.

Figure 13A:
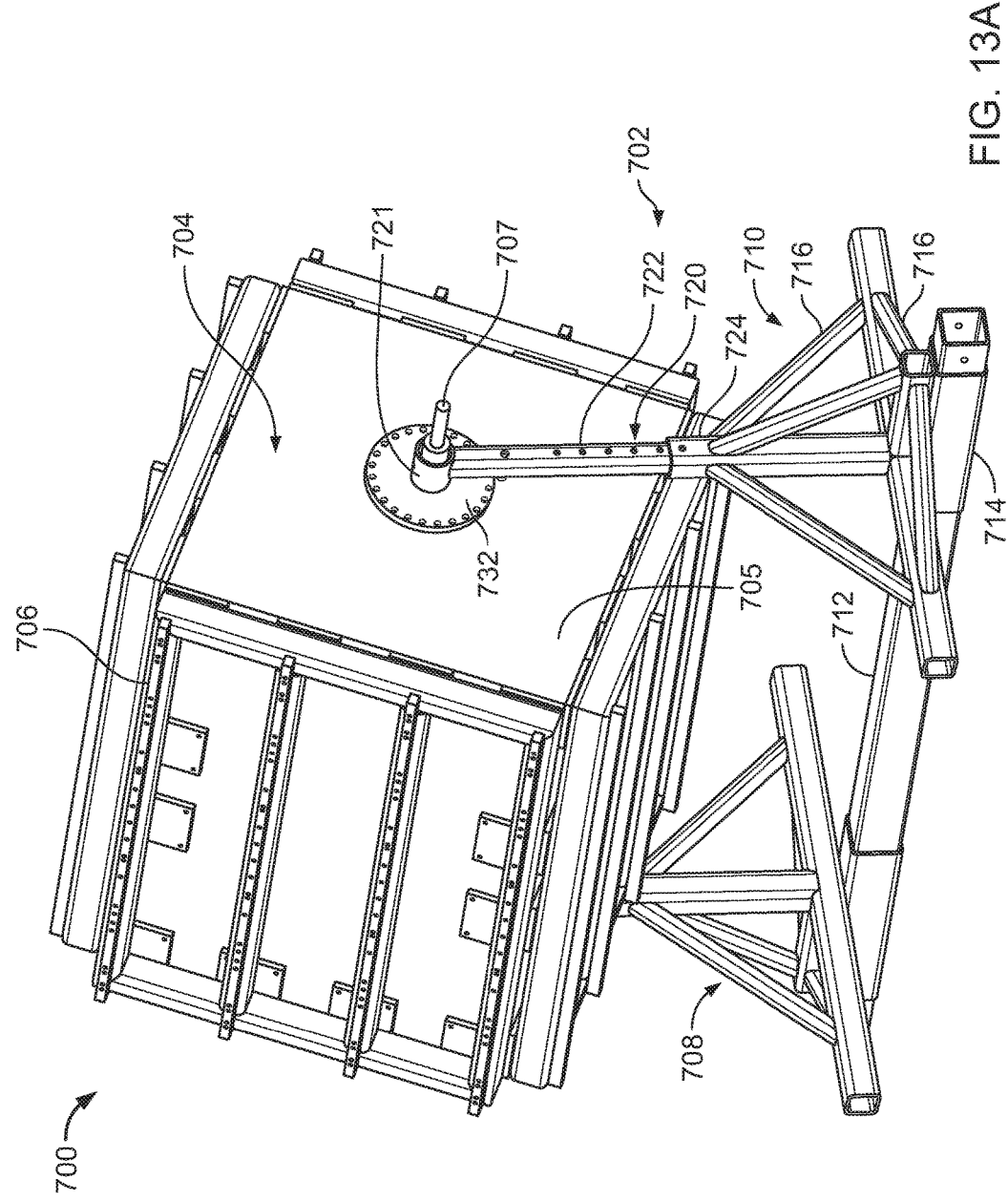
FIGS. 13A-13B are various views of a rotatable fixturing platform having a rotisserie and mounting frame supporting four welding tables.
Figure 13B:
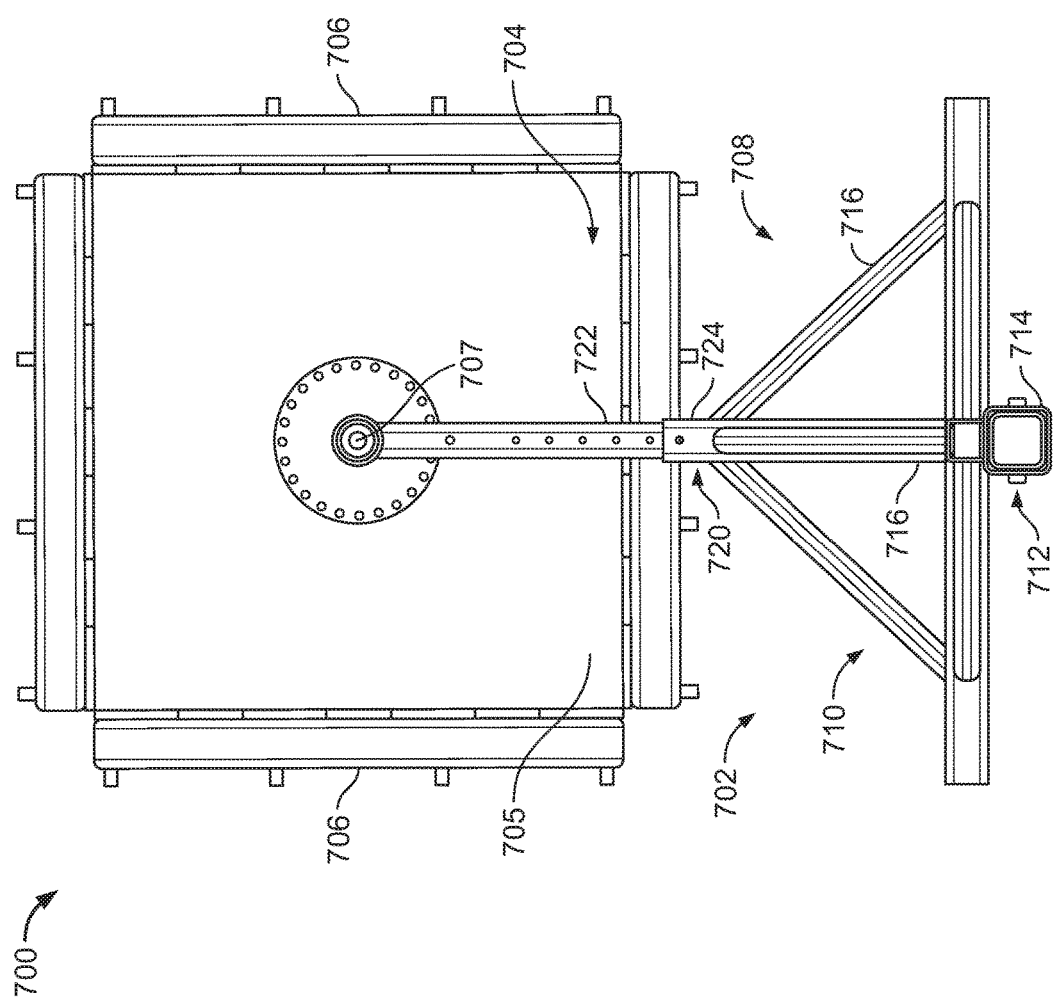

FIGS. 13A-13B are various views of a rotatable fixturing platform 700 having a rotisserie 702 and mounting frame 704 supporting four hybrid modular and/or other fixturing platforms 706. In the illustrated embodiment, the hybrid modular fixturing platforms 706 are shown without plates which may be configured and attached, for example, as described in connections with FIGS. 1-6. In this aspect, the mounting frame 704 may comprise a square frame having ends 705 connected by cross members and an axle assembly having one or more axles 707, which may be portions of a same axle, extending outwardly from the ends 705 for connection to the rotisserie 702. The axles 707 may comprise a rod, round tube, or other suitable structure allowing rotation of the mounting frame 704.

Each end 705 may comprise, for example, a multisided plate in the shape of a square or other suitable quadrilateral. Each side, or edge portion, may be sized to receive a hybrid modular and/or other fixturing platform 706. The cross members may each comprise, for example, one or more bars. The bars may be rectangular tubes. The ends 705 and cross members may comprise other suitable structures such as, for example, a truss structure. The cross members and axles 707 may be fixed to ends 705 with, for example, welds or fastening such as with screws or bolts. The cross members and axles 707 may be otherwise suitably secured or coupled to ends 705. The ends 705 may instead, or in addition, be connected by the hybrid modular fixturing platforms 706.

The rotisserie 702 may be similar to rotisserie 502 and comprise a base 708 having a frame 710 which may be extensible to adjust length of the base 708. The extensible frame 710 may comprise a support assembly having a center frame member 712 received into mating receptacles 714. The center frame member 712 and mating receptacles 714 may comprise a square shape or may be keyed. The extensible frame 710 may be lengthened to preset lengths and secured using cotter pins and mating holes in the center frame member 712 and mating receptacles 714 or by using threaded set screws.

A plurality of vertical and horizontal struts 716 may be included to support the frame and to, for example, add stiffness. Casters with brakes may be provided on a bottom of the extensible frame 710 to allow the rotatable fixturing platform 700 to be readily moved or transported. Other suitable designs may be used for the rotisserie 702, the frame 710, and frame elements. In other embodiments, the frame 710 may be otherwise configured. For example, the frame 710 may be not extensible. The center frame member 712 and/or some or all the struts may be omitted, for example, as shown in FIG. 21B or otherwise configured as shown in FIGS. 20A-20D and FIG. 21A.

The extensible frame 710 may also comprise extensible arms 720 supporting a cartridge or other suitable bearing assembly 721 receiving or otherwise rotatably coupled to the axles 707 and allowing rotation of the mounting frame 704. The axles 707 with other frame members may thus form a height adjustable bar to raise, lower, or lock the platform and/or fixtures, and/or tables (if attached) either by hand, mechanically, electronically, or by otherwise. The extensible arms 720 may each comprise a center arm member 722 received into mating receptacles 724. The center arm member 722 and mating receptacles 724 may each comprise, for example, a square or other suitable shape and/or may be keyed. The extensible arms 720 may be lengthened to preset lengths and secured using cotter pins and mating holes in the center arm member 722 and mating receptacles 724.

A gear box similar to gear box 530 may be provided to rotate the mounting frame 704. A robot may also be used to rotate the mounting frame 704. In one embodiment, the mounting frame 704 may be rotated to preset positions and secured with a pin assembly 732. The mounting frame 704 and/or hybrid modular fixturing platforms 706 may be otherwise fixed, secured, or held at a desired position. In use, the three hybrid modular and/or other fixturing platforms 706 may have different configurations of fixturing tools and be rotated to allow access and use of the fixturing tools. Thus, work pieces may be fixture on multiple tables angled 90 degrees relative to each other in disparate planes.

Figure 14A:
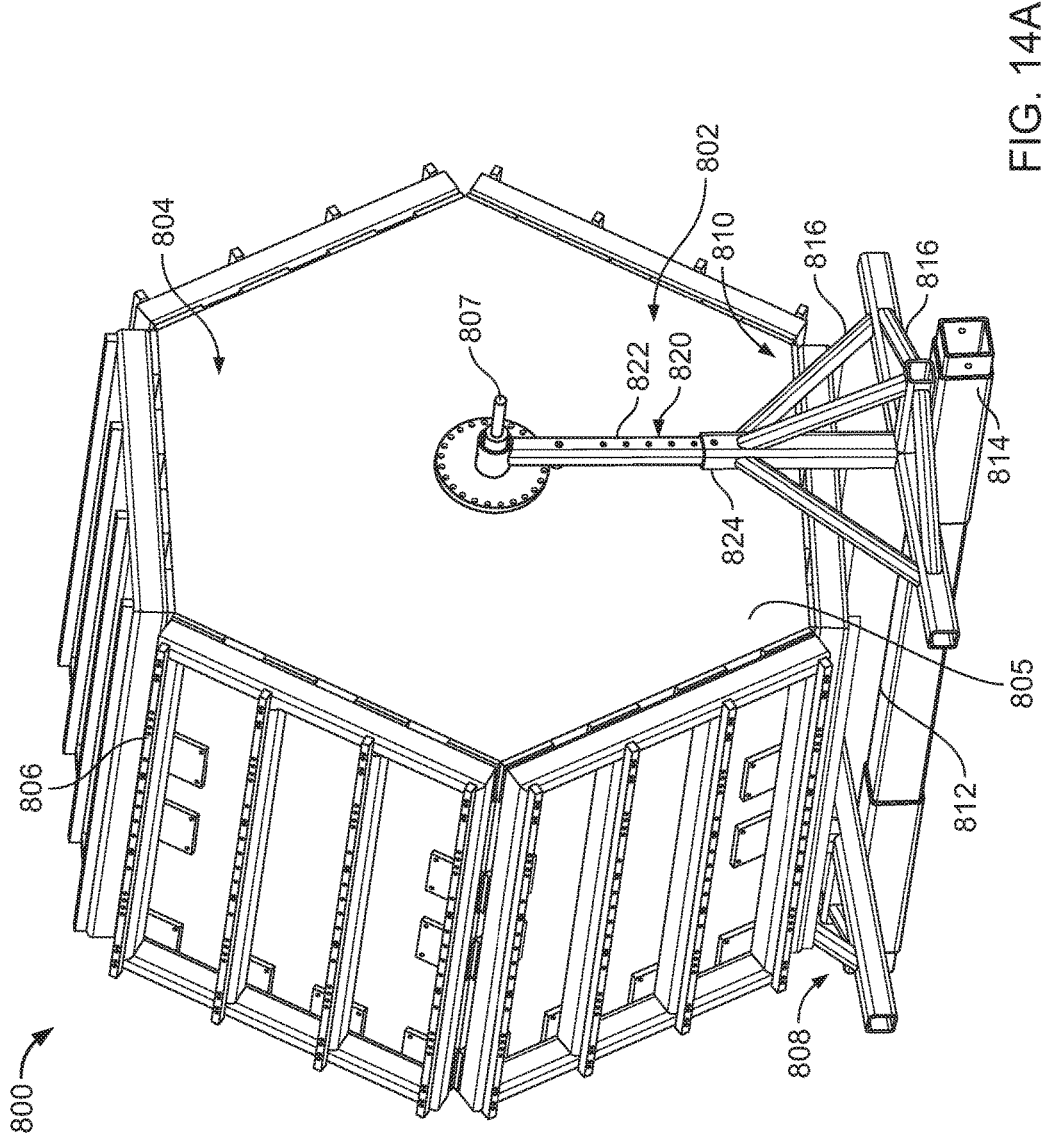
FIGS. 14A-14B are various views of a rotatable fixturing platform having a rotisserie and mounting frame supporting six welding tables.
Figure 14B:
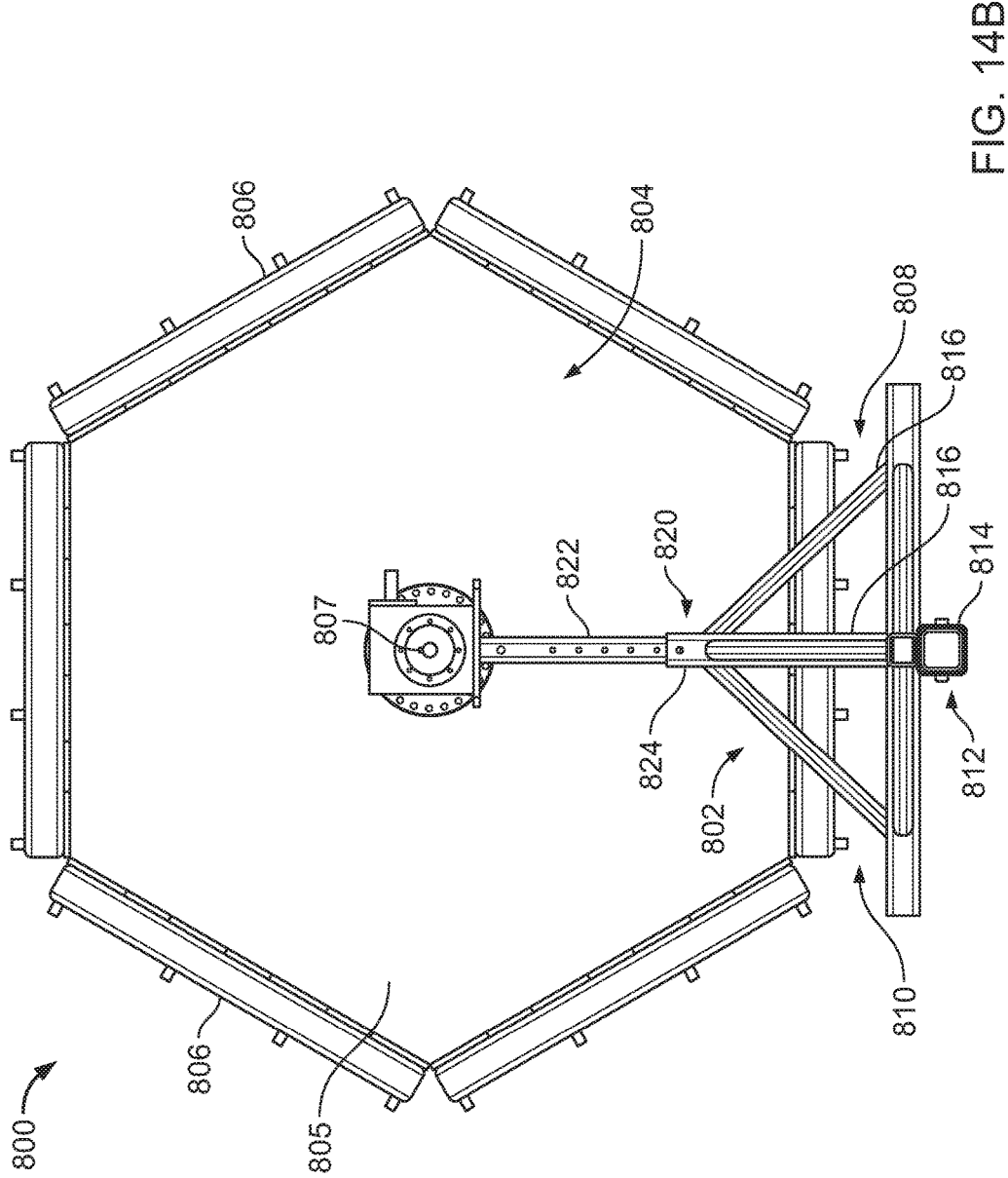

FIGS. 14A-14B are various views of a rotatable fixturing platform 800 having a rotisserie 802 and mounting frame 804 supporting six hybrid modular and/or other fixturing platforms 806. In the illustrated embodiment, the hybrid modular fixturing platforms 806 are shown without plates which may be configured and attached as described, for example, in connection with FIGS. 1-6. In this aspect, the mounting frame 804 may comprise a hexagonal frame having ends 805 connected by cross members and an axle assembly having one or more axles 807, which may be portions of a same axle, extending outwardly from the ends 805 for connection to the rotisserie 802. The axles 807 may comprise a rod, round tube, or other suitable structure allowing rotation of the mounting frame 804.

Each end 805 may comprise, for example, a multisided plate in the shape of a hexagon. Each side, or edge portion, may be sized to receive a hybrid modular and/or other fixturing platform 806. The cross members may each comprise, for example, one or more bars. The bars may be rectangular tubes. The ends 805 and cross members may comprise other suitable structures such as, for example, a truss structure. The cross members and axles 807 may be fixed to ends 805 with, for example, welds or fastenings, such as with screws or bolts. The cross members and axles 807 may be otherwise suitably secured or coupled to ends 805. The ends 805 may instead, or in addition, be connected by the hybrid modular fixturing platforms 806.

The rotisserie 802 may be similar to rotisserie 502 and comprise a base 808 having a frame 810 which may be extensible to adjust length of the base 808. The extensible frame 810 may comprise a support assembly having a center frame member 812 received into mating receptacles 814. The center frame member 812 and mating receptacles 814 may comprise a square shape or may be keyed. The extensible frame 810 may be lengthened to preset lengths and secured using cotter pins and mating holes in the center frame member 812 and mating receptacles 814.

A plurality of vertical and horizontal struts 816 may be included to support the frame and to, for example, add stiffness. Casters with brakes may be provided on a bottom of the extensible frame 810 to allow the rotatable fixturing platform 800 to be readily moved or transported. Other suitable designs may be used for the rotisserie 802, the frame 810, and frame elements. In other embodiments, the frame 810 may be otherwise configured. For example, the frame 810 may be not extensible. The center frame member 812 and/or some or all the struts may be omitted, for example, as shown in FIG. 21B or otherwise configured as shown in FIGS. 20A-20D and FIG. 21A.

The extensible frame 810 may also comprise extensible arms 820 supporting a cartridge or other suitable bearing assembly 821 receiving or otherwise rotatably coupled to the axles 807 and allowing rotation of the mounting frame 804. The axles 807 with other frame elements may thus form a height adjustable bar to raise, lower, or lock the platform and/or fixtures, and/or tables (if attached) either by hand, mechanically, electronically, or by otherwise. The extensible arms 820 may each comprise a center arm member 822 received into mating receptacles 824. The center arm member 822 and mating receptacles 824 may each comprise, for example, a square or other suitable shape and/or may be keyed. The extensible arms 820 may be lengthened to preset lengths and secured using cotter pins and mating holes in the center arm member 822 and mating receptacles 824.

A gear box similar to gear box 530 may be provided to rotate the mounting frame 804. A robot may also be used to rotate the mounting frame 804. In one embodiment, the mounting frame 804 may be rotated to preset positions and secured with a pin assembly 832. The mounting frame 804 and/or hybrid modular fixturing platforms 806 may be otherwise fixed, secured, or held at a desired position. In use, the three hybrid modular and/or other fixturing platforms 806 may have different configurations of fixturing tools and be rotated to allow access and use of the fixturing tools. Thus work pieces may be fixture on multiple tables angled 60 degrees relative to each other in disparate planes.

Figure 15:
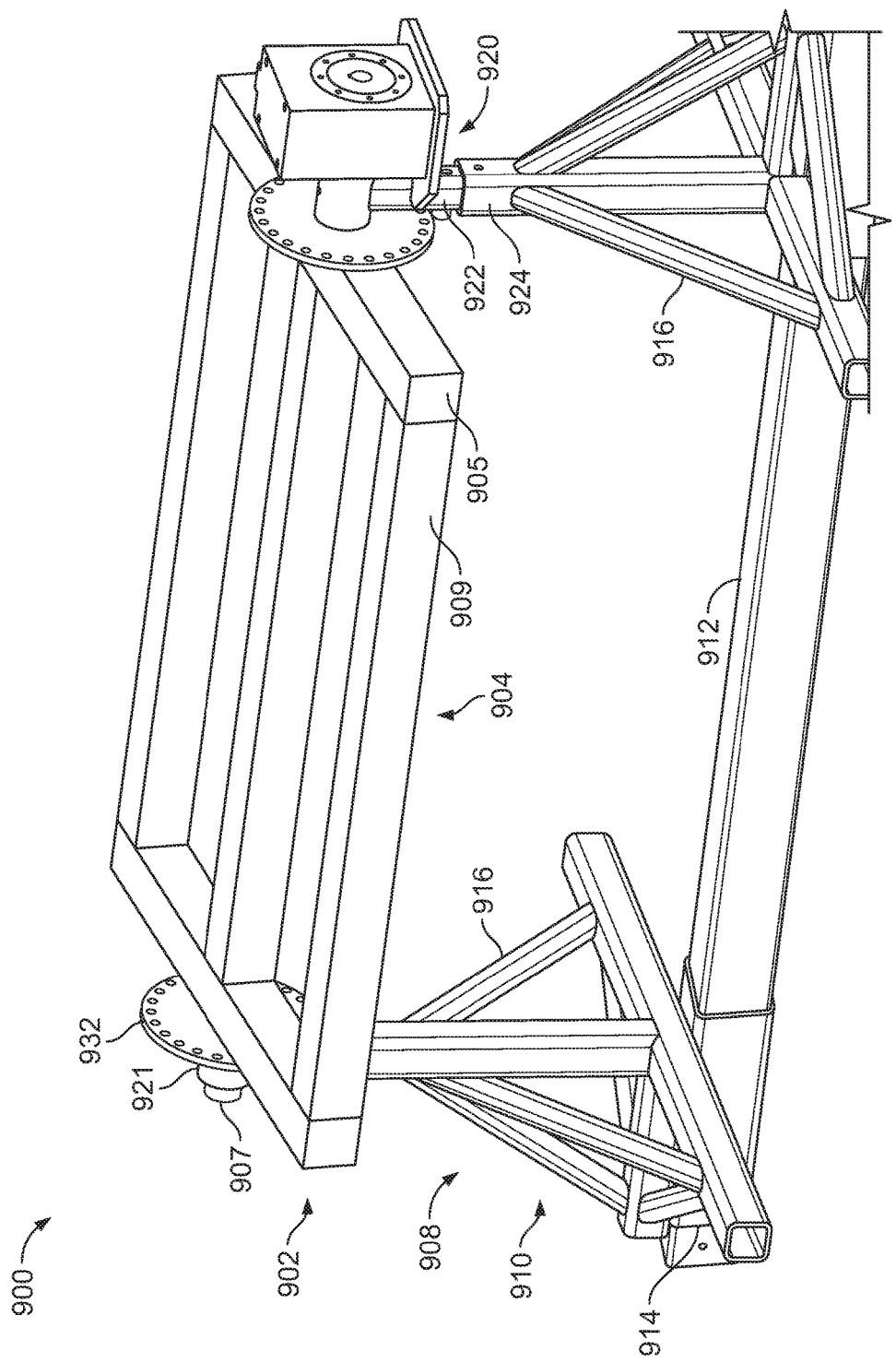
FIG. 15 is a view of a rotatable fixturing platform having a rotisserie and fixturing frame.

FIG. 15 is a view of a rotatable fixturing platform 900 having a rotisserie 902 and fixturing frame 904. The fixturing frame 904 may allow welding or affixing one or more items directly to the platform 900 without a table. In one aspect, the fixturing frame 904 may comprise ends 905 connected by cross members 909 and an axle assembly having one or more axles 907, which may be portions of a same axle, extending outwardly from the ends 805 for connection to the rotisserie 902. The axles 907 may comprise a rod, round tube, or other suitable structure allowing rotation of the fixturing frame 904.

Each end 905 may comprise, for example, a bar. The cross members 909 may each comprise, for example, one or more bars. The bars may be rectangular tubes. The ends 905 and cross members 909 may comprise other suitable structures such as, for example, a truss structure. The cross members 909 and axles 907 may be fixed to ends 905 with, for example, welds or fastenings such as with screws or bolts.

The cross members 909 and axles 907 may be otherwise suitably secured or coupled to ends 905.

The rotisserie 902 may be similar to rotisserie 502 and comprise a base 908 having a frame 910 which may be extensible to adjust length of the base 908. The extensible frame 910 may comprise a support assembly having a center frame member 912 received into mating receptacles 914. The center frame member 912 and mating receptacles 914 may comprise a square shape or may be keyed. The extensible frame 910 may be lengthened to preset lengths and secured using cotter pins and mating holes in the center frame member 912 and mating receptacles 914.

A plurality of vertical and horizontal struts 916 may be included to support the frame and to, for example, add stiffness. Casters with brakes may be provided on a bottom of the extensible frame 810 to allow the rotatable fixturing platform 900 to be readily moved or transported. Other suitable designs may be used for the rotisserie 902, the frame 910, and frame elements. In other embodiments, the frame 910 may be otherwise configured. For example, the frame 910 may be not extensible. The center frame member 912 and/or some or all the struts may be omitted, for example, as shown in FIG. 21B or otherwise configured as shown in FIGS. 20A-20D and FIG. 21A.

The extensible frame 910 may also comprise extensible arms 920 supporting a cartridge or other suitable bearing assembly 921 receiving or otherwise rotatably coupled to the axles 907 and allowing rotation of the fixturing frame 904. The axles 907 may thus form a height adjustable bar to raise, lower, or lock the platform and/or fixtures, and/or tables (if attached) either by hand, mechanically, electronically, or by otherwise. The extensible arms 920 may each comprise a center arm member 922 received into mating receptacles 924. The center arm member 922 and mating receptacles 924 may each comprise, for example, a square or other suitable shape and/or may be keyed. The extensible arms 920 may be lengthened to preset lengths and secured using cotter pins and mating holes in the center arm member 922 and mating receptacles 924.

A gear box similar to gear box 530 may be provided to rotate the fixturing frame 904. In one embodiment, the fixturing frame 904 may be rotated to preset positions and secured with a pin assembly 932. The fixturing frame 904 may be otherwise fixed, secured or held at a desired position.

Figure 16A:
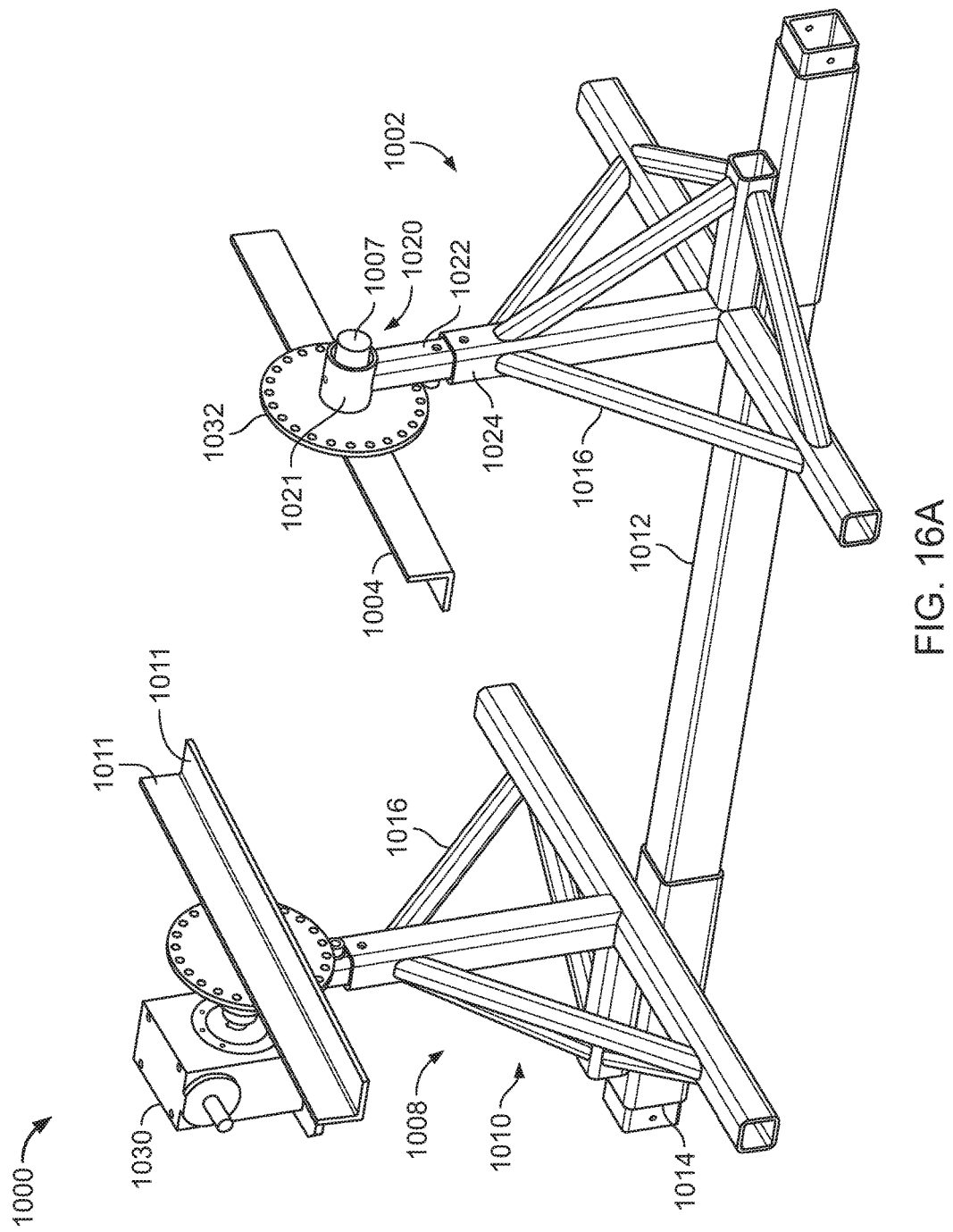
Figure 16B:
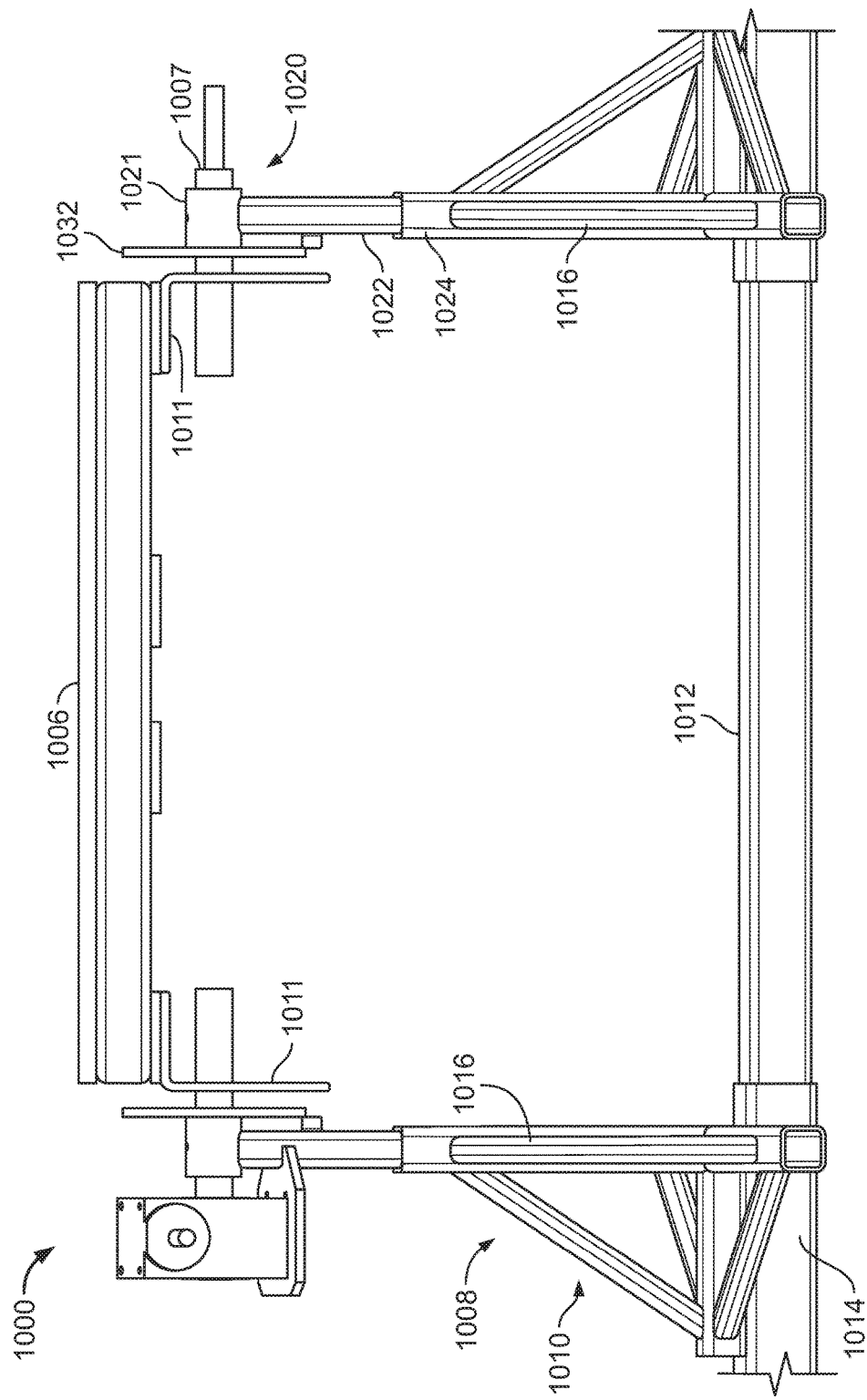

FIGS. 16A-16C are various views of a rotatable fixturing platform 1000 having a rotisserie 1002 and a mounting assembly comprising a set of L-shaped mounting brackets 1004 for one or more hybrid modular and/or other fixturing platforms 1006. In the illustrated embodiments, the hybrid modular fixturing platforms 1006 are shown without plates which may be configured and attached, for example, as described in connections with FIGS. 1-6. In this aspect, the L-shaped mounting brackets 1004 may each comprise an axle assembly having one or more axles 1007, which may be portions of a same axle, extending outwardly from the L-shaped mounting bracket 1004 for connection to the rotisserie 1002.

The L-shaped mounting brackets 1004 may each include one or more attachment points 1011 for hybrid modular and/or other fixturing platforms 1006. In one embodiment, as shown in FIGS. 16B and 16C, the L-shaped mounting brackets 1004 include an attachment point 1011 on each surface of the L shape such that a first hybrid modular fixturing platform 1006 may be affixed outwardly of the L-shaped mounting brackets 1004 and a second hybrid modular and fixturing platform 1006 may be affixed between the L-shaped mounting brackets 1004. When affixed, the two hybrid modular fixturing platforms 1006 may be equidistant from an axis of rotation for balanced rotation. In another embodiment, the L-shaped mounting brackets 1004 may each have only one attachment point. In this embodiment, as shown in FIG. 16A, the hybrid modular and fixturing platform 1006 may be attached between the L-shaped mounting brackets 1004 and lay in the axis of rotation.

The axles 1007 may comprise a rod, round tube, or other suitable structure allowing rotation of the L-shaped mounting bracket 1004. In one embodiment, the axles 1007 may extend through the L-shaped mounting brackets 1004. The axles 1007 may be fixed to the L-shaped mounting brackets 1004 directly or indirectly with, for example, welds or fastenings such as with screws or bolts. The axles 1007 may be otherwise suitably secured or coupled to L-shaped mounting bracket 1004. Each attachment 1011 point may comprise a discrete point or an area with a plurality of discrete points where a hybrid modular fixturing platform 1006 is secured.

The rotisserie 1002 may be similar to rotisserie 502 and comprise a base 1008 having a frame 1010 which may be extensible to adjust length of the base 1008. The extensible frame 1010 may comprise a support assembly having a center frame member 1012 received into mating receptacles 1014. The center frame member 1012 and mating receptacles 1014 may comprise a square shape or may be keyed. The extensible frame 1010 may be lengthened to preset lengths and secured using cotter pins and mating holes in the center frame member 1012 and mating receptacles 1014.

A plurality of vertical and horizontal struts 1016 may be included to support the frame and to, for example, add stiffness. Casters with brakes may be provided on a bottom of the extensible frame 1010 to allow the rotatable fixturing platform 1000 to be readily moved or transported. Other suitable designs may be used for the rotisserie 1002, the frame 1010, and frame elements. In other embodiments, the frame 1010 may be otherwise configured. For example, the frame 1010 may be not extensible. The center frame member 1012 and/or some or all the struts may be omitted, for example, as shown in FIG. 21B or otherwise configured as shown in FIGS. 20A-20D and FIG. 21A.

The extensible frame 1010 may also comprise extensible arms 1020 supporting a cartridge or other suitable bearing assembly 1021 receiving or otherwise rotatably coupled to the axles 1007 and allowing rotation of the L-shaped mounting brackets 1004. The axles 1007 with other frame elements may thus form a height adjustable bar to raise, lower, or lock the platform and/or fixtures, and/or tables (if attached) either by hand, mechanically, electronically, or by otherwise. The extensible arms 1020 may each comprise a center arm member 1022 received into mating receptacles 1024. The center arm member 1022 and mating receptacles 1024 may each comprise, for example, a square or other suitable shape and/or may be keyed. The extensible arms 1020 may be lengthened to preset lengths and secured using cotter pins and mating holes in the center arm member 1022 and mating receptacles 1024.

A gear box 1030 may be provided to rotate the L-shaped mounting brackets 1004. In one embodiment, L-shaped mounting brackets 1004 may be rotated to preset positions and secured with a pin assembly 1032. The L-shaped mounting brackets 1004 and/or hybrid modular fixturing platforms 1006 may be otherwise fixed, secured, or held at a desired position. In use, where provided, multiple hybrid modular and/or other fixturing platforms 1006 may have different configurations of fixturing tools and be rotated to allow access and use of the fixturing tools.

Figure 17A:
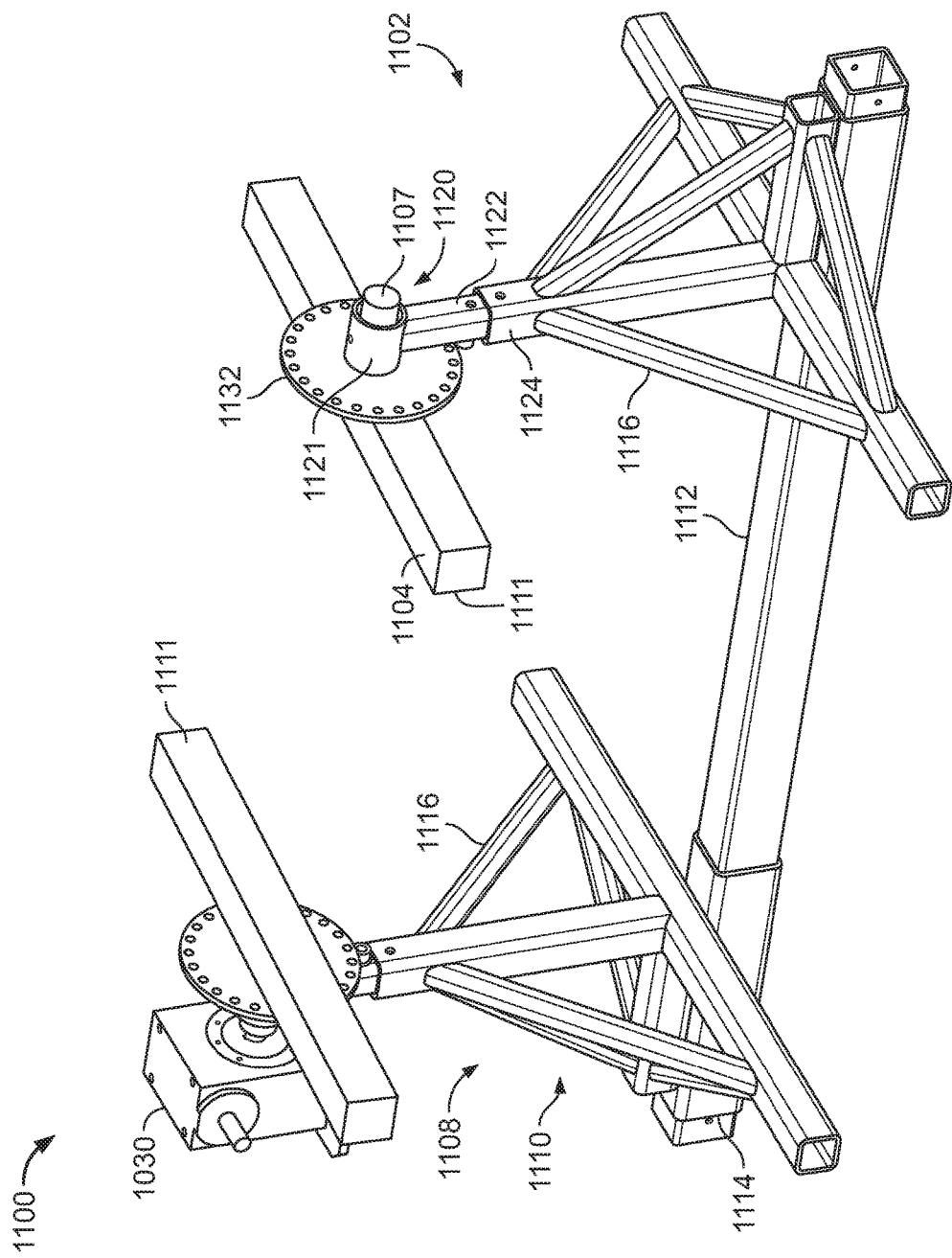
FIGS. 17A-17B are various views of a rotatable fixturing platform having a rotisserie and a bar mounting bracket.
Figure 17B:
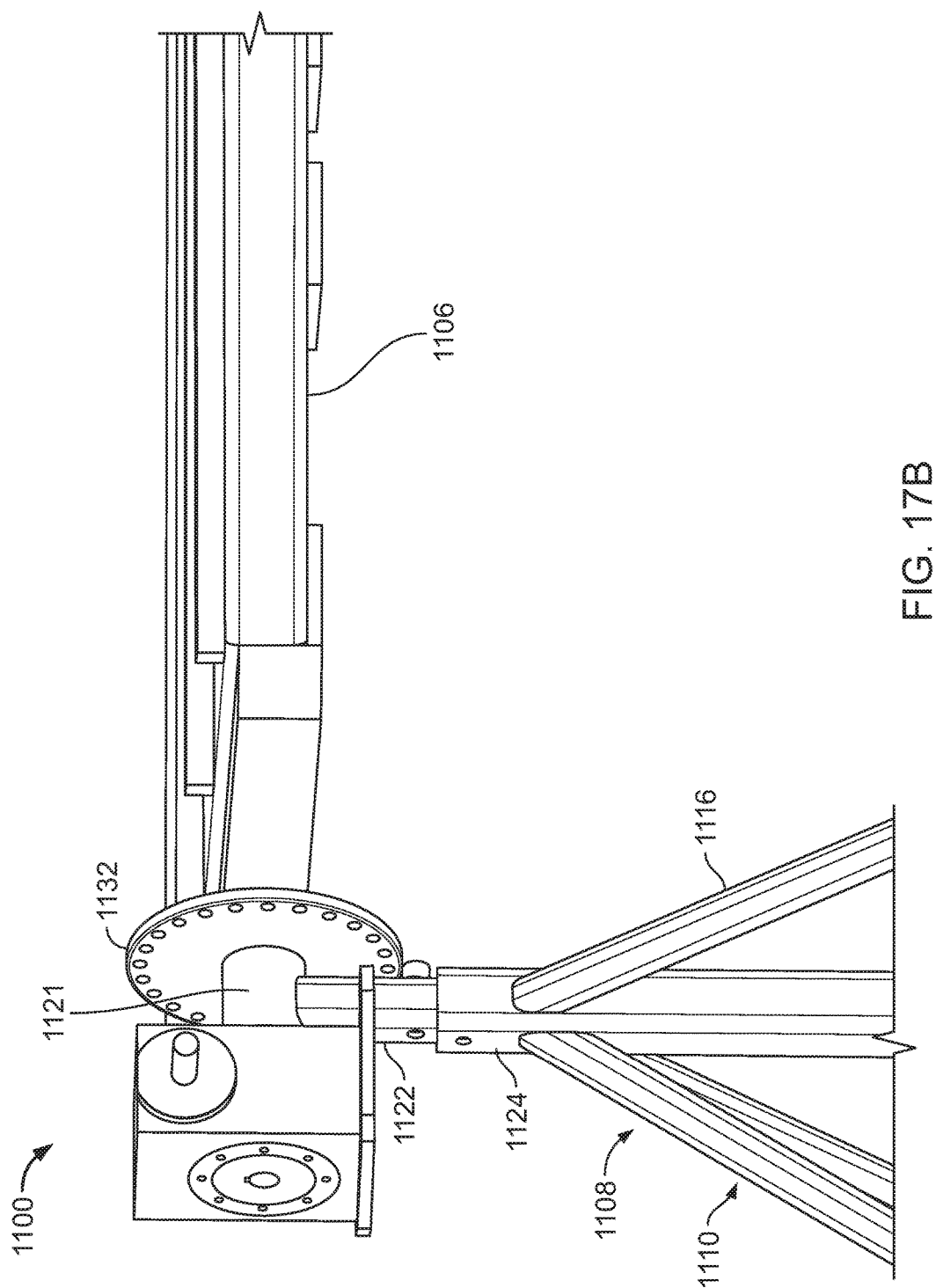

FIGS. 17A-17B are various views of a rotatable fixturing platform 1100 having a rotisserie 1102 and a mounting assembly comprising a set of bar mounting brackets 1104 for one or more hybrid modular and/or other fixturing platforms 1106. In the illustrated embodiment, the hybrid modular fixturing platform 1106 is shown without plates which may be configured and attached, for example, as described in connections with FIGS. 1-6. In this aspect, the bar mounting brackets 1104 may each comprise an axle assembly having one or more axles 1107, which may be portions of a same axle, extending outwardly from the bar mounting bracket 1104 for connection to the rotisserie 1102.

The bar mounting brackets 1104 may each include one or more attachment points 1111 for hybrid modular and/or other fixturing platforms 1106. In one embodiment, the bar mounting brackets 1104 include an attachment point 1111 on an inside surface such that a hybrid modular fixturing platform 1106 may be affixed between the bar mounting brackets 1104. When affixed, the hybrid modular fixturing platform 1106 may lay in the axis of rotation for balanced rotation.

The axles 1107 may comprise a rod, round tube, or other suitable structure allowing rotation of the bar mounting bracket 1104. In one embodiment, the axles 1107 may extend through the bar mounting brackets 1104. The axles 1107 may be fixed to the bar mounting brackets 1104 directly or indirectly with, for example, welds or fastenings such as with screws or bolts. The axles 1107 may be otherwise suitably secured or coupled to bar mounting bracket 1104. Each attachment point 1111 may comprise a discrete point or an area with a plurality of discrete points where a hybrid modular fixturing platform 1106 is secured.

The rotisserie 1102 may be similar to rotisserie 502 and comprise a base 1108 having a frame 1110 which may be extensible to adjust length of the base 1108. The extensible frame 1110 may comprise a support assembly having a center frame member 1112 received into mating receptacles 1114. The center frame member 1112 and mating receptacles 1114 may comprise a square shape or may be keyed. The extensible frame 1110 may be lengthened to preset lengths and secured using cotter pins and mating holes in the center frame member 1112 and mating receptacles 1114.

A plurality of vertical and horizontal struts 1116 may be included to support the frame and to, for example, add stiffness. Casters with brakes may be provided on a bottom of the extensible frame 1110 to allow the rotatable fixturing platform 1100 to be readily moved or transported. Other suitable designs may be used for the rotisserie 1102, the frame 1110, and frame elements. In other embodiments, the frame 1110 may be otherwise configured. For example, the frame 1110 may be not extensible. The center frame member 1112 and/or some or all the struts may be omitted, for example, as shown in FIG. 21B or otherwise configured as shown in FIGS. 20A-D and FIG. 21A.

The extensible frame 1110 may also comprise extensible arms 1120 supporting a cartridge or other suitable bearing assembly 1121 receiving or otherwise rotatably coupled to the axles 1107 and allowing rotation of the bar mounting brackets 1104. The axles 1107 with other frame members may thus form a height adjustable bar to raise, lower, or lock the platform and/or fixtures, and/or tables (if attached) either by hand, mechanically, electronically, or by otherwise. The extensible arms 1120 may each comprise a center arm member 1122 received into mating receptacles 1124. The center arm member 1122 and mating receptacles 1124 may each comprise, for example, a square or other suitable shape and/or may be keyed. The extensible arms 1120 may be lengthened to preset lengths and secured using cotter pins and mating holes in the center arm member 1122 and mating receptacles 1124.

A gear box 1130 may be provided to rotate the bar mounting bracket 1104. In one embodiment bar mounting brackets 1104 may be rotated to preset positions and secured with a pin assembly 1132. The bar mounting brackets 1104 and/or hybrid modular fixturing platforms 1106 may be otherwise fixed, secured, or held at a desired position.

Figure 18:
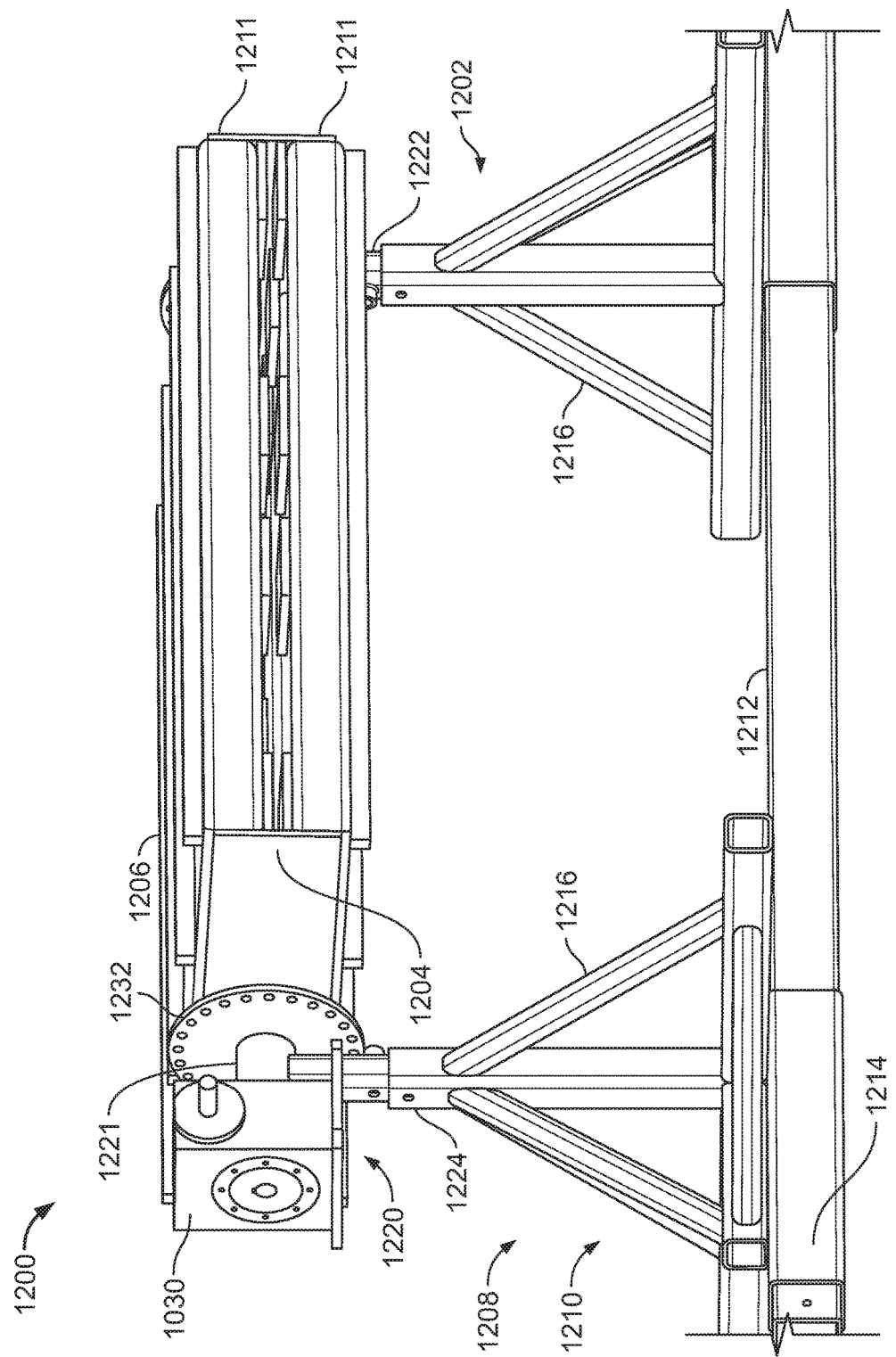
FIG. 18 is a perspective view of a rotatable fixturing platform having a rotisserie and a flat mounting bracket with two hybrid modular welding tables attached to the flat mounting bracket.

FIG. 18 is a perspective view of a rotatable fixturing platform 1200 having a rotisserie 1202 and a mounting assembly comprising a set of flat mounting brackets 1204 for one or more hybrid modular and/or other fixturing platforms 1206. In the illustrated embodiment, the hybrid modular fixturing platforms 1206 are shown without plates which may be configured and attached, for example, as described in connections with FIGS. 1-6. In this aspect, the flat mounting brackets 1204 may each comprise an axle assembly having one or more axles 1207, which may be portions of a same axle, extending outwardly from the flat mounting bracket 1204 for connection to the rotisserie 1202.

The flat mounting brackets 1204 may each include one or more attachment points 1211 for hybrid modular and/or other fixturing platforms 1206. In one embodiment, the flat mounting brackets 1204 include a plurality of attachment points 1211 such that a first hybrid modular fixturing platform 1206 may be affixed between the flat mounting brackets 1204 and a second hybrid modular and fixturing platform 1206 may be also affixed between the flat mounting brackets 1204. When affixed, the two hybrid modular fixturing platforms 1206 may be equidistant from an axis of rotation for balanced rotation. In another embodiment, the flat mounting brackets 1204 may each have only one attachment point. In this embodiment the hybrid modular and fixturing platform 1206 may be attached between the flat mounting brackets 1204 and lay in the axis of rotation.

The axles 1207 may comprise a rod, round tube, or other suitable structure allowing rotation of the bar mounting bracket 1204. In one embodiment, the axles 1207 may extend through the bar mounting brackets 1204. The axles 1207 may be fixed to the bar mounting brackets 1204 directly or indirectly with, for example, welds or fastenings such as with screws or bolts. The axles 1207 may be otherwise suitably secured or coupled to bar mounting bracket 1204. Each attachment point 1211 may comprise a discrete point or an area with a plurality of discrete points where a hybrid modular fixturing platform 1206 is secured.

The rotisserie 1202 may be similar to rotisserie 502 and comprise a base 1208 having a frame 1210 which may be extensible to adjust length of the base 1208. The extensible frame 1210 may comprise a support assembly having a center frame member 1212 received into mating receptacles 1214. The center frame member 1212 and mating receptacles 1214 may comprise a square shape or may be keyed. The extensible frame 1210 may be lengthened to preset lengths and secured using cotter pins and mating holes in the center frame member 1212 and mating receptacles 1214.

A plurality of vertical and horizontal struts 1116 may be included to support the frame and to, for example, add stiffness. Casters with brakes may be provided on a bottom of the extensible frame 1210 to allow the rotatable fixturing platform 1200 to be readily moved or transported. Other suitable designs may be used for the rotisserie 1202, the frame 1210, and frame elements. In other embodiments, the frame 1210 may be otherwise configured. For example, the frame 1210 may be not extensible. The center frame member 1212 and/or some or all the struts may be omitted, for example, as shown in FIG. 21B or otherwise configured as shown in FIGS. 20A-20D and FIG. 21A.

The extensible frame 1210 may also comprise extensible arms 1220 supporting a cartridge or other suitable bearing assembly 1221 receiving or otherwise rotatably coupled to the axles 1207 and allowing rotation of the bar mounting brackets 1204. The axles 1207 with other frame members may thus form a height adjustable bar to raise, lower, or lock the platform and/or fixtures, and/or tables (if attached) either by hand, mechanically, electronically, or by otherwise. The extensible arms 1220 may each comprise a center arm member 1222 received into mating receptacles 1224. The center arm member 1222 and mating receptacles 1224 may each comprise, for example, a square or other suitable shape and/or may be keyed. The extensible arms 1220 may be lengthened to preset lengths and secured using cotter pins or threaded fasteners and mating holes in the center arm member 1222 and mating receptacles 1224.

A gear box 1230 may be provided to rotate the bar mounting bracket 1204. In one embodiment, bar mounting brackets 1204 may be rotated to preset positions and secured with a pin assembly 1232. The bar mounting brackets 1204 and/or hybrid modular fixturing platforms 1206 may be otherwise fixed, secured or held at a desired position.

Figure 19A:
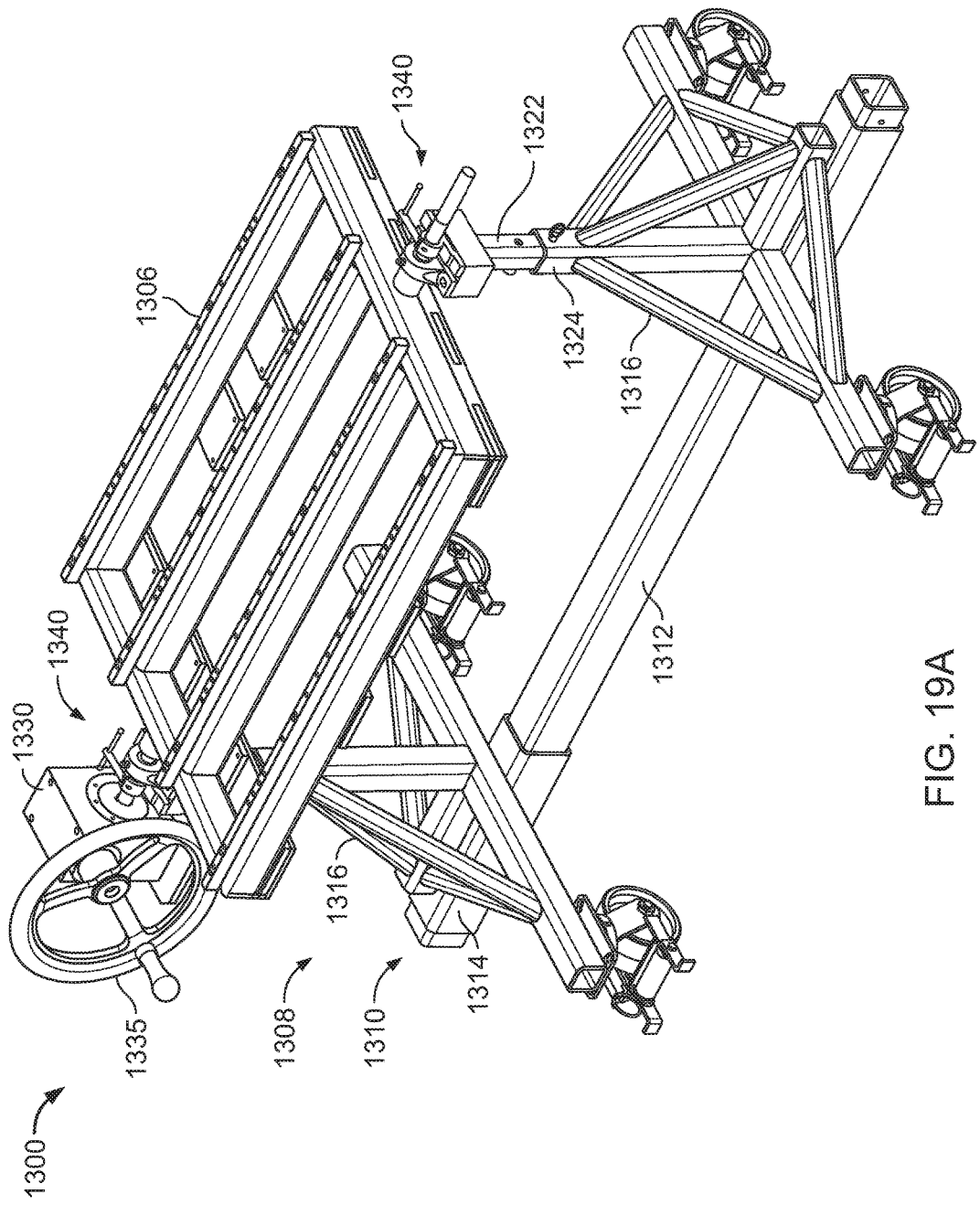
Figure 19C:
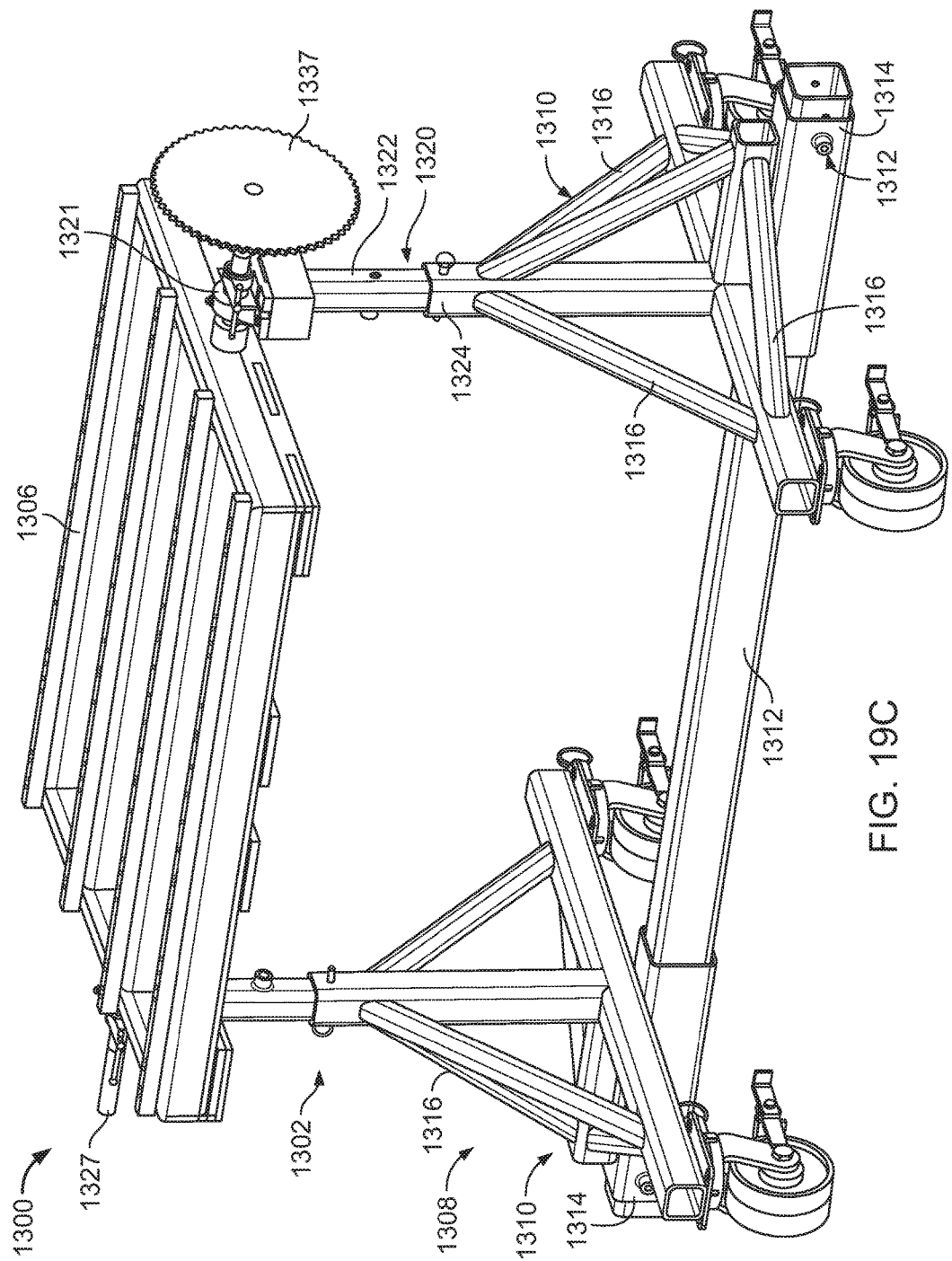

FIGS. 19A-19C are various views and embodiments of a rotatable fixturing platform 1300 having a rotisserie 1302 with an axle brake, pillow bearing, and servo motor sprocket for rotating and securing at any suitable angle one or more hybrid modular and/or other fixturing platforms 1306. In the illustrated embodiments, the hybrid modular fixturing platform 1306 is shown without plates which may be configured and attached, for example, as described in connections with FIGS. 1-6.

A mounting bracket including one or more attachment points and an axle, such as described in FIGS. 16-18, may be used to mount the hybrid modular fixturing platform 1306 to the rotisserie 1302. In the illustrated embodiment, the hybrid modular fixturing platform 1306 is directly connected to an axle assembly having a set of axles 1307, which may be portions of a same axle, extending outwardly from opposite sides of the hybrid modular fixturing platform 1306 for connection to the rotisserie 1302. Thus, the hybrid modular fixturing platform 1306 may lay in the axis of rotation for balanced rotation.

The axles 1307 may comprise a rod, round tube, or other suitable structure allowing rotation of the hybrid modular fixturing platform 1306. The axles 1307 may be fixed to the hybrid modular fixturing platform 1306 with, for example, welds or fastening such as with screws or bolts. Thus, the axles 1307 may be threaded and screw into the hybrid modular fixturing platform 1306. The axles 1307 may be otherwise suitably secured or coupled to hybrid modular fixturing platform 1306.

The rotisserie 1302 may be similar to rotisserie 502 and comprise a base 1308 having a frame 1310 which may be extensible to adjust length of the base 1308. The extensible frame 1310 may comprise a support assembly having a center frame member 1312 received into mating receptacles 1314. The center frame member 1312 and mating receptacles 1314 may comprise a square shape or may be keyed. The extensible frame 1310 may be lengthened to preset lengths and secured using cotter pins and mating holes in the center frame member 1312 and mating receptacles 1314.

A plurality of vertical and horizontal struts 1316 may be included to support the frame and to, for example, add stiffness. Casters with brakes 1315 may be provided on a bottom of the extensible frame 1310 to allow the rotatable fixturing platform 1300 to be readily moved or transported. Other suitable designs may be used for the rotisserie 1302, the frame 1310, and frame elements. In other embodiments, the frame 1310 may be otherwise configured. For example, the frame 1310 may be not extensible. The center frame member 1312 and/or some or all the struts may be omitted, for example, as shown in FIG. 21B or otherwise configured as shown in FIGS. 20A-20D and FIG. 21A.

The extensible frame 1310 may also comprise extensible arms 1320 supporting a pillow bearing assembly 1321 receiving the axles 1307 and allowing rotation of the hybrid modular fixturing platform 1306. The axles 1307 with other frame elements may thus form a height adjustable bar to raise, lower, or lock the platform and/or fixtures, and/or tables (if attached) either by hand, mechanically, electronically, pneumatically, via servo motors, robots, or by otherwise. The pillow bearings 1321 may comprise a housing 1325 encasing a cartridge bearing 1327. The cartridge bearing may include a sleeve into which the axle 1307 is fit. The extensible arms 1320 may each comprise a center arm member 1322 received into mating receptacles 1324. The center arm member 1322 and mating receptacles 1324 may each comprise, for example, a square or other suitable shape and/or may be keyed. The extensible arms 1320 may be lengthened to preset lengths and secured using cotter pins and mating holes in the center arm member 1322 and mating receptacles 1324.

A gear box 1330 may be provided to rotate the hybrid modular fixturing platform 1306. In one embodiment, hybrid modular fixturing platform 1306 may be rotated using a handle 1335 of the gear box 1330. The hybrid modular fixturing platform 1306 may be rotated to preset positions and secured with a pin assembly.

Alternatively or in addition, a servo motor sprocket 1337 may be fixed or otherwise secured to an axle 1307 and directly or indirectly connected to a servo motor for motorized and/or automated rotation of the hybrid modular fixturing platform 1306. For example, the servo motor sprocket 1337 may be secured to the axle 1307 with a screw, welding, or both, or friction fit.

The servo motor may comprise a rotary actuator and allow precise control of position of the hybrid modular fixturing platform 1306, as well as rotation rate and acceleration. The servo motor may comprise a suitable motor coupled to a sensor for position feedback and a controller. The controller may comprise a processor, memory, input controls and output for controlling the motor. The servo motor may be part of a CNC system, coordinated with an outside agent (another machine, operator, process, etc.), or measured with a device to determine the range, type, frequency, speed, or type of movement.

One or more axle brakes 1340 may be provided to clamp, secure against rotation, or otherwise hold the axles 1307 and thus the hybrid modular fixturing platform 1306 at any position, orientation, or angle. Each axle brake 1340 may be fixed to an extensible arms 1320 and comprise a clamp or other clamping or variable friction mechanism for securing an axle 1307 in place. In the illustrated embodiment, the axle brake 1340 comprises a clamp 1342 with a threaded hole 1344 through which a threaded screw 1346 is inserted. The screw 1346 is threaded at one end with the other end having a metal bar 1348 that is perpendicular to the s threaded crew 1346 and used to tighten the clamp 1342. In some embodiments, the rotating assembly may be placed on a levelling assembly 1341 to allow for the alignment of the rotating shaft. The levelling assembly 1341 may comprise a plate 1343 leveled by a plurality of leveling screws 1347 threaded through a base 1349. In a particular embodiment, the levelling assembly 1341 comprised three leveling screws 1347 with two at the corners of one end and one at the center of the opposite end. The levelling assembly 1341 may comprise other suitable number of leveling screws and/or other components or mechanisms.

The axle brake 1340 may be fitted to extensible arms in any of the embodiments of FIGS. 11-18 and 20-21 and used with or in place of a pin assembly. In addition, the pillow bearing assembly 1321 may be fitted to extensible arms in any of the embodiments of FIGS. 11-18 and 20-21 and used with or in place of other bearings. The hybrid modular fixturing platform 1306 may be otherwise fixed, secured, or held at a desired position.

Figure 20A:
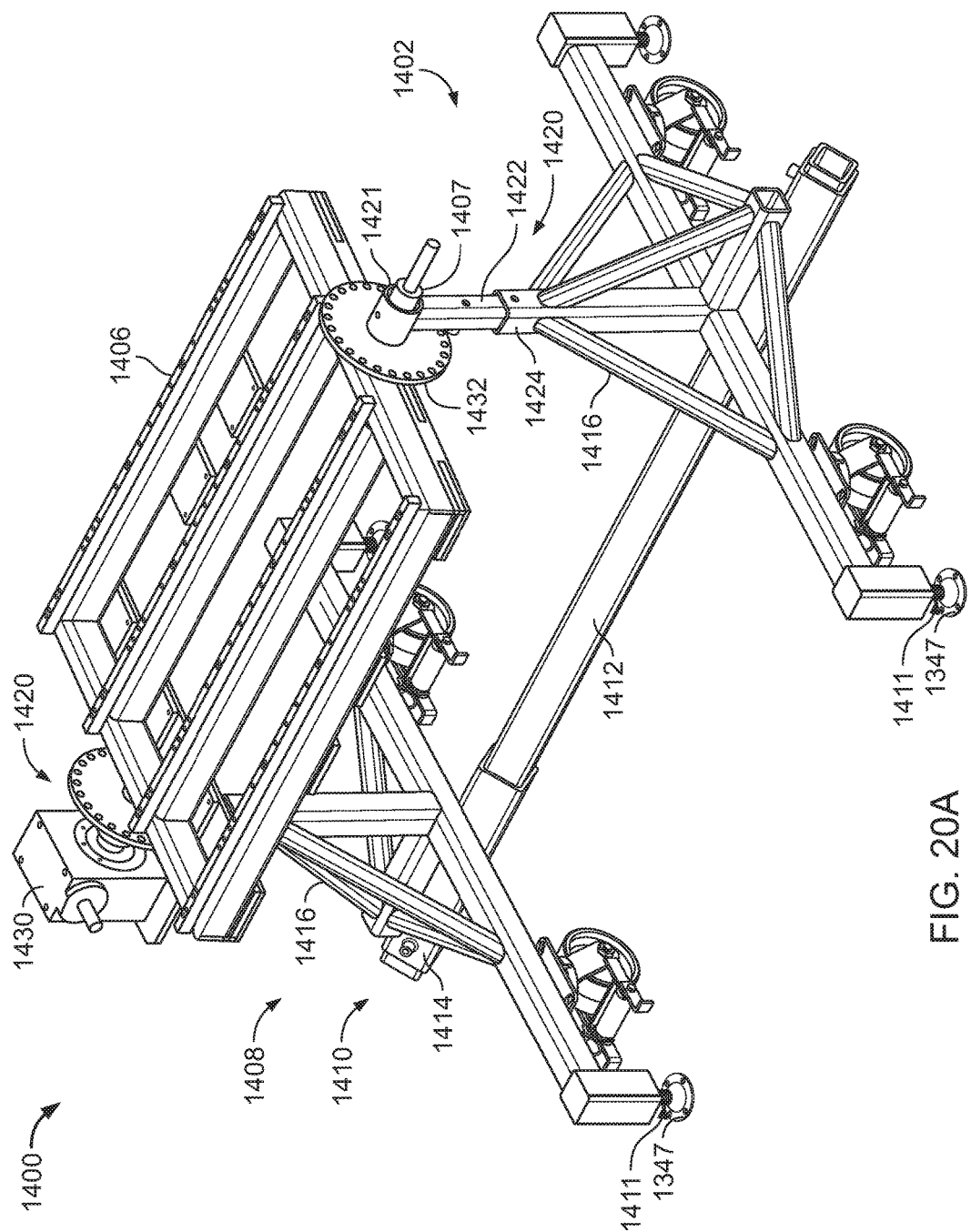
FIGS. 20A-20D are views of a rotatable fixturing platform having a rotisserie with various cross members.
Figure 20B:
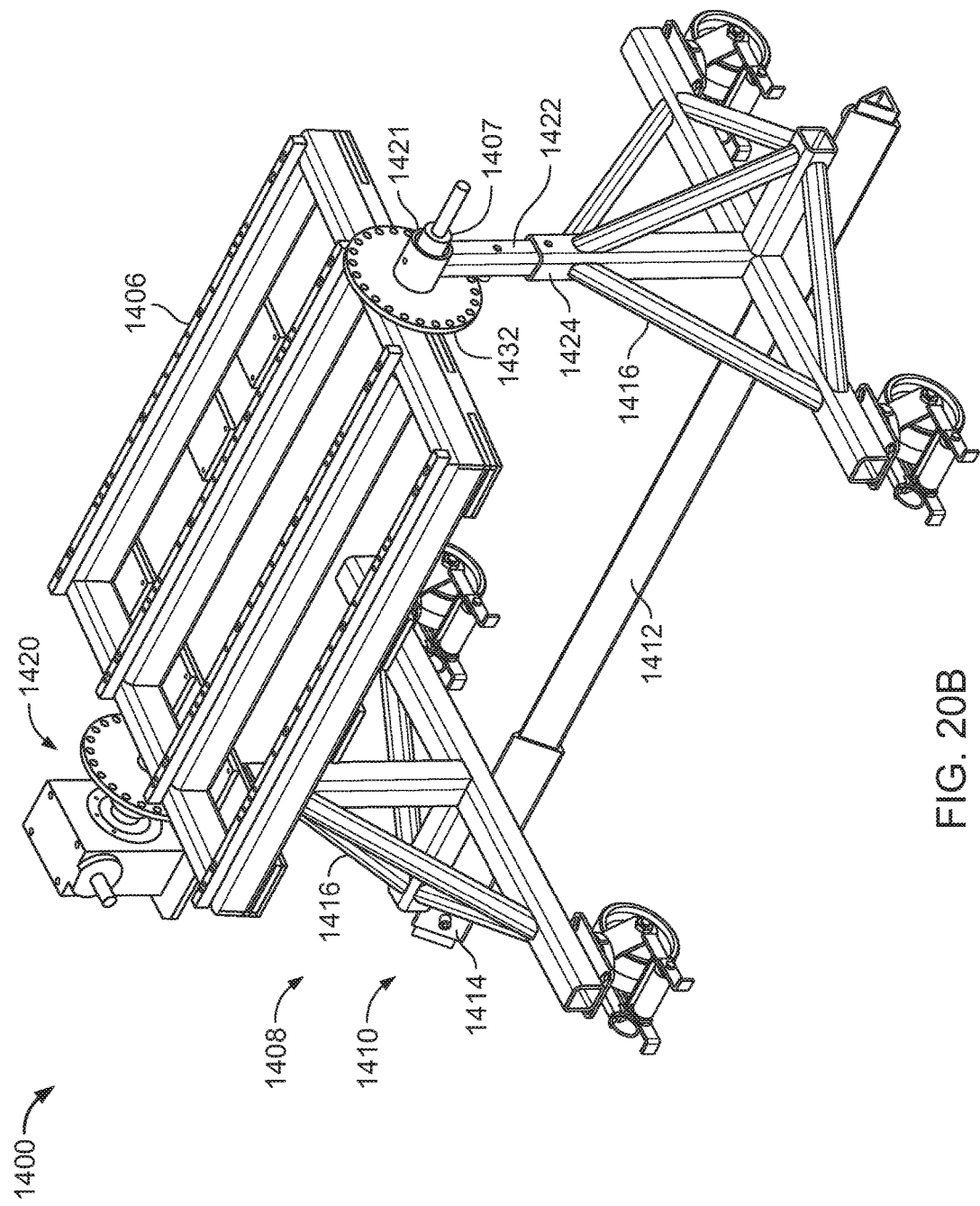
Figure 20C:
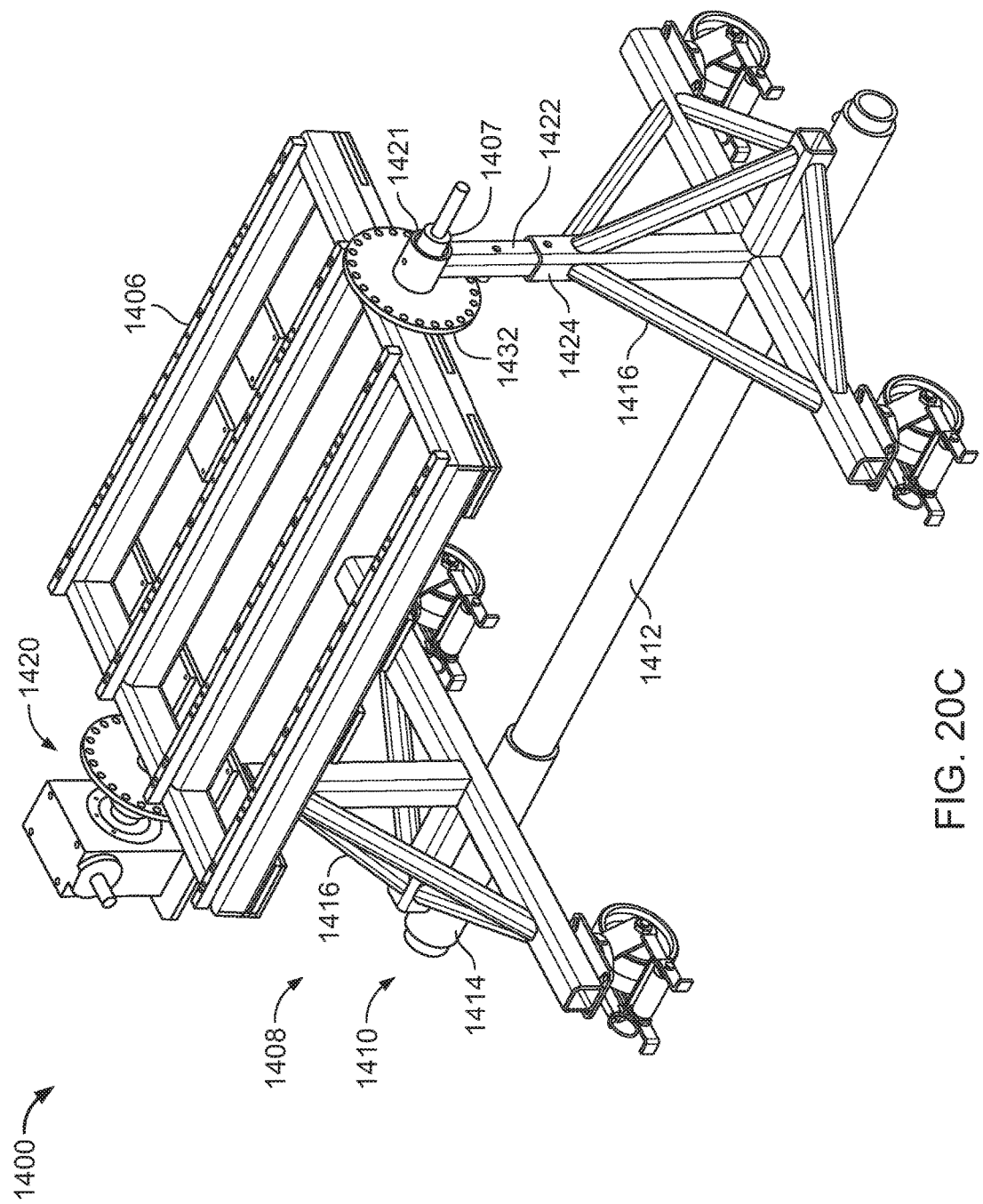
Figure 20D:
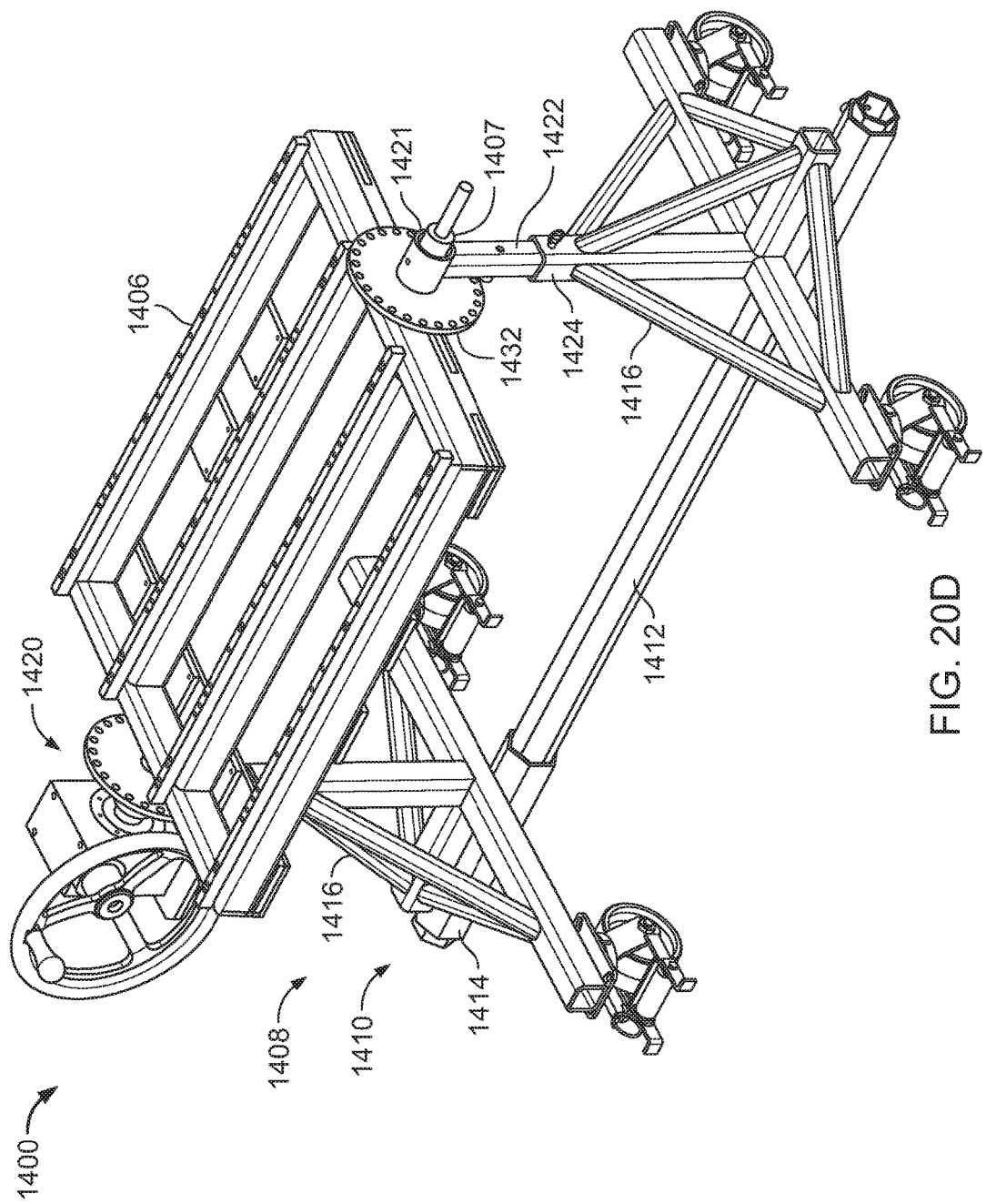

FIGS. 20A-20D are views of a rotatable fixturing platform 1400 having a rotisserie 1402 with various cross member configurations for rotating and securing at any suitable angle one or more hybrid modular and/or other fixturing platforms 1406. In particular, FIG. 20A shows the rotisserie 1402 with a 45 degree cross member, FIG. 20B shows the rotisserie 1402 with a triangular cross member having a triangular cross section, FIG. 20C shows the rotisserie 1402 with a circular cross member having a round cross section, and FIG. 20D shows the rotisserie 1402 with a hexagonal cross member having a hexagonal cross section. In the illustrated embodiments, the hybrid modular fixturing platform 1406 is shown without plates which may be configured and attached, for example, as described in connections with FIGS. 1-6.

A mounting bracket including one or more attachment points and an axle, such as described in FIGS. 16-18, may be used to mount the hybrid modular fixturing platform 1406 to the rotisserie 1402. In the illustrated embodiment, the hybrid modular fixturing platform 1406 is directly connected to an axle assembly having a set of axles 1407, which may be portions of a same axle, extending outwardly from opposite sides of the hybrid modular fixturing platform 1406 for connection to the rotisserie 1402. Thus, the hybrid modular fixturing platform 1406 may lay in the axis of rotation for balanced rotation.

The axles 1407 may comprise a rod, round tube, or other suitable structure allowing rotation of the hybrid modular fixturing platform 1406. The axles 1407 may be fixed to the hybrid modular fixturing platform 1406 with, for example, welds or fastening such as with screws or bolts. Thus, the axles 1407 may be threaded and screw into the hybrid modular fixturing platform 1406. The axles 1407 may be otherwise suitably secured or coupled to hybrid modular fixturing platform 1406.

The rotisserie 1402 may be similar to rotisserie 502 and comprise a base 1408 having a frame 1410 which may be extensible to adjust the length of the base 1408. The extensible frame 1410 may comprise a support assembly having a center frame member 1412 received into mating receptacles 1414. The center frame member 1412 and mating receptacles 1414 may comprise any suitable shape and/or may be keyed. In one embodiment, center frame member 1412 and mating receptacles 1414 may be square and may be offset at a 45 degree angle as shown in FIG. 20A. In another embodiment, center frame member 1412 and mating receptacles 1414 may be triangular as shown in FIG. 20B. The triangle may be equilateral or otherwise. In yet another embodiment, center frame member 1412 and mating receptacles 1414 may be round as shown in FIG. 20C. In still another embodiment, center frame member 1412 and mating receptacles 1414 may be many sided such as hexagonal as shown in FIG. 20D. These different configurations of the center frame member may be used with any of the rotisserie embodiments of FIGS. 11-19 and 21.

The extensible frame 1410 may be lengthened to preset lengths and secured using cotter pins and mating holes in the center frame member 1412 and mating receptacles 1414. A plurality of vertical and horizontal struts 1416 may be included to support the frame and to, for example, add stiffness. Casters with brakes 1415 may be provided on a bottom of the extensible frame 1410 to allow the rotatable fixturing platform 1400 to be readily moved or transported. The casters 1415 in this and other embodiments may comprise leveling casters. Also, in this and other embodiments of the present disclosure, outriggers 1411 may be attached to the bottom braces to allow for threaded or welded levelling feet to be attached to the bottom frame and support and/or level the fixturing platform. Other suitable designs may be used for the rotisserie 1402, the frame 1410, and frame elements. In other embodiments, the frame 1410 may be otherwise configured. For example, the frame 1410 may be not extensible. Some or all the struts may be omitted or otherwise configured. For example, in the embodiments of the present disclosure, the bottom brace may comprise the mating receptacles 1424 as illustrated in FIGS. 11A-D.

The extensible frame 1410 may also comprise extensible arms 1420 supporting a cartridge or other suitable bearing assembly receiving the axles 1407 and allowing rotation of the hybrid modular fixturing platform 1406. The axles 1407 with other frame members may thus form a height adjustable bar to raise, lower, or lock the platform and/or fixtures, and/or tables (if attached) either by hand, mechanically, electronically, or by otherwise. The extensible arms 1420 may each comprise a center arm member 1422 received into mating receptacles 1424. The center arm member 1422 and mating receptacles 1424 may each comprise, for example, a square or other suitable shape and/or may be keyed. The extensible arms 1420 may be lengthened to preset lengths and secured using cotter pins and mating holes in the center arm member 1422 and mating receptacles 1424.

A gear box 1430 may be provided to rotate the hybrid modular fixturing platform 1406. In one embodiment, hybrid modular fixturing platform 1406 may be rotated using a handle of the gear box 1430. The hybrid modular fixturing platform 1406 may be rotated to preset positions and secured with a pin assembly 1432. The pin assembly 1432 may have a different hole pattern to accommodate different platens and/or braking mechanisms to allow for a different center of gravity depending on the number of items, plates and/or fixturing tables placed on the shaft. The hybrid modular fixturing platform 1406 may be otherwise fixed, secured, or held at a desired position.

Figure 21A:
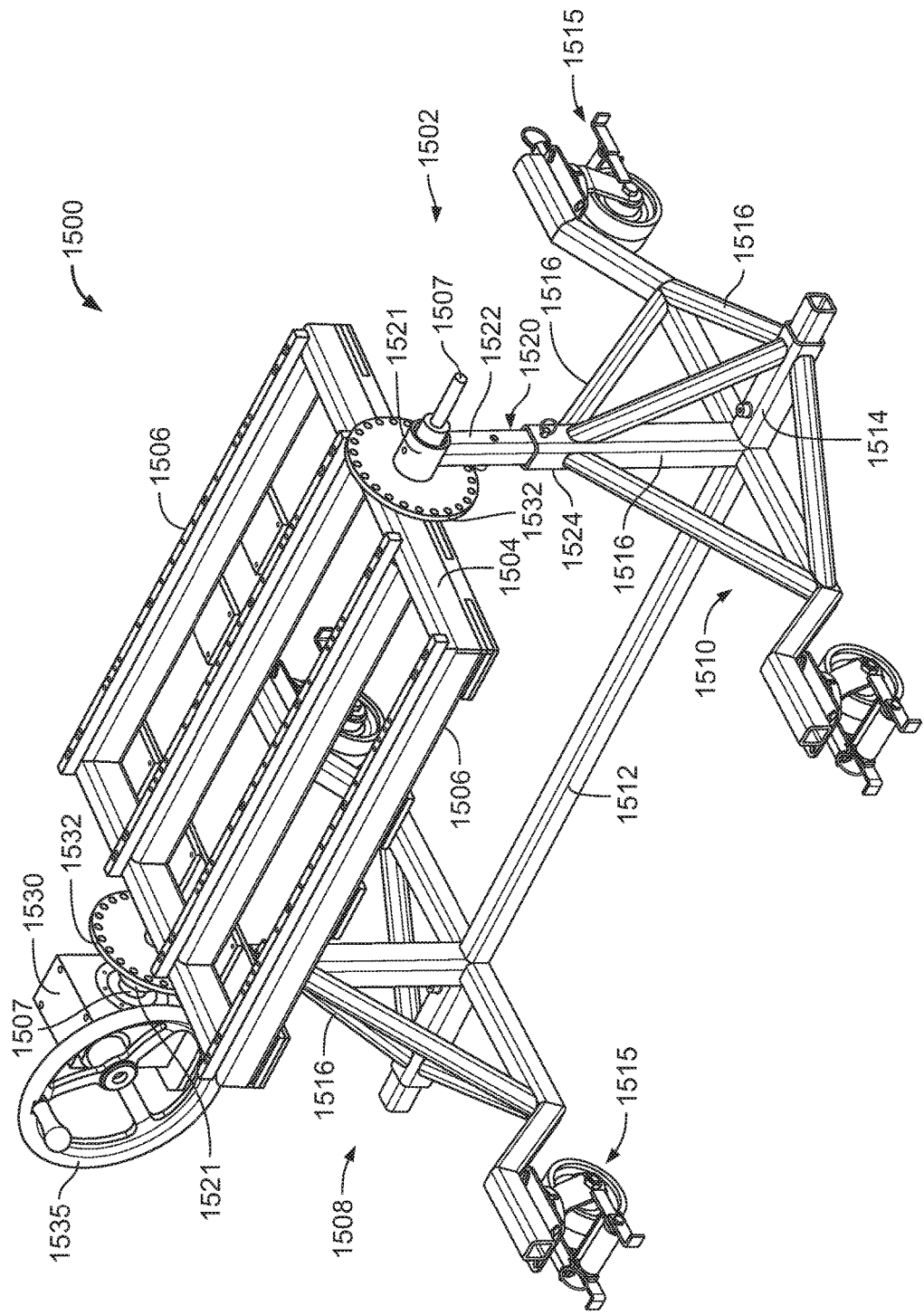
FIGS. 21A-21B are views of a rotatable fixturing platform having a rotisserie with various dog legged frames.
Figure 21B:
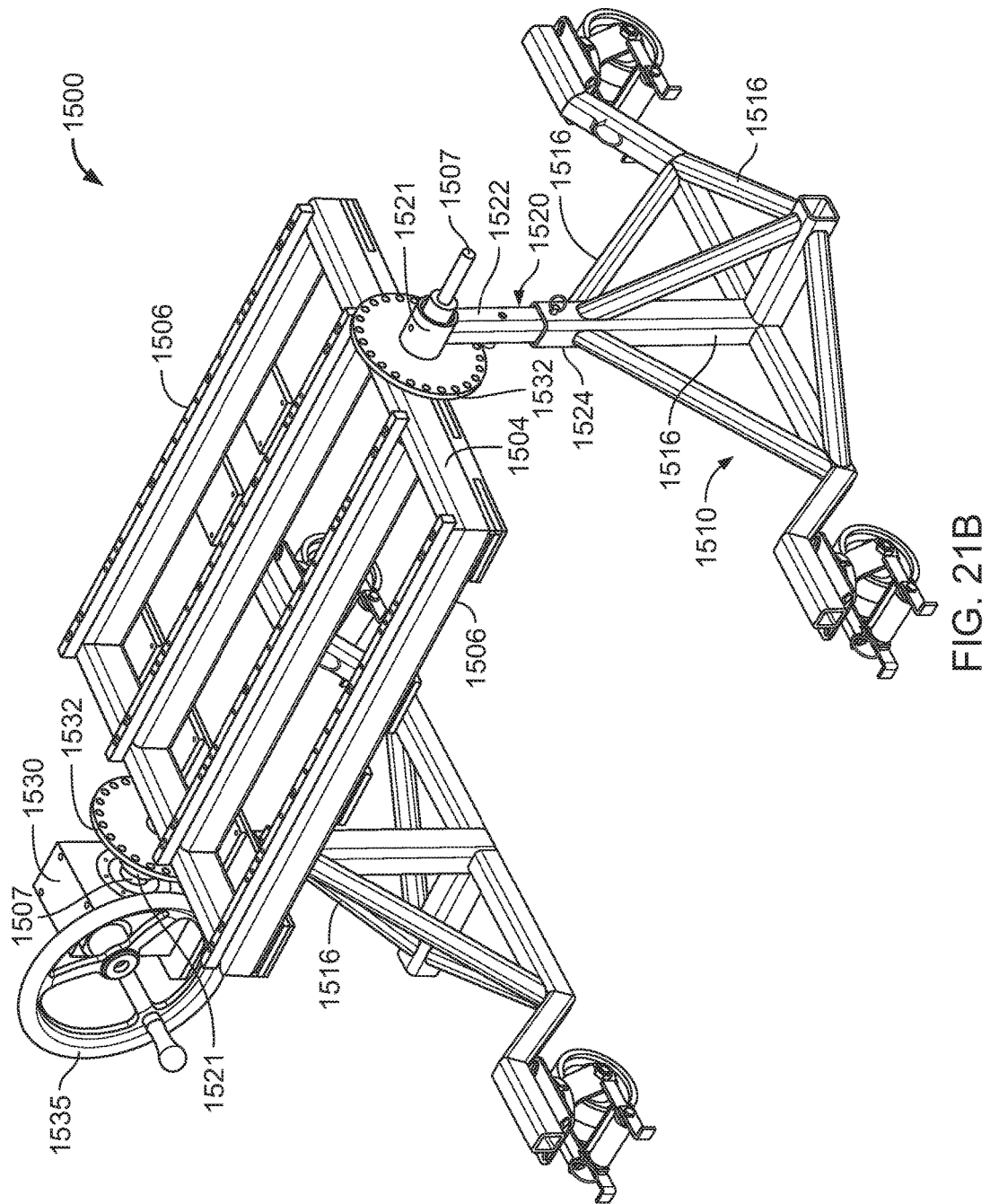

FIGS. 21A-21B are views of a rotatable fixturing platform 1500 having a rotisserie 1502 with various dog legged frames for rotating and securing at any suitable angle one or more hybrid modular and/or other fixturing platforms 1506. FIG. 21A illustrates a dogged legged frame having a center frame member and FIG. 21B illustrates a dogged legged frame without a center frame member. In the illustrated embodiments, the hybrid modular fixturing platform 1506 is shown without plates which may be configured and attached, for example, as described in connections with FIGS. 1-6.

A mounting bracket including one or more attachment points and an axle, such as described in FIGS. 16-18, may be used to mount the hybrid modular fixturing platform 1506 to the rotisserie 1502. In the illustrated embodiment, the hybrid modular fixturing platform 1506 is directly connected to an axle assembly having a set of axles 1507, which may be portions of a same axle, extending outwardly from opposite sides of the hybrid modular fixturing platform 1506 for connection to the rotisserie 1502. Thus, the hybrid modular fixturing platform 1506 may lay in the axis of rotation for balanced rotation.

The axles 1507 may comprise a rod, round tube, or other suitable structure allowing rotation of the hybrid modular fixturing platform 1506. The axles 1507 may be fixed to the hybrid modular fixturing platform 1506 with, for example, welds or fastening such as with screws or bolts. Thus, the axles 1507 may be threaded and screw into the hybrid modular fixturing platform 1506. The axles 1507 may be otherwise suitably secured or coupled to hybrid modular fixturing platform 1506.

The rotisserie 1502 may be similar to rotisserie 502 and comprise a base 1508 having a frame 1510 which may be extensible to adjust length of the base 1508. The extensible frame 1510 may comprise a support assembly having a center frame member 1512 received into mating receptacles 1514. The center frame member 1512 and mating receptacles 1514 may comprise any suitable shape and/or may be keyed. In one embodiment, the center frame member 1512 may be omitted as shown by FIG. 21B. The center frame member 1512 may be omitted in any of the rotisserie embodiments of FIGS. 11-20.

The extensible frame 1510 may be lengthened to preset lengths and secured using cotter pins and mating holes in the center frame member 1512 and mating receptacles 1514. Where the center frame member 1512 is omitted, the length of the extensible frame 1510 may be based on the length of the hybrid modular fixturing platform 1506 with each leg fixed to an axle 1507 of the hybrid modular fixturing platform 1506.

A plurality of vertical and horizontal struts 1516 may be included to support the frame and to, for example, add stiffness. Casters with brakes 1515 may be provided on a bottom of the extensible frame 1510 to allow the rotatable fixturing platform 1500 to be readily moved or transported. In the illustrated embodiment, the extensible frame 1510 may be dog legged to lower the center of gravity. For example, the bottom of each leg of the extensible frame 1510 may be bent downwardly from the top of the casters 1515 such that the base of each leg is below the top of the casters. Other suitable designs may be used for the rotisserie 1502 and the extensible frame 1510. In other embodiments, the frame 1510 may be otherwise configured. For example, the frame 1510 may be not extensible. Some or all the struts may be omitted or otherwise configured.

The extensible frame 1510 may also comprise extensible arms 1520 supporting a cartridge or other suitable bearing assembly 1521 receiving the axles 1507 and allowing rotation of the hybrid modular fixturing platform 1506. The axles 1507 with other frame elements may thus form a height adjustable bar to raise, lower, or lock the platform and/or fixtures, and/or tables (if attached) either by hand, mechanically, electronically, or by otherwise. The extensible arms 1520 may each comprise a center arm member 1522 received into mating receptacles 1524. The center arm member 1522 and mating receptacles 1524 may each comprise, for example, a square or other suitable shape and/or may be keyed. The extensible arms 1520 may be lengthened to preset lengths and secured using cotter pins and mating holes in the center arm member 1522 and mating receptacles 1524.

A gear box 1530 may be provided to rotate the hybrid modular fixturing platform 1506. In one embodiment hybrid modular fixturing platform 1506 may be rotated using a handle 1535 of the gear box 1530. The hybrid modular fixturing platform 1506 may be rotated preset positions and secured with a pin assembly 1532. The hybrid modular fixturing platform 1506 may be otherwise fixed, secured or held at a desired position.

The hybrid modular fixturing platforms may each comprise the hybrid modular fixturing platform 100 described above. In these embodiments, the hybrid modular fixturing platforms may comprise modular mounting brackets to attach to the mounting frame in place of leg assemblies using, for example, bolts or other fasteners. Thus, the fixturing platforms may be readily removed, added, or have their working surfaces reconfigured.

The fixturing platform or table of the disclosure may be assembled upon fabrication or shipped unassembled or partially assembled for assembly at, for example, a point of use or sale. In many cases, to reduce shipping volume, the fixturing platform or table may be shipped partially assembled with the parts fully fabricated and configured to be assembled. Thus, the parts such as the frame assembly may be welded together and shipped assembled while other parts, such as un-welded parts that are fastened, are shipped unassembled with the assembled parts.

A number of embodiments of the invention have been described. Nevertheless, it will be understood that various modifications may be made without departing from the spirit and scope of the invention. For example, the specific dimensions described are exemplary and may be modified without departing from the scope of the disclosure. In addition, for example, the frame, leg, support, plates, and brackets may comprise tubular, solid, or other suitable structures. Accordingly, other embodiments are within the scope of the following claims.

What is claimed is:

1. A rotatable fixturing platform, comprising:
    a rotisserie comprising a base having an extensible frame comprising:
        a plurality of support assemblies, each of the support assemblies comprising a mating receptacle;
        a center frame member extending between and connecting the support assemblies and configured to be received by the mating receptacles; and
        a plurality of extensible arms, each extensible arm extending from one of the support assemblies and comprising a bearing,
        wherein the mating receptacles are configured to change a length of the extensible frame based on a position of the center frame member in the mating receptacles; and
    a modular fixturing platform;
    a mounting assembly connected to the rotisserie, the mounting assembly comprising:
        a plurality of mounting brackets configured to receive the modular fixturing platform;
        a levelling assembly on which the modular fixturing platform is placed, the levelling assembly configured to align the modular fixturing platform to maintain a level of the modular fixturing platform; and
        an axle assembly, the axle assembly secured to the bearings of the extensible arms.

2. The rotatable fixturing platform of claim 1, the mounting brackets comprising L shaped mounting brackets.

3. The rotatable fixturing platform of claim 1, the mounting brackets comprising bar mounting brackets.

4. The rotatable fixturing platform of claim 1, the mounting brackets comprising flat mounting brackets.

5. The rotatable fixturing platform of claim 1, the mounting brackets coupled to a plurality of fixturing platforms, the fixturing platforms spaced equidistant from an axis of rotation of the rotisserie.

6. The rotatable fixturing platform of claim 1, the axle assembly comprising a first axle coupled to and extending outwardly of a first mounting bracket and a second axle coupled to and extending outwardly of a second mounting bracket, wherein each axle is secured to a bearing of an extensible arm.

7. The rotatable fixturing platform of claim 1, the center frame member and mating receptacles keyed and comprising a hexagonal shape.

8. The rotatable fixturing platform of claim 1, the center frame member and mating receptacles keyed and comprising a triangular shape.

9. The rotatable fixturing platform of claim 1, the center frame member and mating receptacles keyed and comprising a circular shape.

10. The rotatable fixturing platform of claim 1, the center frame member and mating receptacles keyed and comprising a square shape, wherein each side of the center frame member is 45 degrees from vertical.

11. The rotatable fixturing platform of claim 1, wherein the bearings comprise pillow bearings.

12. The rotatable fixturing platform of claim 1, the extensible frame comprising a plurality of casters coupled to the support assemblies, wherein the casters are dog legged with a bottom of the support assemblies lower than a top of the casters.

13. The rotatable fixturing platform of claim 1, wherein the extensible frame comprises one or more axle brakes, each axle brake mounted to one of the extensible arms and comprising a clamp to secure the axle assembly against rotation.

14. The rotatable fixturing platform of claim 1, further comprising a servo motor sprocket fixed to the axle assembly for rotation of the modular fixturing platform.

15. The rotatable fixturing platform of claim 1, further comprising a gear box coupled to the axle assembly for rotation of the modular fixturing platform.

16. A rotatable fixturing platform, comprising:
a rotisserie comprising a base having an extensible frame comprising:
  a plurality of support assemblies, each of the support assemblies comprising a mating receptacle;
  a center frame member extending between and connecting the support assemblies and configured to be received by the mating receptacles; and
  a plurality of extensible arms, each extensible arm extending from one of the support assemblies and comprising a bearing,
  wherein the mating receptacles are configured to change a length of the extensible frame based on a position of the center frame member in the mating receptacles; and
at least three fixturing platforms; and
a mounting frame attached to the at least three fixturing platforms, the mounting frame comprising:
  a set of ends, each end having edges with at least three sides, the set of ends sized to receive the at least three fixturing platforms, each at an orientation that is substantially perpendicular to the set of ends;
  at least one cross member disposed between and connecting the set of ends; and
  an axle assembly extending outwardly of the set of ends and secured to the bearings of the extensible arms.

17. The rotatable fixturing platform of claim 16, further comprising four fixturing platforms fixed to the mounting frame, the ends of the mounting frame comprising squares.

18. The rotatable fixturing platform of claim 16, further comprising six fixturing platforms fixed to the mounting frame, the ends of the mounting frame comprising hexagons.

19. A rotatable fixturing platform, comprising:
a rotisserie comprising a base having an extensible frame comprising:
  a plurality of support assemblies, each of the support assemblies comprising a mating receptacle;
  a center frame member extending between and connecting the support assemblies and configured to be received by the mating receptacles; and
  a plurality of extensible arms, each extensible arm extending from one of the support assemblies and comprising a bearing,
  wherein the mating receptacles are configured to change a length of the extensible frame based on a position of the center frame member in the mating receptacles; and
a mounting assembly connected to the rotisserie, the mounting assembly comprising:
  a plurality of mounting brackets, each receiving a modular fixturing platform, each mounting bracket comprising an attachment point affixed to the modular fixturing platform;
  an axle assembly, the axle assembly secured to the bearings of the extensible arms; and
  a levelling assembly on which the modular fixturing platform is placed, the levelling assembly configured to align the modular fixturing platform to maintain a level of the modular fixturing platform; and
a modular fixturing platform fixed to the mounting assembly, the modular fixturing platform comprising:
  a frame assembly configured to couple to a support assembly; and
  a plurality of surface plates configured to couple to the frame assembly in a plurality of configurations, the plurality of configurations comprising at least a continuous configuration with abutting surface plates forming a continuous working surface and a spaced configuration with spaced surface plates forming a spaced working surface, the spaced configuration have one or more working gaps between surface plates.

* * * * *